(12) United States Patent (10) Patent No.: US 9,144,897 B2
Petrak et al. (45) Date of Patent: Sep. 29, 2015

(54) APPARATUS, SYSTEM AND METHOD FOR TENSIONING AN EMERGENCY BRAKE SYSTEM

(71) Applicant: Innovative System Solutions, Inc., Boulder, CO (US)

(72) Inventors: Gregory H. Petrak, Boulder, CO (US); Michael Collins, Utica, MI (US)

(73) Assignee: INNOVATIVE SYSTEM SOLUTIONS, INC, Boulder, CO (US)

( * ) Notice: Subject to any disclaimer, the term of this patent is extended or adjusted under 35 U.S.C. 154(b) by 231 days.

(21) Appl. No.: 13/870,816

(22) Filed: Apr. 25, 2013

(65) Prior Publication Data

US 2013/0283980 A1    Oct. 31, 2013

Related U.S. Application Data

(60) Provisional application No. 61/638,334, filed on Apr. 25, 2012, provisional application No. 61/738,225, filed on Dec. 17, 2012.

(51) Int. Cl.
*B25B 25/00* (2006.01)
*B60T 17/22* (2006.01)
*B60T 11/04* (2006.01)
*B60T 13/74* (2006.01)

(52) U.S. Cl.
CPC ............... *B25B 25/00* (2013.01); *B60T 11/046* (2013.01); *B60T 13/746* (2013.01); *B60T 17/221* (2013.01)

(58) Field of Classification Search
CPC ... B60T 17/221; B60T 11/046; B60T 13/746; B25B 15/00; B25B 25/00; Y10T 74/20408

USPC .................................................. 81/57, 57.38
See application file for complete search history.

(56) References Cited

U.S. PATENT DOCUMENTS

| | | |
|---|---|---|
| 2,821,091 A | 1/1958 | Benner |
| 3,237,977 A | 3/1966 | Batchelder |
| 3,513,719 A | 5/1970 | Tschanz |
| 3,643,198 A | 2/1972 | Economu |
| 3,661,090 A | 5/1972 | Martin et al. |
| 3,937,295 A | 2/1976 | Wright |
| 3,969,964 A | 7/1976 | George et al. |
| 4,020,713 A | 5/1977 | Cantley et al. |
| 4,057,135 A | 11/1977 | Mori |
| 4,174,099 A | 11/1979 | Yamasaki |
| 4,227,594 A | 10/1980 | Kluger |
| 4,256,205 A | 3/1981 | Hamar |
| 4,271,718 A | 6/1981 | Bopp et al. |
| 4,347,993 A | 9/1982 | Leonard |
| 4,374,597 A | 2/1983 | Mochida |
| 4,378,713 A | 4/1983 | Haskell et al. |
| 4,380,181 A | 4/1983 | Bunyan |
| 4,407,167 A | 10/1983 | Koukal et al. |

(Continued)

FOREIGN PATENT DOCUMENTS

| | | |
|---|---|---|
| DE | 4109887 | 10/1992 |
| DE | 4241389 | 2/1995 |

(Continued)

*Primary Examiner* — David B Thomas
(74) *Attorney, Agent, or Firm* — Dorsey & Whitney LLP

(57) ABSTRACT

A brake tensioning system and method are described herein for use on vehicles. The system includes a tool, and the method includes the use of the tool to effectuate tensioning of a brake system conveniently, accurately, and repeatably.

8 Claims, 34 Drawing Sheets

(56) References Cited

U.S. PATENT DOCUMENTS

| | | | |
|---|---|---|---|
| 4,412,458 A | 11/1983 | Derringer | |
| 4,438,901 A | 3/1984 | Reneau et al. | |
| 4,539,872 A | 9/1985 | Bochman, Jr. | |
| 4,543,849 A | 10/1985 | Yamamoto et al. | |
| 4,569,112 A | 2/1986 | Dussault | |
| 4,624,155 A | 11/1986 | Wing | |
| 4,658,668 A | 4/1987 | Stocker | |
| 4,708,036 A | 11/1987 | Vossbrinck | |
| 4,771,773 A * | 9/1988 | Kropf | 606/108 |
| 4,773,146 A | 9/1988 | Bunyan | |
| 4,838,109 A | 6/1989 | Stewart | |
| 4,887,705 A | 12/1989 | Solano et al. | |
| 5,016,490 A | 5/1991 | Jaksic | |
| 5,074,175 A | 12/1991 | Earle | |
| 5,080,434 A | 1/1992 | Locher | |
| 5,086,662 A | 2/1992 | Tayon et al. | |
| 5,144,856 A | 9/1992 | Roca | |
| 5,203,068 A | 4/1993 | Siring | |
| 5,211,071 A | 5/1993 | Hedstrom | |
| 5,235,870 A | 8/1993 | Hedstrom | |
| 5,343,785 A | 9/1994 | Holt et al. | |
| 5,386,887 A | 2/1995 | Hilgert et al. | |
| 5,482,085 A | 1/1996 | Wasson | |
| 5,590,744 A | 1/1997 | Belmond | |
| 5,615,575 A | 4/1997 | Goodwin | |
| 5,662,004 A | 9/1997 | Osborn et al. | |
| 5,802,929 A | 9/1998 | Furukawa et al. | |
| 5,809,917 A | 9/1998 | McGowan et al. | |
| 5,813,290 A | 9/1998 | Takahashi et al. | |
| 5,816,109 A | 10/1998 | Dege | |
| 5,890,406 A | 4/1999 | Thorn | |
| 5,910,194 A | 6/1999 | Cho | |
| 5,983,745 A | 11/1999 | Petrak | |
| 6,328,138 B1 | 12/2001 | Takizawa | |
| 6,386,338 B1 * | 5/2002 | Powrozek | 188/156 |
| 6,575,270 B2 | 6/2003 | Farenden | |
| 6,799,473 B2 | 10/2004 | Adrian | |
| 7,011,188 B2 | 3/2006 | Scheuring et al. | |
| 7,331,254 B2 | 2/2008 | Petrak | |
| 7,331,255 B2 | 2/2008 | Petrak | |
| 7,464,608 B2 | 12/2008 | Revelis et al. | |
| 7,819,042 B2 | 10/2010 | Petrak | |
| 8,051,745 B2 | 11/2011 | Petrak | |
| 2002/0011129 A1 | 1/2002 | Petrak | |
| 2002/0066623 A1 * | 6/2002 | Powrozek | 188/2 D |
| 2002/0070083 A1 | 6/2002 | Farenden | |
| 2002/0084154 A1 | 7/2002 | Peter | |
| 2003/0075001 A1 | 4/2003 | Petrak | |
| 2003/0200818 A1 | 10/2003 | Adrian | |
| 2003/0227010 A1 | 12/2003 | Petrak | |
| 2005/0145444 A1 | 7/2005 | Petrak | |
| 2007/0068330 A1 | 3/2007 | Revelis et al. | |
| 2007/0175289 A1 | 8/2007 | Sykes | |
| 2008/0196552 A1 | 8/2008 | Petrak | |
| 2009/0031868 A1 | 2/2009 | Petrak | |
| 2011/0094347 A1 | 4/2011 | Petrak | |
| 2012/0266727 A1 | 10/2012 | Petrak | |

FOREIGN PATENT DOCUMENTS

| | | |
|---|---|---|
| DE | 19618421 | 5/1997 |
| EP | 0805104 | 11/1997 |
| GB | 2260588 | 4/1993 |
| JP | 358012857 | 1/1983 |
| JP | 2159408 | 6/1990 |
| JP | 03090461 | 4/1991 |

* cited by examiner

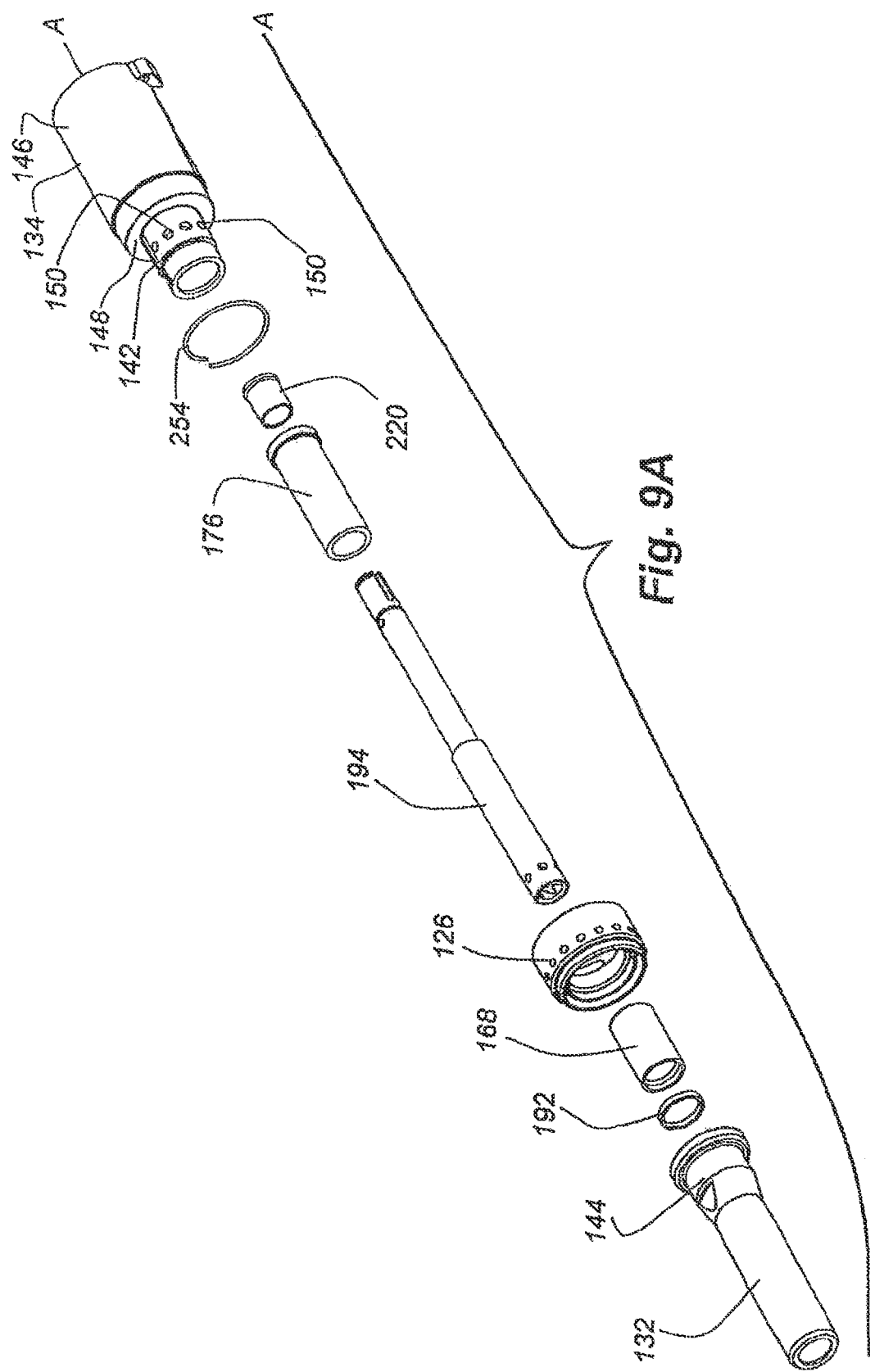

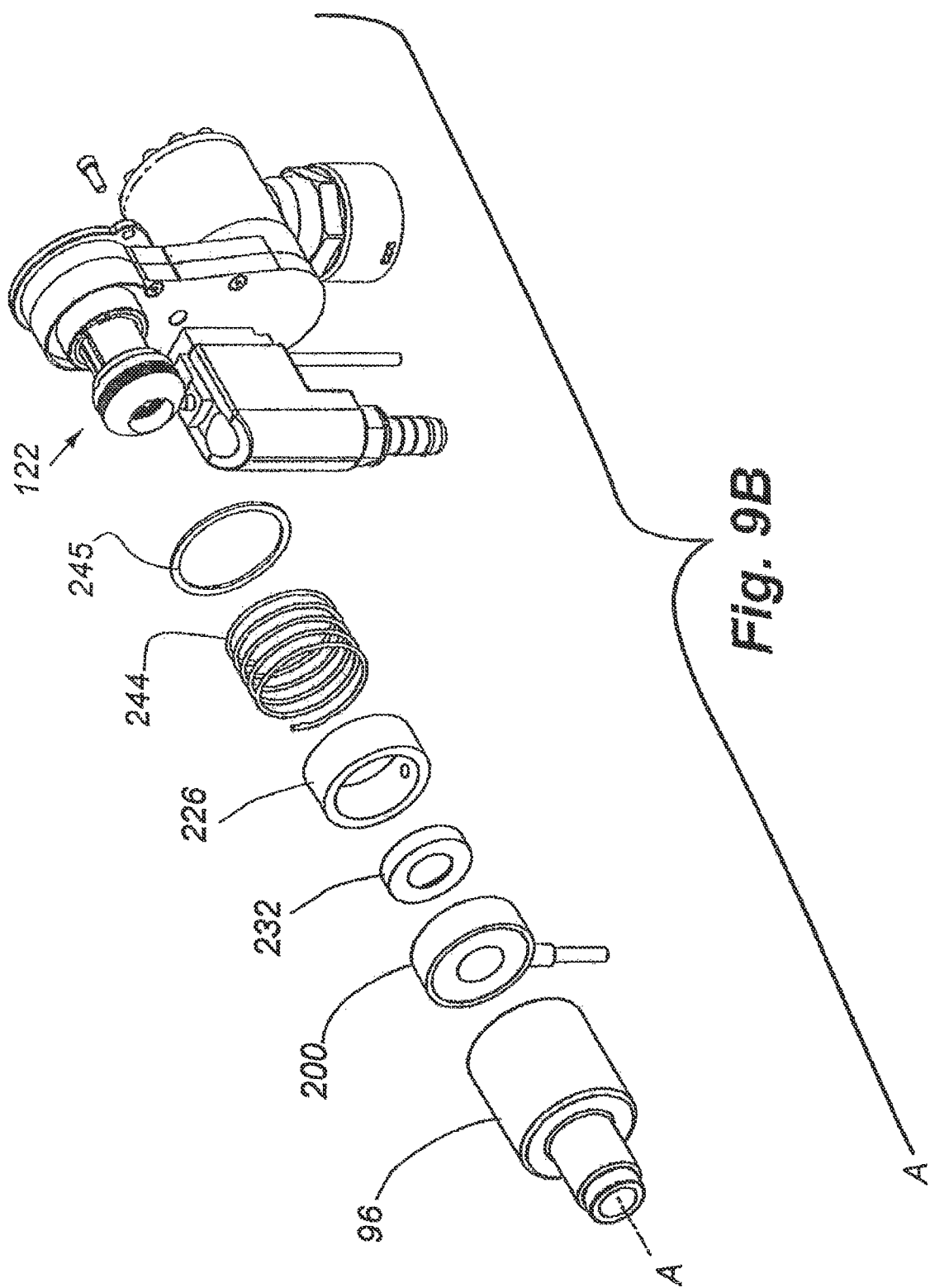

though a load cell configured to remain substantially stationary relative to the body and operably bear upon a portion of the body when the shaft is engaged with the cable end. The rear portion of the shaft may extend through a bearing that allows rotation of the shaft relative to the body. The tool may include a gear operably engaged with a source of rotational

APPARATUS, SYSTEM AND METHOD FOR TENSIONING AN EMERGENCY BRAKE SYSTEM

CROSS REFERENCE TO RELATED APPLICATIONS

This application claims the benefit under 35 U.S.C. §119(e) of the filing date of U.S. provisional patent Application No. 61/638,334, filed Apr. 25, 2012, entitled "APPARATUS, SYSTEM AND METHOD FOR TENSIONING AN EMERGENCY BRAKE SYSTEM", and of U.S. provisional patent Application No. 61/738,225, filed Dec. 17, 2012, entitled "APPARATUS, SYSTEM AND METHOD FOR TENSIONING AN EMERGENCY BRAKE SYSTEM", both of which are hereby incorporated by reference as if fully disclosed herein.

This application also incorporates by reference U.S. Pat. No. 7,819,042, filed Jul. 31, 2008, and entitled "System and Method for Tensioning an Emergency Brake System;" and U.S. Pat. No. 8,051,745, and entitled "Method and Apparatus for Tensioning an Emergency Brake System on a Vehicle," both of which are incorporated by reference as if fully disclosed herein.

FIELD

This disclosure relates to an apparatus, system and methods associated with the tensioning of an emergency brake system on a vehicle, and more particularly to a tool having an internal tensioning structure that includes a stationary load measuring structure and a movable nut retention assembly, which together act with a nut and cable components and an associated method to tension the brake system to the desired tension level.

BACKGROUND

Conventional apparatus used in the assembly of emergency brake cable systems often require more than one person and more than one station on an assembly line for adequate installation and tensioning. Once the emergency brake cable system is initially installed, one assembly worker typically first tensions the system to the desired level, at which the voids are removed from the cable and the conduits through which the cable runs. At a second assembly position, a second assembly worker then typically reduces the tension in the system in a variety of ways so that the emergency brake cable system is not causing the brakes to be engaged. The existing systems require more than one assembly worker and more than one station, and thus are a relatively expensive endeavor.

A further limitation of the existing brake cable system installation technology is that the tension in the cable system is typically measured by indirect methods, such as strain gauges and other types of transducers. This means that the actual tension in the brake cable system, which is important to the proper functioning of the emergency brake, is at best characterized and not directly known during the assembly process. This indirect tension measurement has limited measurement accuracy, and thus causes there to be a relatively wide variation in the ultimate tension at which the emergency brake cable system is assembled in a vehicle. This creates unwanted variations in the emergency brake cable system operation on the finished vehicle.

Some other emergency brake tensioning systems have reduced the human element involved in the process by use of automated mechanisms. However, these systems use hydraulics or pneumatics as part of the process, which may lead to maintenance problems, cleanliness issues, tension measurement inaccuracies, and generally to a more complicated and inconvenient system.

What is needed is an emergency brake cable tensioning method and apparatus that overcomes the above issues, and allows fewer resources to be used in tensioning the cable system, thus saving money in the assembly process and ultimately allowing automobiles to be manufactured more efficiently. In addition, what is needed is an emergency brake cable tensioning method and apparatus that allows the direct measurement of the tension of the brake cable system with relatively few moving parts, particularly in the load measurement structure, during brake cable assembly to allow the accurate tensioning of the emergency brake cable system for proper performance in the finished vehicle. These and other advantages provided by examples of the present disclosure will be recognized from the following description.

SUMMARY

In overcoming the shortcomings noted above, an inventive tensioning tool and associated method are described herein that, among other things, selectively create a mechanical column coupling to allow for the accurate measurement of the tension developed in an emergency brake tensioning system.

In one example, a tensioning tool for use in tensioning an emergency brake cable system for a vehicle is provided, the apparatus being driven by a rotational driver, and the brake system including a rotatable cable end. The apparatus includes a body, a rotating assembly positioned in the body for engaging the cable end, an engagement member at least partially external to the body and movable between a first position and a second position to secure and release the cable end, the rotating assembly stationarily positioned in the body and forming a load measurement column, wherein insertion of the cable end into rotating assembly and movement of the engagement member from the first position to the second position causes the cable end to be secured in the rotating assembly. Tensioning is performed and tension load measured without substantial axial movement of the load sensor.

In another example, a tensioning tool for use in tensioning an emergency brake cable system for a vehicle is provided, the tool being driven by a rotational driver, and the brake system including a rotatable cable end. The tool includes a body; a first portion rotatably positioned in the body for engaging the cable end, the first portion including a locking mechanism for receiving the cable end, the locking mechanism movable between at least a first locked position and a second unlocked position; and a second portion movably positioned relative to the body and at least partially external to the body and operably engaging the locking mechanism. Upon insertion of a nut into the first portion, movement of the second portion to the second locked position secures the nut in the first portion.

The first portion may be fixed in axial position relative to the body. The first portion may include an input shaft that rotates relative to the body. The first portion may be an elongated shaft having a front portion and a rear portion, the front portion of the shaft including the locking mechanism and defining a recess, the rear portion of the shaft extending through a load cell configured to remain substantially stationary relative to the body and operably bear upon a portion of the body when the shaft is engaged with the cable end. The rear portion of the shaft may extend through a bearing that allows rotation of the shaft relative to the body. The tool may include a gear operably engaged with a source of rotational movement and non-rotatably engaged with the shaft; and a thrust bearing operably engaging the gear and the load cell for allowing rotation of the gear while creating a compressive load on the load cell. The second portion may include an elongated actuator at least partially movable through the body; an engagement actuator operably engaged with the elongated actuator, the engagement actuator operable to actuate the locking mechanism between the locked and unlocked position, the engagement actuator movable relative to the input shaft. The elongated actuator may include an engagement tab that extends through a slot in the body and engages the engagement actuator. The engagement actuator may be a sleeve positioned at least partially interior of the body and at least partially surrounds at least a front portion of the first portion.

In another example, a tensioning tool for use in tensioning an emergency brake cable system for a vehicle is provided, the tool being driven by a rotational driver, and the brake system including a rotatable cable end. The tool includes a front portion having a first axis and a shaft, the front portion configured to selectively secure and release the cable end, the shaft configured to rotate the cable end; a rear portion having a second axis, the rear portion including a gear train for rotating the shaft about a shaft centerline; the front and rear portions positioned offset from one another such that the first axis and the second axis are parallel to and spaced apart from one another, each of the first axis and the second axis are parallel to the shaft centerline.

In another example, a tensioning tool for use in tensioning an emergency brake cable system for a vehicle is provided, the tool being driven by a rotational driver. The tool includes a rotatable shaft, a sleeve at least partially surrounding at least a portion of the shaft and slidable relative to the shaft, and an actuator rod laterally offset from the shaft and movable relative to the shaft, the actuator rod coupled to the sleeve and operable to slide the sleeve relative to the shaft. The tensioning tool may include a first gear meshingly engaged with a portion of the shaft. The tensioning tool may include a second gear operably engaged by the rotational driver, wherein the actuator rod extends laterally between the shaft and the second gear. The actuator rod may extend through an aperture formed in the first gear. A length of the actuator rod may overlap with a length of the shaft. The shaft may define a shoulder, and the tensioning tool may include a load cell at least partially surrounding at least a portion of the shaft axially between the shoulder and the sleeve.

In another example, a method for engaging a tensioning tool with an emergency brake cable system for a vehicle is provided, the brake system including a rotatable cable end movable relative to a cable. The method includes receiving the cable end in the tool; moving an external portion of the tool to a first position to axially secure the cable end in the tool; tensioning the cable system by moving the cable end relative to the cable; and moving the external portion of the tool to a second position to axially release the cable end from the tool.

In another example, a method for tensioning an emergency brake cable system for a vehicle is provided, the brake system including a rotatable cable end movable relative to a cable. The method includes securing the cable end in a recess formed in a tool; rotating a portion of the tool to rotate the cable end relative to the cable; measuring tension in the cable system by a sensor stationarily positioned within the tool; and releasing the cable end from the recess formed in the tool.

In another example, a method for measuring and determining the apparent stiffness of a park brake cable system and adjusting tensioning force applied to the system based upon such determination in real time is provided. The method includes operably engaging a tensioning apparatus with a park brake cable of a park brake cable system, the tensioning apparatus including a housing that contains a load cell and attached to a programmable drive, the brake cable system including an equalizer adapted to balance tensions in at least two lengths of cable, wherein a nut is operably associated with a threaded rod, the nut including a surface for operably engaging the equalizer; securing the nut within the apparatus; positioning the surface of the nut away from the equalizer a specified distance; driving the nut with the tensioning apparatus to tension the park brake cable to a first tension level sufficient to remove voids from the cable system; measuring the first tension level using the load cell; relieving the tension in the park brake cable to a second level approaching zero by driving the tensioning apparatus in reverse; tensioning the cable to a third tension level with the tensioning apparatus, the third tension level being higher than the second tension level; measuring the third tension level with the load cell; tensioning the cable to a fourth tension level with the tensioning apparatus, the fourth tension level being higher than the third tension level; measuring the fourth tension level with the load cell; based on the speed of rotation of the drive and time elapsed, or using total angle of rotation, determining the actual distance traveled by the nut between the third and fourth tension levels; based on the distance traveled, formulating an algorithm that represents the slope of the tension travel relationship or characteristic stiffness of the cable system; based on a desired final residual tension in the cable system, determining the number of reverse revolutions of the nut to achieve the desired final residual tension; driving the nut in reverse the required number of reverse revolutions with the tensioning apparatus; and operably disengaging the tensioning apparatus from the end of the park brake cable, wherein the nut returns to the equalizer and substantially maintains the desired residual tension in the park brake cable system.

In another example, a method of obtaining a desired residual level of tension in a park brake cable system is provided. The method includes determining a tension/travel curve between a lower first tension and a higher second tension by moving a nut along a threaded rod; and using the tension/travel curve to determine a distance to move the nut along the threaded rod to a desired residual level of tension.

While multiple examples are disclosed herein, still other examples will become apparent to those skilled in the art from the following detailed description, which shows and describes illustrative examples of the disclosure. As will be realized by those of ordinary skill in the art upon reading the following disclosure, the disclosed examples are capable of modifications in various aspects, all without departing from the spirit and scope of the claimed invention. Accordingly, the drawings and detailed description are to be regarded as illustrative in nature and not restrictive.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

BRIEF DESCRIPTION OF THE DRAWINGS

FIGS. 9*a* and 9*b* are an exploded view of the tensioning tool of FIG. 2 showing the components associated therewith as described with respect to various figures listed above.

DETAILED DESCRIPTION

Figure 1:
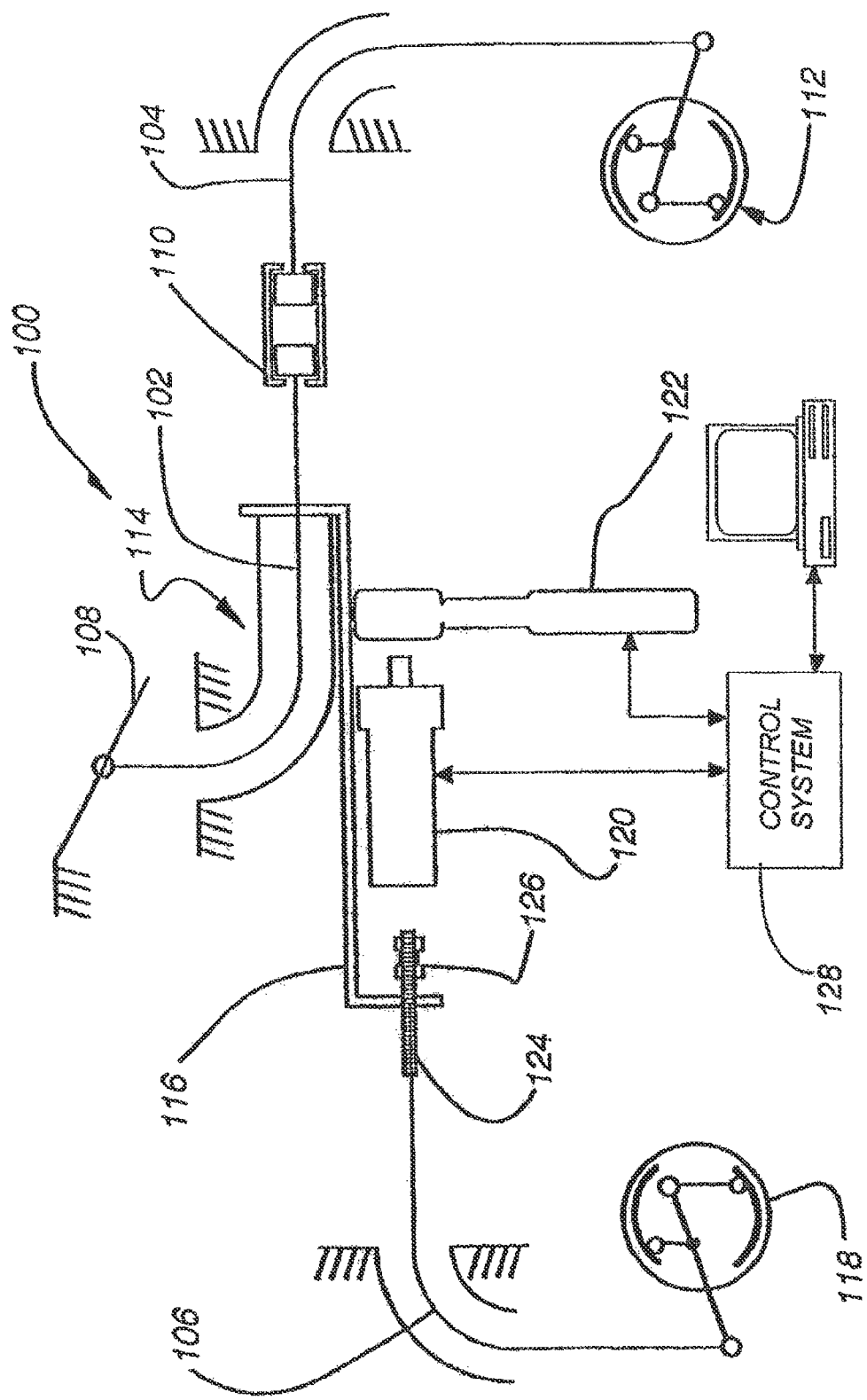
FIG. 1 shows a diagram of an example emergency brake cable system to be tensioned by any of the example tensioning tools and associated methods described herein.

The instant disclosure generally provides a tensioning apparatus attachment to a drive tool, such as a ratchet, nut runner, or other type of wrench, used for tensioning the park brake cable system of an automobile during assembly. FIG. 1 illustrates a schematic of a system utilizing an example attachment. In particular, FIG. 1 illustrates a side pull park brake system 100. The park brake system 100 includes a front cable 102, a rear right cable 104, and a rear left cable 106. The front cable 102 is attached to a pull handle 108 at its first end and a connector clip 110 at its second end. The connector clip 110 attaches to the front end of the rear right cable 104, which extends towards and attaches to the brake assembly 112 on the rear right wheel. The rear left cable 106 is attached to the front cable 102 through a reactive conduit system 114 as is well-known in the art. The front end of the rear left cable 106 is attached to one end of an equalizer bracket 116, which is in turn attached to and part of the reactive conduit system 114. The rear end of the rear left cable 106 is attached to the rear left brake assembly 118. The front cable 102 and the rear right cable 104 may be one continuous cable; however, it may be more convenient for the front and rear cables 102, 104 to be separate from one another for ease of manufacturing.

The operation of a reactive conduit side pull park brake system 100 is well-known. The problem solved by the present disclosure is that the tensioning of the system during assembly is made significantly more convenient by use of a tensioning apparatus in combination with a drive means, which results in an accurately tensioned cable system. In addition, the use of a tensioning apparatus may reduce overall costs of building the park brake system into a vehicle during assembly, improve quality, and reduce labor costs. While described in connection with a side pull park brake system, the tensioning apparatus may be utilized on a center pull park brake system or other brake systems.

The front end of the rear left cable 106 includes a threaded rod 124 of approximately one-half inch to four inches long. The free end of the threaded rod is positioned through an aperture in the end of the equalizer bracket 116 and a nut 126 is positioned on the free end of the threaded rod 124 in order to hold the threaded rod in attachment with the equalizer bracket. The tensioning apparatus 120 and the drive means 122 are used to tension the entire park brake cable system to remove voids and stretch from the various park brake cables so that the park brake cable system 100 functions appropriately during the use of the vehicle, and to lessen slackening or loosening. The particular tensioning apparatus 120 by itself, or in combination with the drive means 122 (collectively referred to as the "park brake tensioning system"), may be used together to tension the park brake system.

One of the brake system assembly benefits provided by the park brake tensioning system involves the utilization of a relief distance. The relief distance is the distance that the end of the cable being used to tension the system is allowed to relax after the tensioning of the system has been performed. Relaxation of the tension releases the engaged brakes from the drums, or the calipers from the disk (for disk brakes), just enough to allow the wheel to turn freely while keeping a sufficient level of tension in the park brake system in order to easily engage the parking brake.

Note that the tensioning method and apparatus of the present invention can be implemented at any place in a park brake cable system where there is an action/reaction point, such as where the park brake handle attaches to the front cable, where the rear cable is attached to the brake assemblies, where the front cable and rear right cable attach together, or other locations.

Referring still to FIG. 1, the tensioning apparatus 120, including the nut runner 122, is interfaced with a control system 128 to monitor and control the operation of the tensioning apparatus 120. The control system 128 works to measure tension in the system and control the operation of the nut runner 122 to increase, decrease, or maintain tension. The system in which the tool is utilized includes (in a non-limiting way) the tool 120, the nut runner 122, and the control system 128. The control system 128 is in operable communication with a load cell (described below), or other load or tension measurement device or component associated with the tensioning apparatus 120, to receive and/or send signals there from and thereto. The control system 128 is also in operable communication with the nut runner 122 to receive and/or send signals there from and thereto. The control system 128 may include software, CPU, memory, inputs and outputs, digital or analog components, displays and data outputs, and programmable logic units to facilitate controlling and feedback instructions and data collection and analysis from the system for operation of the tensioning tool 120. The control system 128 may include the ability to receive from and output to a data and/or display signal and/or to a wired or wireless network for observing and operating of the control system. Alternatively, the nut runner 122 may be controlled manually.

Figure 2:
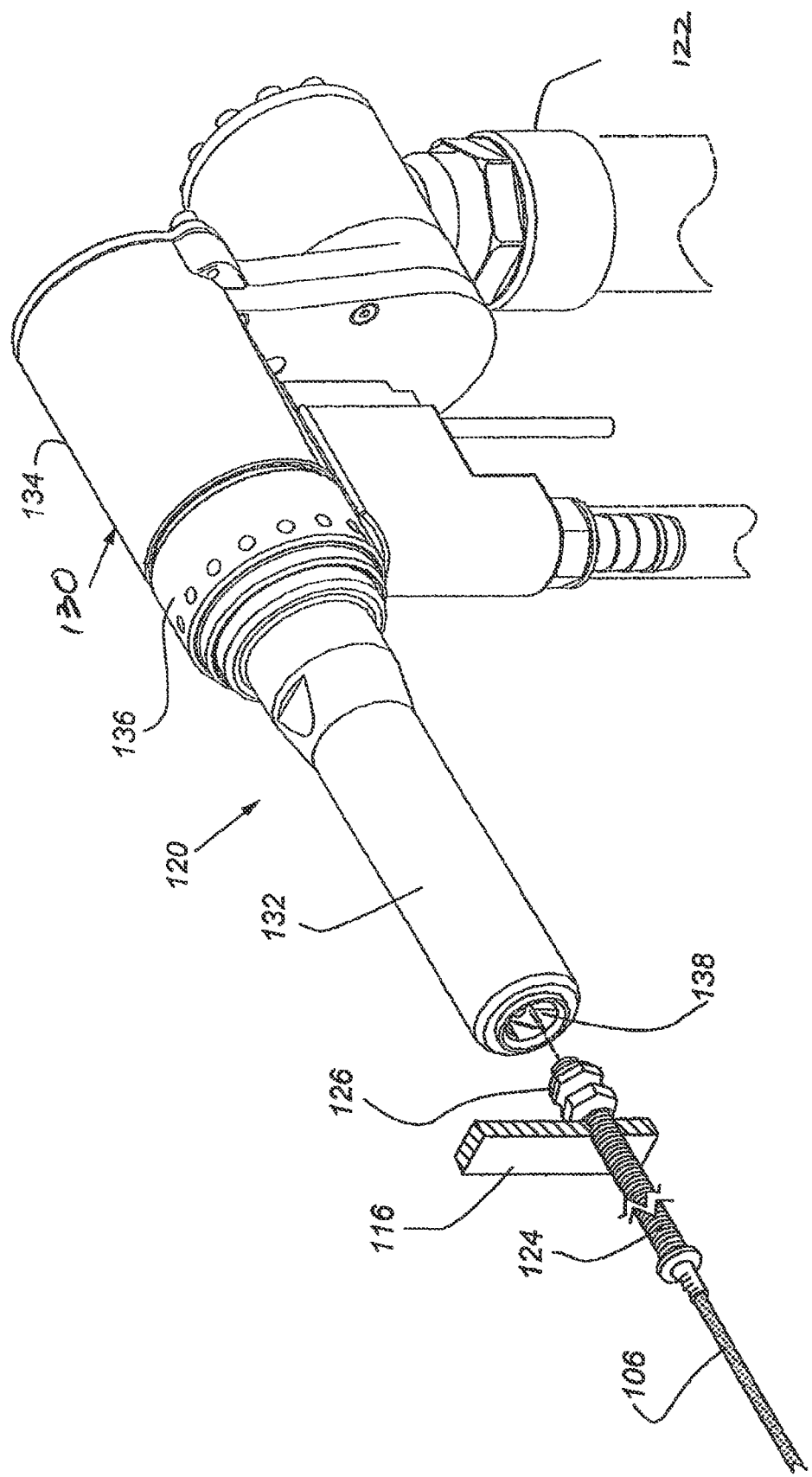
FIG. 2 is a perspective view of an example tensioning tool, prior to mounting a nut in the end effector.
Figures 3, 4:
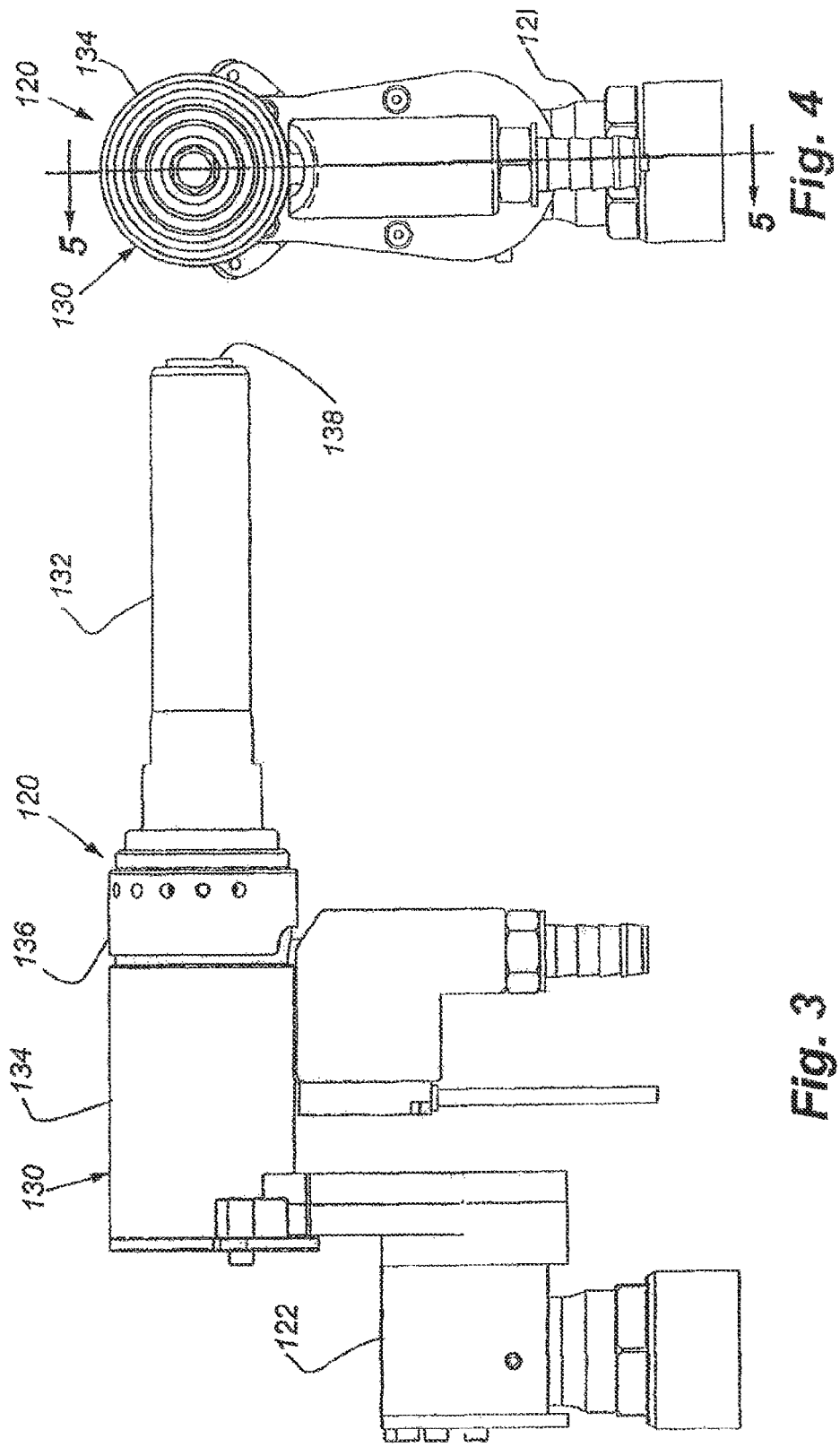
FIG. 3 is a side view of the tensioning tool of FIG. 2.
FIG. 4 is an end view of the tensioning tool of FIG. 3.

As shown in FIGS. 2, 3 and 4, the tensioning tool 120 includes a main body 130 having a barrel 132 operably associated with a housing 134. The tensioning tool 120 includes a release ring 136 movable relative to the housing 134 and the barrel 132, and in this embodiment is externally disposed relative to the housing. The release ring 136 may be internal to or a combination of internal and external to the housing. The release ring 136 allows the relative motion of internal portions of the barrel 132 and housing 134 with respect to the barrel and housing.

The nut 126, or cable end, is attached to the threaded rod 124 as part of the cable assembly in an emergency park brake system. The threaded rod 124 extends through the equalizer bracket 116, with the nut 126 keeping the rod 124 (and cable 106 to which it is attached) from being pulled back through the bracket 116 by the tension in the cable. The equalizer bracket 116, as explained above, is attached to the reactive conduit of the emergency brake system, or it may be attached directly to the frame of a vehicle, depending on the design of the emergency braking system.

In general, the nut 126 is first threaded on the rod 124. The nut 126 is then positioned into the end effector 138 in the barrel 132 of the tensioning tool 120. The nut 126 is then pushed into the end effector 138 to push the end effector and the nut further into the barrel 132. This causes the structure internal to the barrel 132 to move rearwardly (described in more detail below), freeing the release ring 136 to move forwardly and lock the nut 126 in the end effector 138 and a portion of the internal structure in engagement with the barrel 132 and the housing 134. This locking mechanism causes the internal structure, housing and barrel to form a rigid, mechanical structure or column against which to tension the emergency brake system. This mechanical structure is effectively a column oriented along the length of the cable, which will provide a very incompressible system against which to measure the tension. Because generally in this example the system does not rely on any pneumatic or hydraulic components to maintain its incompressibility, it may be simpler, more reliable, and have less associated support equipment and related maintenance than those that do.

With the end of the barrel 132 resting on the equalizer bracket 116, tensioning of the cable system can then begin by actuating the nut runner 122, which in turn rotates the end effector 138 and runs the nut 126 up the threaded rod 124. When the desired tension is reached, the release ring 136 is manually pulled rearwardly relative to the housing 134, which unlocks the internal structure and allows the end effector 138 and the nut 126 to move toward the equalizer bracket 116 and release the nut 126 from the end effector 138.

In general, with reference to FIGS. 5-9, an example tensioning tool and operating method is shown. The housing 134 is generally cylindrical in shape, with portions having various dimensions, and defining an internal cavity 140. A front portion 142 of the housing 134 has a reduced external and internal dimension and receives the release ring 136, as well as a rear end 144 of the barrel 132. A shoulder 148 is formed between the rear portion 146 and the front portion 142 of the housing 134 where the internal and external diameters transition. The release ring 136 is mounted circumferentially around the front portion 142, and is axially slidable relative to the housing 134. The front portion 142 of the housing 134 includes at least one aperture 150 formed therein. If more than one aperture is formed, they are formed annularly around the front portion 142. Each aperture 150 receives a locking ball 152, which moves radially through the aperture based on the relative positioning of the locking ring 126 and piston assembly 154, as is described in more detail below. The rear end 144 of the barrel 132 is threadedly engaged with an externally threaded terminal end of the front portion 142. An external shoulder 156 on the front portion 142 engages an internal shoulder 158 on the rear end 144 of the barrel 132 to seat the two together. The rear portion 146 of the housing 134, as noted above, includes a slot 160 formed in its sidewall for allowing axial motion of certain components that are positioned in the housing and extend through the slot to outside the housing. An aperture 162 is also formed to allow the nut runner to be inserted into the housing to actuate the internal components.

Figure 5:
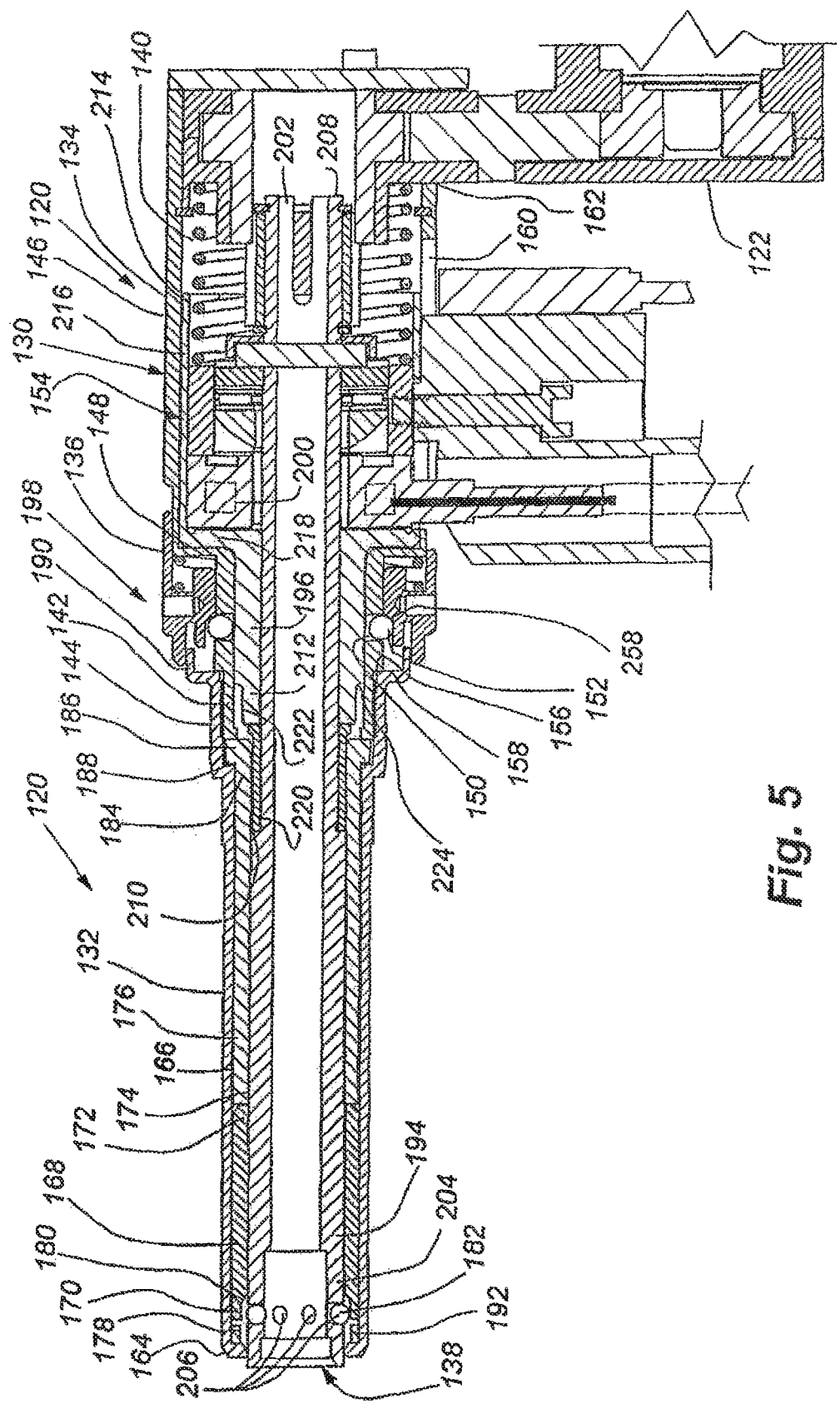
FIG. 5 is a section view taken along line 5-5 of FIG. 4, showing the tensioning tool of FIG. 2 prior to receiving a nut in the end effector, and with the input shaft and piston assembly in their forward-most position.

Still referring to FIG. 5, the barrel 132 is shown engaged at its rear end 144 with the front portion 142 of the housing 134. The barrel 132 has an elongated cylindrical shape, and includes a front end 164 opposite its rear end 144. The barrel 132 also defines an internal cavity 166 extending from one end to the other. The barrel 132 is lined by a sheath including two collar lengths positioned end to end. Each collar length has a first end and a second end. The front collar length 168 has a first end 170 adjacent the front end 164 of the barrel 132, and a second end 172 adjacent the first end 174 of the rear collar length 176. The first end 170 of the front collar length 168 has a first larger interior diameter 178, transitioning by a nut-engagement shoulder 180 or cam surface to a second smaller interior diameter. This internal region formed by the first larger interior diameter 178 is utilized for grasping the nut 126 using a series of nut engagement balls 182, as described later.

The rear collar length 176 has a first end 174 adjacent the second end 172 of the front collar length 168, and a second end 184 adjacent the threaded engagement between the rear end 144 of the barrel 132 and the front portion 142 of the housing 134. The second end 184 of the rear collar length 176 has an outwardly extending flange 186 to allow it to be seated against a shoulder 188 formed adjacent the rear end 144 of the barrel 132 by the terminal end of the front portion 142 of the housing 134 when the barrel 132 and the housing 134 are engaged together as shown in FIG. 5. The rear terminal end of the barrel 132 forms a substantially annular axial extending lip 190 that has a larger internal diameter than the front 142 of the housing 134, and is spaced away there from to form an annular space. The axial lip 190 extends rearwardly over the front portion 142 of the housing, and rearwardly from the threaded engagement between the barrel 132 and the housing 134. A washer 192 may be positioned between the first end 170 of the front collar length 168 and the front end 164 of the barrel 132.

Still referring to FIGS. 5-9, the housing 134 forms an anchor structure relative to which some of the internal components move in one condition, and to which some of the internal components are locked in another condition. The internal components include an input shaft 194, a piston 196, a locking structure 198, a tension measurement structure 200, and a nut runner engagement portion 202. The input shaft 194 is positioned in the barrel 132, inside the sheath, and is rotatable and axially movable relative thereto. The front end 204 of the input shaft 194 includes an end effector 138, which receives the nut 126 and threaded rod 124 (see FIGS. 6, 7, 8, and 9). The end effector 138 has at least one aperture 206 formed therein to receive a corresponding nut engagement ball 182 and allow the ball to move radially in and out of the aperture in conjunction with the relative position of the input shaft 194 along the length of the barrel 132. The end effector 138 acts with the nut engagement balls 182 and the nut engagement cam 180 to securely trap (both axially and rotationally) the nut in the end effector when desired, and is described in greater detail below.

The input shaft 194 extends from a front end 204 adjacent the front end 164 of the barrel 132 along the length of the barrel and through the housing 134 to a rear end 208 in operable engagement with the nut runner 122. The rear end 208 of the input shaft 194 is operably associated with the nut runner 122, which acts to selectively rotate the input shaft 194 clockwise or counter clockwise, or to stop rotation, depending on the controls received from the control system 128. This rear end 208 of the input shaft 194 may move relative to the nut runner 122, and may move into and out of operable engagement therewith, or may move relative to the nut runner 122 and stay in operable engagement therewith through the entirety of the movement.

Along a central section of the input shaft 194, near the rear end 144 of the barrel, prior to entering the front portion 142 of the housing 134, the input shaft 194 forms a circumferential shoulder 210 where the outer diameter of the input shaft 194 is reduced. The input shaft 194 rotates along its longitudinal axis relative to the housing 134 and the barrel 132, under the control of the nut runner 122.

The piston 196 is received over the input shaft 194, and is positioned inside the first 142 and second 146 portions of the housing 134. The piston 196 may be fixed in its position relative to the length of the input shaft, but the input shaft 194 and the piston 196 may rotate relative to one another. The piston 196 has a front portion 212 and a rear portion 214. The front portion 212 is generally coextensive with the front portion 142 of the housing and also fits closely around the external surface of the input shaft 194. The rear portion 214 is spaced away from the external surface of the input shaft 194, and the circumferential piston walls 216 fit closely with the internal wall of the rear portion 146 of the housing 134, forming an annular space therein. Corresponding internal and external shoulders 218 are formed where the piston transitions from the front 212 to the rear 214 piston portion.

The front end of the front portion 212 of the piston 196 engages a spacer sleeve 220 positioned on the outside of the input shaft 194. One end of the spacer sleeve 220 engages the shoulder 210 on the outside of the input shaft 194, and the other, rear end of the spacer sleeve 220 abuts the front portion 212 of the piston 196. The front portion 212 of the piston 196, on its external circumference, forms an annular recess 222. The rear end of the annular recess forms an annular shoulder 224 to work in conjunction with the locking balls 152 to fix the piston 196 and input shaft 194 relative to the housing 134, as is explained in more detail below.

Figure 6:
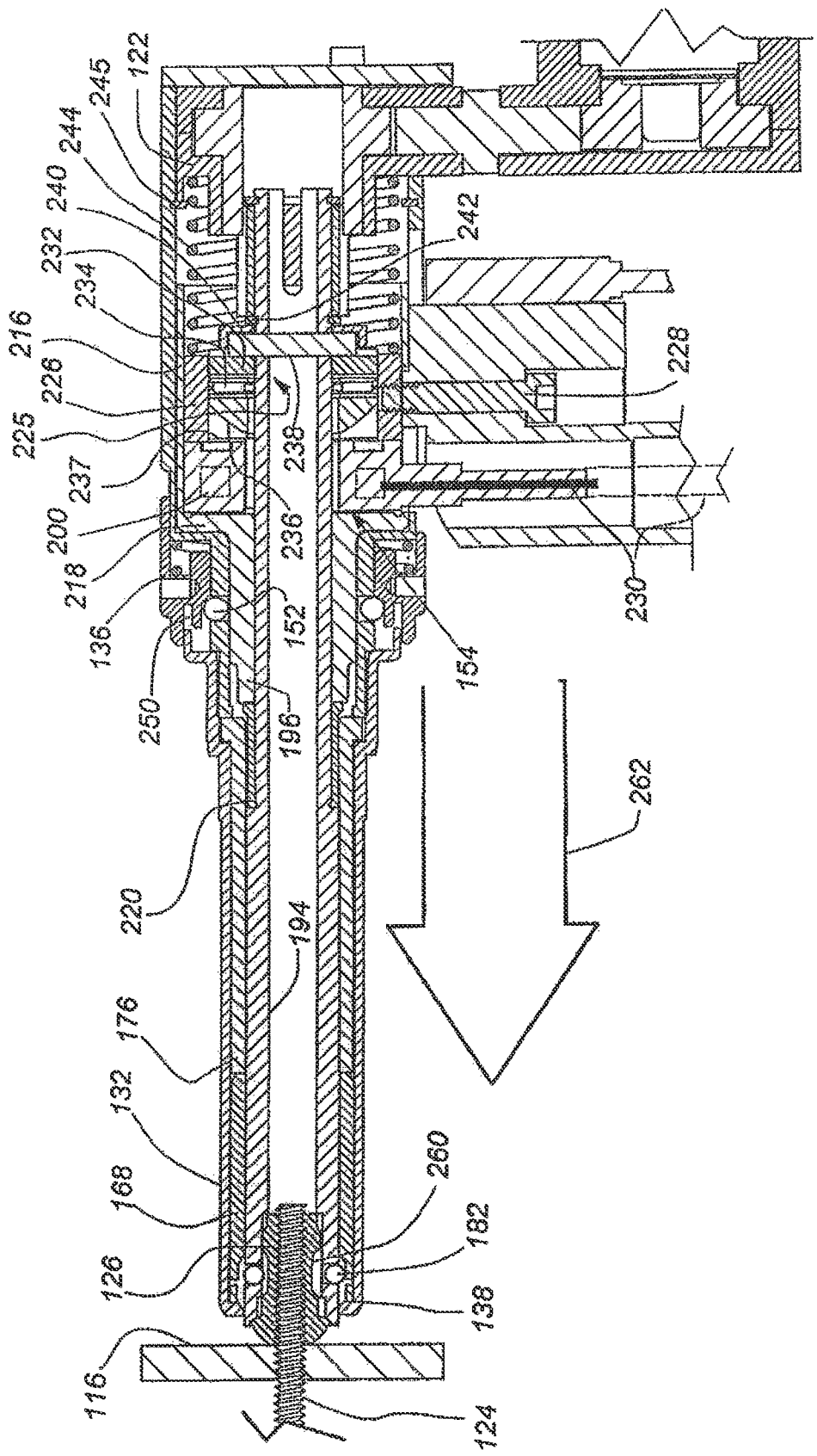
FIG. 6 is a section view similar to that of FIG. 5, but after the nut has been inserted into the end effector, and prior to moving the input shaft and piston assembly rearwardly relative to the barrel and housing.

Referring still to FIGS. 5-10, and particularly FIG. 6, various components are positioned within the annular space between the walls 216 of the rear portion of the piston 196 and the input shaft 194, referred to above as the piston assembly 154. A load cell 200 is received on a bearing on the input shaft 194 in order to allow the input shaft to rotate relative to the load cell, and the load cell abuts on its front side the internal shoulder 218 of the piston 196. The internal shoulder 218 of the piston 196 is the surface against which the load cell is compressed to measure the tension in the cable system. In one embodiment the load cell is concentrically positioned around the input shaft 194, and because of this annular orientation around the input shaft 194, the load cell 200 measures the load in-line with the application of the load by the input shaft, and generally in-line with the terminal end of the cable system to which the input shaft 194 is attached.

An assembly of items that generally combine together to apply a load responsive of the cable tension to the load cell 200, called the compressive component 225, are described hereafter. In one example described herein, an axial collar 226 abuts the rear surface of the load cell 200 and extends along the walls 216 of the second portion 214 of the piston 196. Structure associated with the piston assembly 154 external to the housing 134 may be attached to the collar 226, such as by a screw 228, and extend through the slot 160 in the housing 134. This external structure thus may move along with the piston 196. This structure may include the input/output communication cable 230 for the load cell 200, among other items. A radial collar 232 is positioned about the input shaft 194 inside the rear end of the axial collar 226. The front face of the radial collar 232 engages a facial bearing 234. The radial collar 232 may rotate with the input shaft 194 while in engagement with the facial bearing 234. The facial bearing 234 helps isolate the rotation of the radial collar 232 with the input shaft 194 from the load cell 200. The facial bearing 234 is supported by a mount 236, which may itself be mounted on a bearing on the input shaft 194. The front surface 237 of the mount 236 may engage the rear surface of the load cell. A retaining collar 238 is mounted on the input shaft 194 and is held in axial position against the radial collar 232 by a retainer 240 and snap ring washer 242. This compressive component 225, made up of elements described herein that apply a load to the load cell, acts to transmit the load applied to the input shaft to the load cell.

The compression applied to the load cell 200 is derived, in one embodiment, from the cable pulling on the input shaft 194 as the cable system is tensioned. As the input shaft is pulled to the left (in the orientation of FIG. 6), the compressive component 225 applies a load to the load cell 200. In more detail of this particular example, the snap ring washer and retainer 240 apply a force in that direction to the retaining collar 238, which in turn applies a load in that direction to the radial collar 232, which in turn applies a load in that direction to the facial bearing 234 and mount 236, which in turn apply the load in that direction to the load cell 200. The load cell abuts on its front surface the shoulder structure 218 of the piston 196, and is thus compressed between the load applied as described above and the shoulder structure 218. The piston 196, being locked to the housing by the structure described herein, provides a solid base against which the load cell may be compressed. The load cell creates a signal indicative of the load (cable tension) and transmits that signal along line 230 to the control system 128 for storage, display, analysis and/or possible control of the nut runner and tensioning tool.

Various other structures may be employed to create the compressive component 225 to apply a load to the load cell 200 and allow the input shaft 194 to rotate. For instance, and in a non-limiting manner, the retaining collar 238 may be circumferentially mounted on the input shaft, similar to the radial collar 232. It may turn with the input shaft or be rotationally independent of the input shaft. It may extend all or partially through the input shaft, as shown, acting in part as a pin, as a manner of mounting on the input shaft. The radial collar 232, facial seal 234, and/or other components may also not be included. Also, the axial collar 226 may be axially movable relative to the piston walls and be operably associated with the retaining collar 240 and snap ring 242 and be loaded thereby (ultimately by the tension load on the input shaft as described above) and in turn apply a load, along with or separate from the mount 236, to the load cell 200. The axial collar may also be cup-shaped and rotatably mounted on the input shaft, and axially movable with respect to the piston walls, with the mount 236, facial bearing 234 and radial collar 232 mounted relatively within the cup. When the load is applied through the retaining collar to the radial collar, the facial bearing and to the cup-shaped axial collar, the bottom of the cup-shaped axial collar may apply the compressive load to the load cell 200. Further, all of the structure described above may not be required to create the resulting load on the load cell. Additionally, other structure may be added if desired.

The compressive component 225 may also include, in another example, the radial collar 232, mount 236 and any additional structure retained on the input shaft in an axial location by a pin positioned through the input shaft. When the tension is applied to the input shaft, the pin holds the compressive component 225 in axial position on the input shaft in order to apply the tension load to the load cell. The compressive component 225 that engage the load cell 200 may be positioned annularly around the input shaft to engage the load cell 200 about its annular shape. The portions of the compressive component that are inside the axial collar 226 may rotate with the input shaft, or may not rotate with the input shaft.

As can be appreciated from the above description, the structure of the compressive component 225 associated with the piston assembly and input shaft 194 may have many forms different than that described above to perform the same or similar function of allowing the input shaft to rotate relative to the piston, and apply a load to a load cell for measuring the tension in the cable system during the tensioning process. Further, the load cell 200 may be positioned in the main body, and operably associated with the main body or piston 196 in other orientations to measure the load. The load cell may also be replaced with another type of load sensor that works to measure load in either compression, tension, lateral deflection or the like.

The rear end 208 of the input shaft 194, as mentioned above, is arranged to engage the drive end of the nut runner 122, and may axially slide there along as needed when the input shaft 194 is moved axially, as explained below. The particular engagement arrangement of the nut runner 122 and the input shaft is not critical to the nature of the invention described herein.

Continuing to refer to FIG. 6, a return spring 244 is positioned in the second portion 146 of the housing 134 to urge the piston 196 forwardly in the housing 134. In this instance the spring 244 is positioned between a portion of the nut runner 122 fixed by a snap washer 245 to the rear of the housing 134, and the axial collar 226. The return spring 244 compresses as the input shaft 194 and piston 196 are moved axially rearwardly, and continually biases the piston 196 and input shaft 194 forwardly. This forward biasing force will be described in more detail hereafter.

Figure 7:
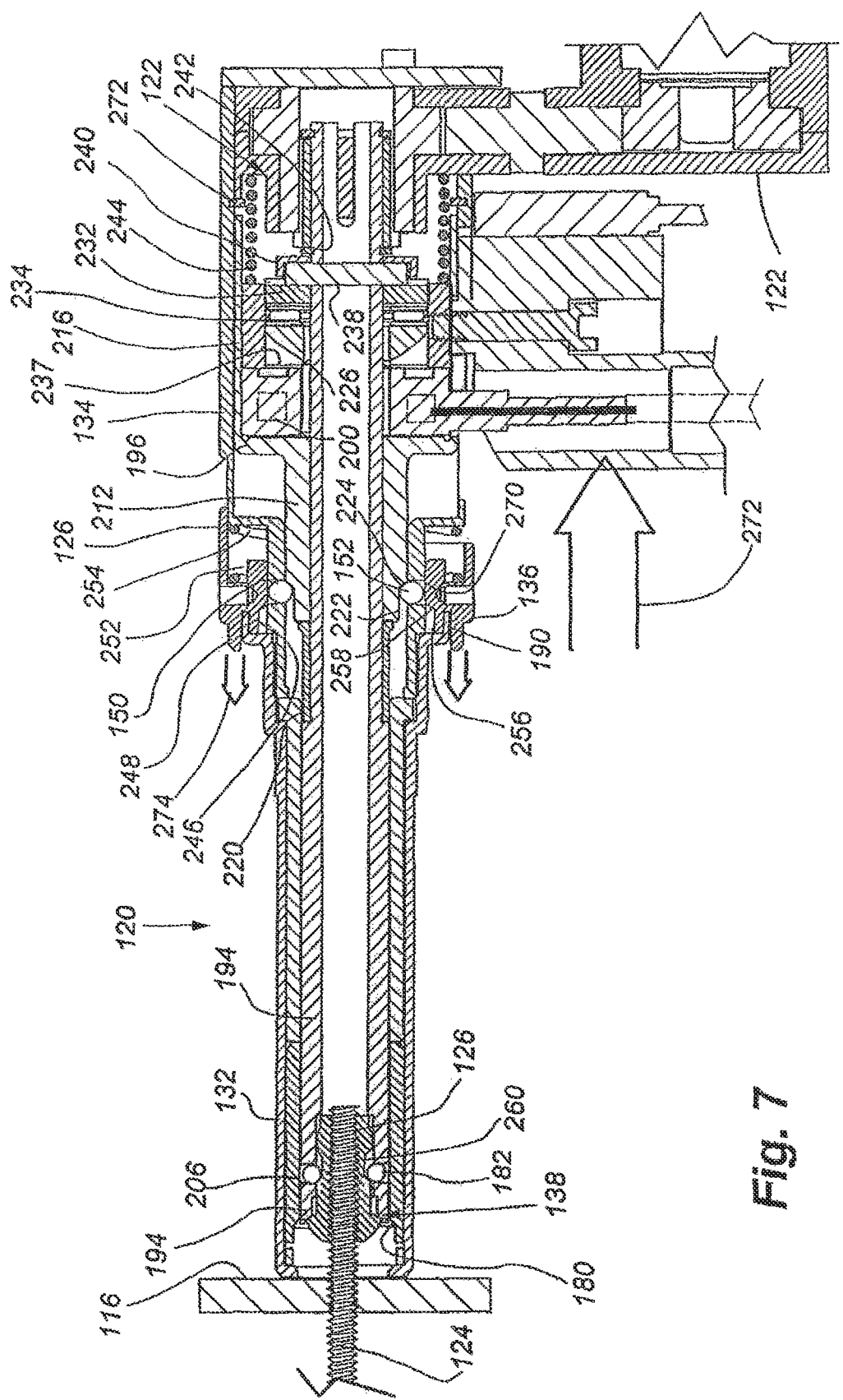
FIG. 7 is a section view similar to that of FIG. 6, but after the input shaft and piston assembly have been moved rearwardly into the barrel and housing, causing the release ring to move forward and actuate the locking mechanism to form a rigid mechanical column structure.

Referring still generally to FIGS. 5-8, and particularly to FIG. 7 for clarity, the release ring 136 is positioned around the front portion 142 of the housing 134 and moves axially on the along the front portion 142. The release ring 136 includes an annular inner lip 246 and an annular outer lip 248 extending forwardly, with a gap 250 formed there between (See FIG. 6). The gap 250 receives the rear lip 190 formed on the barrel 132. An annular recess 252 is formed facing rearwardly to receive and seat the front end of the release spring 254. The rear end of the release spring 254 engages the outer shoulder 148 of the housing 134. A rear portion of the release ring 136 extends over and moves relative to the second portion 146 of the housing 134 to help contain the release spring 254. The radially inward surface 256 of the inner lip 246 acts to retain the locking ball 152 in the aperture 150 in the first portion 142 of the housing 134. A cam or shoulder surface 258 is formed around the base of the inner lip 246 to encourage the locking ball 152 to move radially inwardly through the aperture 150 as the release ring 136 is moved forward relative to the housing 134, as is described below.

The release mechanism, in this instance a release ring 136, may move from a forward position to a rearward position along the front portion 142 of the housing 134. The release spring 254 biases the release ring 136 towards the forward position. In the forward-most position, the release ring abuts the annular lip 190 on the barrel 132. (See FIG. 7). The release ring 136 may also take the form of a lever or other structure not in the form of a ring or circle.

The input shaft 194 is operably engaged with the piston 196 to move the piston rearwardly when the input shaft 194 moves rearwardly (toward the nut runner 122). The input shaft 194 may be operably engaged with the piston 196 to move the piston forwardly upon forward movement of the input shaft 194.

The operation of the tensioning apparatus 120 is now described with respect to FIGS. 5-8. After the nut 126 is threaded onto the end of the threaded rod 124 as described above, the nut 126 is positioned in the end effector 138 and is engaged with the input shaft 194 to be turned by the input shaft as the input shaft is turned by the nut runner 122. Prior to insertion of the nut 126, the tensioning apparatus appears in the ready state shown in FIG. 5. In the ready state, the input shaft 194 is positioned forwardly in the barrel 132 with the end effector 138 positioned and ready for insertion of the nut 126. In this forward position, the piston 196 is in its forward-most position with the outer shoulder 218 engaging the inner shoulder 148 of the housing 134. The release ring 136 is in its rearward most position, with the locking balls 152 moved by the outer surface of the first portion of the piston 196 to their radially-outermost positions in the respective apertures 150 in the first portion 142 of the housing 134 and bounded by the inner-lip 246 of the release ring 136. The release ring 136 may not move any more forwardly because of the locking balls 152, which engage the cam surface 258 of the release ring 136. Since the locking balls 152 are held in position by the walls of their respective apertures 150, the locking balls 152 keep the release ring 136 from moving forward under the force of the release spring 254. The return spring 244 in the housing 134 is in the extended position. In this embodiment, the rear end of the input shaft 194 is in engagement with the nut runner 122.

FIG. 6 shows the tensioning tool 120 positioned over the nut 126, and specifically the nut 126 being received in the end effector 138. This is performed manually, or may be performed automatically with the appropriate automated equipment. In this position the tensioning tool 120 stays in the ready state. Note that the nut 126, in this embodiment, defines a circumferential groove 260 for receiving the nut engaging balls 182 in the end effector 138. When positioned in the end effector 138, the groove 260 in the nut 126 is radially aligned with the nut engaging balls 182. The arrow 262 represents the movement of the tensioning tool 120 towards the bracket 116, which may occur at this time.

FIG. 7 shows the nut 126 and the end effector 138 having been pushed into the barrel 132. This movement is performed manually by an operator grasping the threaded rod 124 and pushing the threaded nut 126 into the tensioning tool 120 a certain amount. It may be performed automatically, also, with the appropriate automation device. Moving the nut 126 further into the tensioning device 120 has at least two purposes. First, it causes the end effector 138 to engage the nut 126 in the input shaft 194 and retain it there both axially and rotationally (the end effector 138 has a recess having a complementary shape to the shape of the nut 126). Second, the rearward movement of the input shaft 194 actuates the locking device 198 to firmly engage the piston 196 in the retracted position with the barrel 132 and housing 134, forming the rigid structure against which the tension of the system, created by the cable pulling on the input shaft 194, is measured during the tensioning step. Also, by moving the nut 126 away from the equalizer bracket 116, the tension load measured is substantially isolated from the normal forces on the face of the nut that would affect that measurement if the nut 126 was in engagement with the equalizer bracket 116.

Referring still to FIG. 7, the nut 126 is withheld by the end effector 138 by at least one nut engagement ball 182 that is held in engagement with a groove 260 in the nut 126. As the nut 126 is moved rearwardly, the nut engagement ball 182 moves through the aperture 206 in the front end of the input shaft 194. As the ball 182 and the input shaft 194 move rearwardly relative to the barrel 132 and housing 134, the cam surface 180 on the front collar length 168 helps urge the ball 182 radially inwardly through the apertures 206 and into the groove 260 in the nut 126. The ball 182 is held in this engaged position with the nut 126 by the internal surface of the front collar length 168 of the barrel 132. In this way, when the input shaft 194 is moved rearwardly into the barrel 132, the nut 126 is releasably engaged with the end effector 138 and the nut 126 then moves axially and rotationally with the input shaft 194. The distance the nut 126 must be moved into the end effector 138 to cause engagement is generally the relief distance. The relief distance may be that distance which the nut 126 must travel, after the brake system has been tensioned, in order for the brakes shoes or calipers to release from the drums or discs (respectively) to allow the wheels to turn freely. Alternatively, the control system 128 may instruct the nut runner to lessen the tension by appropriately rotating the nut along the threaded shaft 124.

Still referring to FIG. 7, the rearward movement of the input shaft also causes the piston 196 (and piston assembly 154) to move rearwardly in the tensioning tool 120. The input shaft 194 causes the spacer collar 220 to move, which in turn causes the piston 196 to move rearwardly. The piston 196 moves rearwardly in the housing 134, compressing the return spring 244. The rearward movement of the piston 196 also moves the front portion 212 of the piston 196 rearwardly relative to the locking ball 152 held in the release ring 136. As the front portion 212 moves rearwardly, the recess 222 formed therein moves under the locking ball 152 (or balls). The locking ball 152, while positioned in the recess 222 and engaging the outer surface of the front portion 212 of the piston 196 and the shoulder 224 of the recess 222, moves from engaging the cam 258 on the release ring 136, which was keeping it in its rearward most position. As the locking ball moves radially inwardly, encouraged by the angular force applied by the cam 258 on the locking ring 136, the locking ball 152 moves through the aperture 150 into the groove 222 on the front portion of the piston, and out of interfering engagement with the release ring 136. The release spring 254 then biases the release ring 136 forwardly on the front portion 142 of the housing 134 to the release ring's forward-most position. In this forward-most position, the axial lip 190 on the rear of the barrel 132 is received in the annular recess 250 between the radially inner 246 and outer lips 248 at the front end of the release ring 136, thus prohibiting the release ring 136 from any further forward motion. This brings the inner retaining wall 270 of the release ring 136 into engagement with the locking ball 152, which then holds the locking ball 152 against the piston 196. At this location, the piston 196 is biased forward, so the shoulder 224 at the border of the recess 222 is pushed into engagement with the portion of the locking ball 152 extending radially inwardly from the aperture 150, thus keeping the piston 196 from moving any further forwardly. The piston 196 thus may not move any further forwardly relative to the barrel 132 or housing 134, and is fixed axially relative to the input shaft 194. The piston walls 216, at this position, are sized to engage in physical interference at or near the end of the housing, but may not be required to. In this embodiment, the interference is caused by a snap ring 245 positioned in the inner wall of the housing 134 at the appropriate location, used to hold a portion of the drive means 122 in location in the housing 134. Note, at this position, if the piston walls 216 were of shorter length, the input shaft 194 and piston 196 may be pushed further into the barrel and housing if desired, but need not be.

The release ring 136, forward portion of the housing 142, locking balls 152 and the forward portion 212 of the piston 196 combine to create a mechanical locking system 198. This mechanical locking system 198 converts the relative movement between the barrel 132 and housing 134 with the piston 196 into a rigid column. This mechanical locking system 198 works automatically under the spring bias of the release spring 254 primarily in operative association with the release ring 136. Once the input shaft 194 and piston 196 are pushed far enough rearwardly into the barrel 132 and housing 134, the locking mechanism 198 engages to automatically to form the rigid column between the housing 134, barrel 132 and piston 196. The rigid column allows the tension of the cable system to be measured directly through a rigid mechanical structure by the load cell with no reliance on an incompressible fluid system, such as hydraulics, or high-pressure pneumatics, and the associated support equipment and maintenance. The arrow 272 in FIG. 7 shows the relative motion of the input shaft 194 and piston assembly 154. The arrow 274 shows the relative motion of the release ring.

In this locked mechanical column system shown in FIG. 7, the load on the cable system is measured by the load cell 200 positioned between the now anchored inner shoulder 218 of the piston 196 and the compressive component 225, including in one embodiment the collar 238 mounted near the inner end of the input shaft 194. As the system is tensioned (as explained below), the cable 106 pulls the nut 126, which pulls the end effector 138, which pulls the input shaft 194, which pulls the collar 238 (and the elements of the compressive component 225) to effectively compress the load cell 200. The compression of the load cell 200 is communicated to the control system 128 and translated to a tension load, which data is used by the control system 128 for display and to control the nut runner 122 and possibly other equipment.

The cable system, as described above regarding FIG. 7, may now be tensioned with the tensioning tool 120. At this position, the control system 128 may send control signals to the nut runner 122, which rotates the input shaft 194, and thus rotates the nut 126 on the threaded rod 124. As the input shaft 194 is rotated, the piston 196 may not be rotated. In the embodiment described herein, the collar 238 in engagement with the facial seal rotates with the input shaft 194. As the threaded rod 124 is pulled through the nut 126, the tension increases in the brake cable system. As the tension increases, the load cell 200 senses the load by being compressed by the compressive component and transmits signals to the controls system 128 to monitor the load (tension) in the brake cable system. Once the appropriate tension load is achieved, and the tensioning act is completed (more than one series of tensioning can be accomplished at this stage by controlling the nut runner 122 to increase and decrease tension as desired), the nut runner 122 may be deactivated. During tensioning, the tensioning tool may engage the bracket 116, such as at its front end as shown in FIG. 7, against which to react during the tensioning step. The tensioning tool 120 may be engaged against another fixed or anchor surface whether or not directly in contact with the bracket 116.

Figure 8:
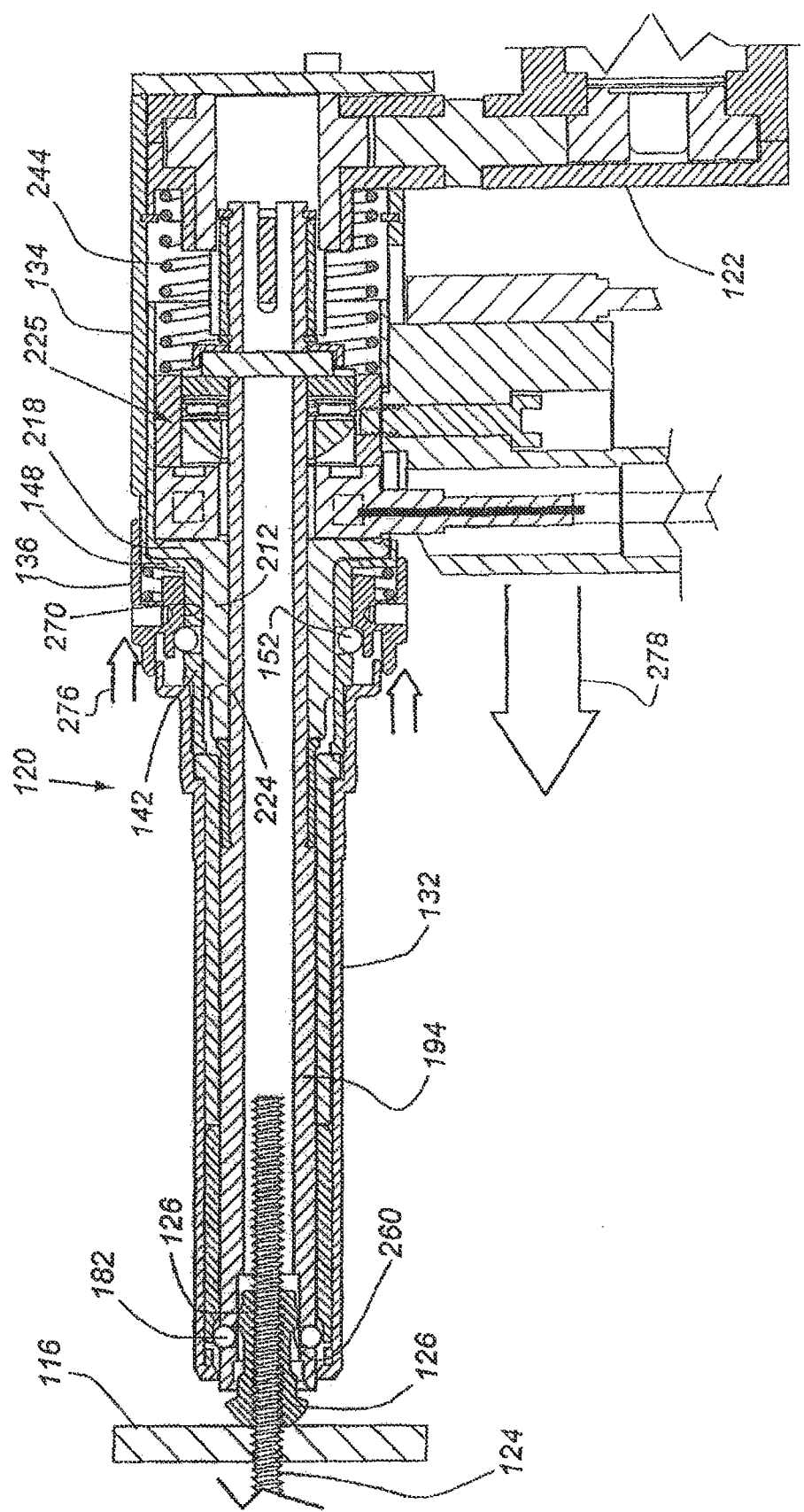
FIG. 8 is a section view similar to that of FIG. 7, but after the nut runner has been actuated to rotate the input shaft to turn the nut up the threaded rod and tension the associated cable system.

After tensioning is complete, the tensioning tool 120 may be released from the nut 126. This is shown in FIG. 8. To release the nut 126 from the tensioning tool 120, the release ring 136 is slid rearwardly (arrow 276) on the first portion 142 of the housing 134. This disengages the inner retaining wall 270 of the release ring 136 from the locking ball 152, and allows the locking ball 152 to move radially outwardly, being urged radially outwardly by the cam surface 224 on the forward portion 212 of the piston. As the locking ball 152 moves radially outwardly, it disengages from the cam surface 224 on the piston 196, and thus allows the piston 196 to move further forwardly in the tool 120, along with the input shaft 194. The piston 196 moves forwardly far enough to cause the outer shoulder 218 of the piston 196 to engage the inner shoulder 148 of the housing 134. This forward movement of the piston 196, if not caused by the tension in the cable system pulling the nut 126 and the input shaft 194 towards the equalizer 116 (typically the tensioning step is performed with the end of the barrel of the tool in engagement with the equalizer), is effected by the return spring 244 pushing the piston 196 forwardly in the housing 134.

As the piston 196 moves forwardly in the housing 134, it pushes the input shaft 194 forwardly also. The input shaft 194 is pushed forwardly far enough to allow the nut engagement balls 182 to release from engagement with the nut 126 (by being forced radially outwardly through the apertures 206 in the forward end of the input shaft 194 by the cam surface at the border of the groove 260 on the nut), thus allowing the nut 126 to be removed from the end effector 138. This is shown in FIG. 8. In the position shown in FIG. 8, once the nut 126 is removed, it is the initialized state as shown in FIG. 5. The tool 120 is ready to be attached to another brake system for the tensioning operation. The arrow 278 in FIG. 8 shows the relative motion of the piston 196, input shaft 194, and piston assembly 154 upon activation of the release ring 136, all relative to the housing 134 and barrel 132.

The method in which the tool 120 is used includes the acts of engaging the nut 126 in the tool 120, causing the nut 126 to be rotationally engaged with the tool 120, causing the tool 120 to be in an orientation facilitating tensioning the brake cable system with a mechanically rigid structure formed by the tool 120 (these last two acts may occur simultaneously, as described herein, or may occur non-simultaneously with one occurring before the other); causing the tool 120 to tension the brake cable system, and causing the tool 120 to release the nut 126 from the tool 120. The nut 126 may be positioned manually in the tool or by an automated machine. The release ring 136 may be operated manually or by an automated machine.

FIGS. 9a and 9b are an exploded view of the brake tensioner shown in FIGS. 5-8. FIG. 9a, with reference to the descriptions of FIGS. 5-8, shows the barrel 132, washer 192, front collar length 168, release ring 136, input shaft 194, rear collar length 176, spacer collar 220, release spring 254, and housing 134. FIG. 9b, as a continuation of FIG. 9a, shows the piston 196, load cell 200, radial collar 232, axial collar 226, return spring 244, snap ring 245, and nut runner 122 with components.

Figure 10:
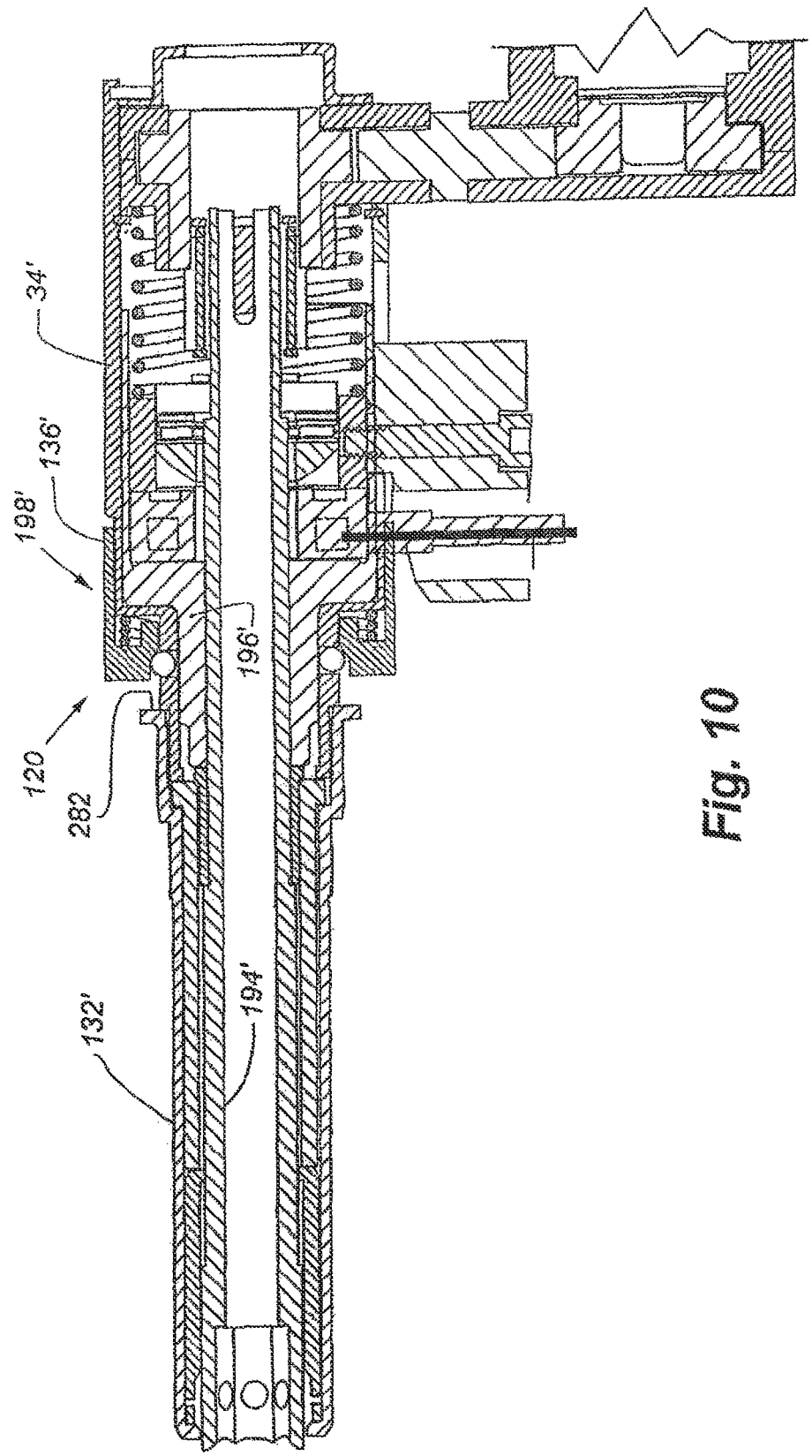
FIG. 10 shows a section view similar to that of FIG. 5, for another example tensioning tool, where the release ring has a different structure for engaging the barrel in its forward-most position.
Figure 11:
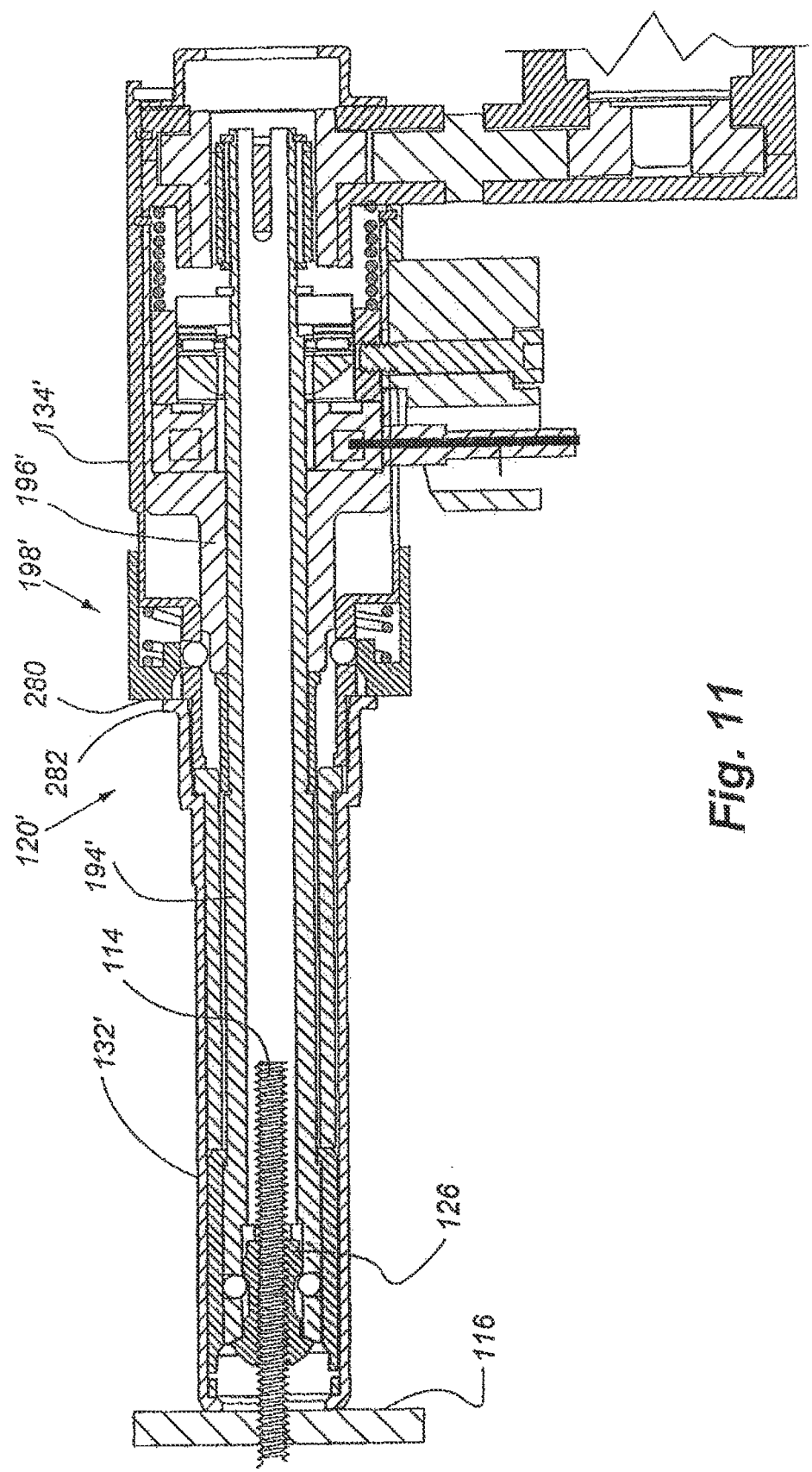
FIG. 11 shows a section view similar to that of FIG. 8, for the tensioning tool shown in FIG. 10, with the nut positioned in the end effector and having been run up the threaded rod to tension the associated emergency brake cable system.

FIGS. 10 and 11 show another example of the tensioning tool 120 earlier described, prior to engagement with the nut (FIG. 10) and after the tensioning step, but before disengagement from the nut (FIG. 11). The tool 120 works in much the same way as that described with respect to FIGS. 5-8 above. The barrel 132 and body 134 are rigidly attached together, and the input shaft 194 and piston 196, with its accompanying structure (load cell 200, washers, etc.) are situated in the barrel 132 and housing 134 in order to move relative thereto. The release ring 136 acts to cause the mechanical locking mechanism 198 to actuate, and releases the mechanical locking mechanism 198 similarly to the previous embodiment. The release ring 136, in this example however, does not have a forwardly extending lip, nor does the barrel 132 have a rearwardly extending lip, as the previous embodiment does. Instead, the front edge 280 of the release ring 136 is relatively flat and abuts a flange 282 on the rearward end of the barrel 132 to denote the forward-most extent of the release ring's movement. The engagement of the nut, formation of the rigid column, tensioning, and disengagement of the nut, are all similarly accomplished in this example.

In other examples, the housing of the tool encloses a tensioning assembly that does not move axially relative to the housing, and instead is axially stationary therein during connection with the cable system, tensioning the cable system, and releasing the cable system. The tensioning assembly moves in a rotational manner about the longitudinal axis of the tool. Two examples of such a tool are described below.

The examples of these tools work with the control system as described above as with the previous examples, and may be utilized with a threaded rod, nut, and equalizer structure, also all as described above.

Figure 12:
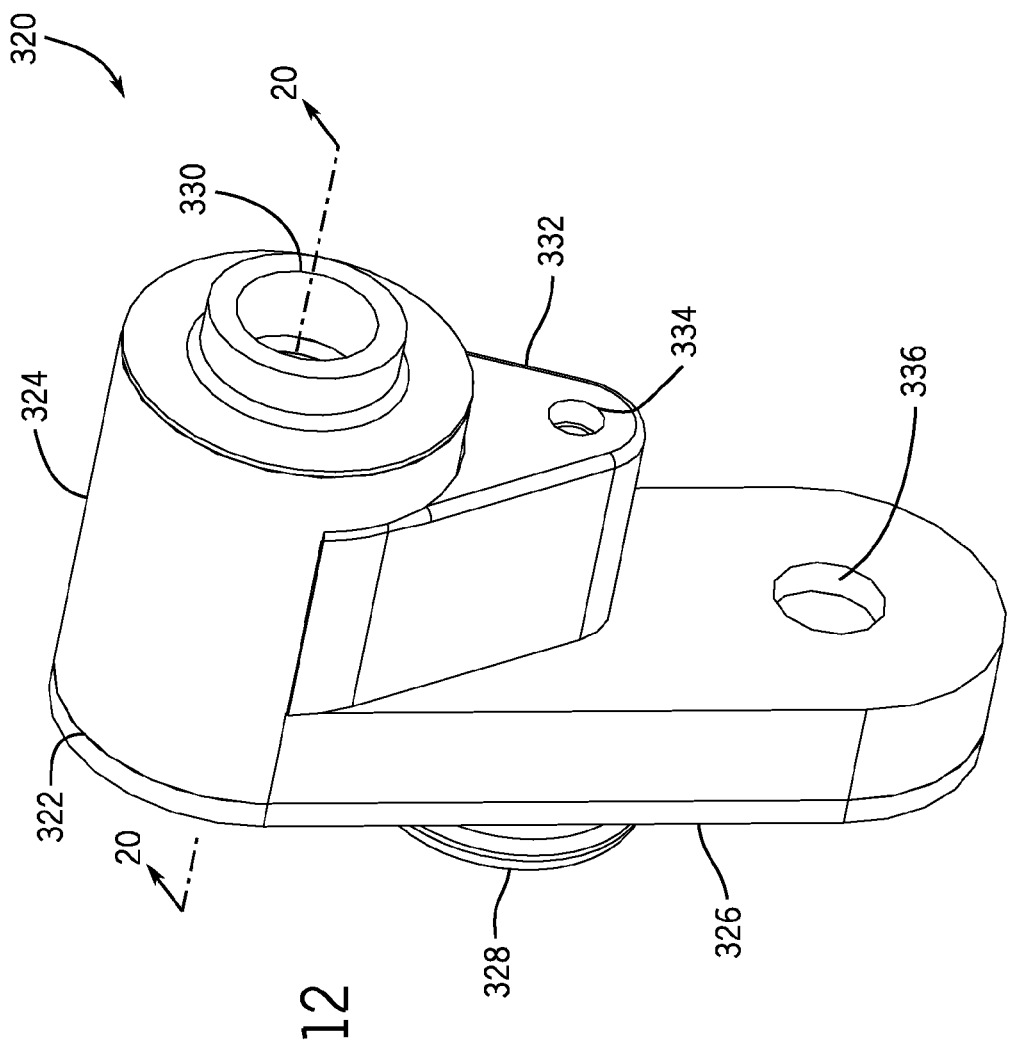
FIG. 12 shows a front perspective view of a tensioning tool of another example.
Figure 13:
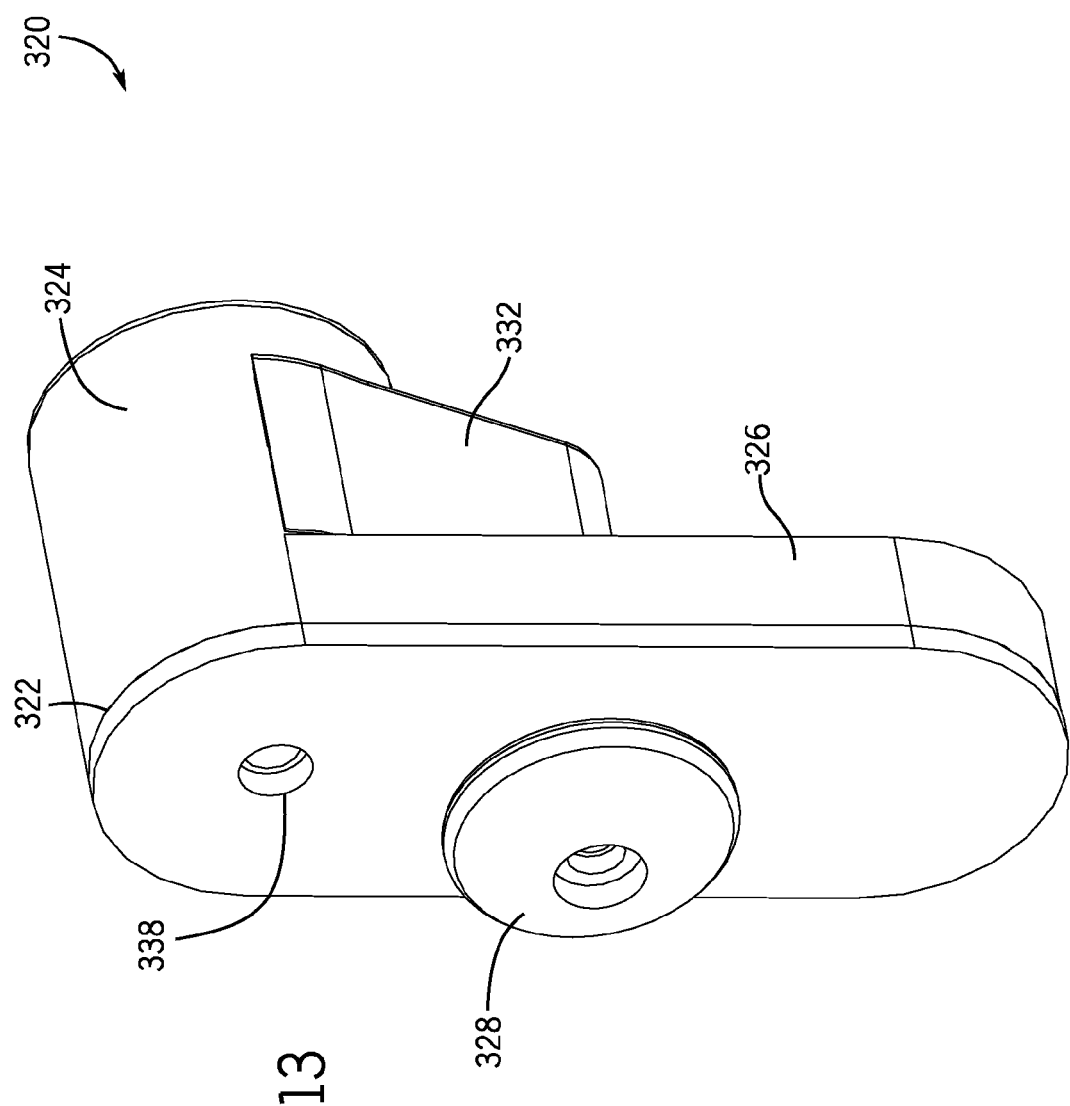
FIG. 13 is a rear perspective view of the tensioning tool of FIG. 12.

FIGS. 12-22 show different aspects of another example of a tensioning tool 320. FIGS. 12-13 show the tool 320 having a housing 322 with a front portion 324 and a rear portion 326. The front portion 324 encloses a load measuring structure and a nut engagement feature to secure the end of the threaded rod 124 to the front end of the front portion 324. The rear portion 326 extends downwardly from the rear of the front portion 324, and encompasses a gear structure for engagement with the nut runner 122 to drive the rotational movement of the load measuring structure within the front portion 324. An actuator button 328 on the rear of the rear portion 326 allows a user to secure and release the threaded rod 124 from the tool 320 as explained below.

With specific reference to FIG. 12, the front portion 324 defines a front aperture 330, through which the nut 126 and an end of the threaded rod 124 are inserted to be secured in the tool 320. A sub-housing 332 extends down from the front portion 324 and defines another aperture 334. This aperture 334 receives a fastener 398, such as a screw, to secure the sub-housing 332 with the end of an actuator or push rod 397 (see FIGS. 20-22). The other end of the push rod 397 is attached to the actuator button 328. The triangular housing 332 moves when the push rod 397 is moved, and causes the engagement and release of the nut 126 within the aperture 330 of the front portion 324, as described in greater details below. The aperture 336 shown in the downwardly extending rear portion 326 may receive a portion of the nut runner 122 when attached to the tool 320.

FIG. 13 shows a rear perspective view of the tensioning tool 320, which shows a rear aperture 338 to receive an end of the threaded rod 124 in the event the nut 126 is threaded down sufficiently on the rod 124 to require the free end of the threaded rod 124 to extend there through. The actuator button 328 is also shown, which when depressed forwardly (in FIG. 16, into the page in the axial direction of the front portion), the actuator button 328 moves the triangular sub component 332 in the same direction.

Figure 14:
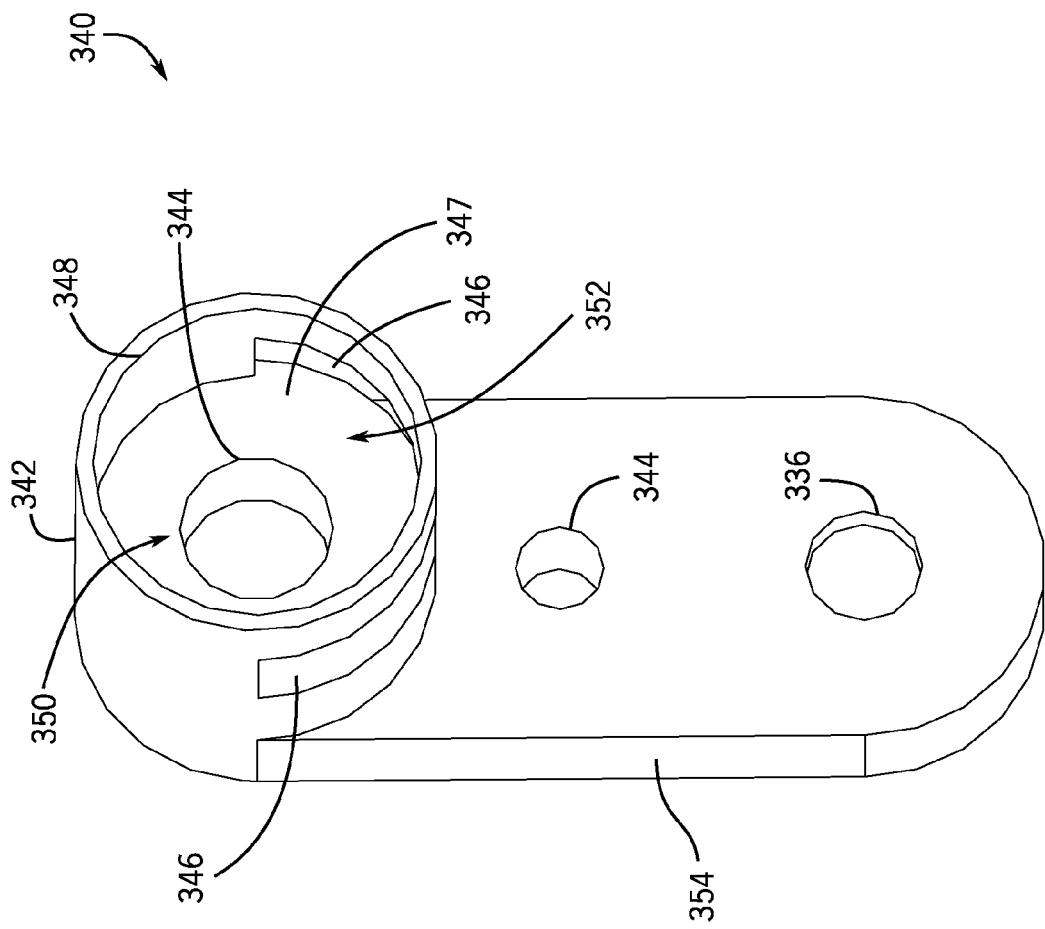
FIG. 14 shows a portion of the housing of the tensioning tool of FIG. 12.

FIG. 14 shows a load cell component 340 that makes up part of the front housing 324 and downwardly descending rear housing 326. The top portion 342 of the load cell component 340 is circular in cross section, and defines a central aperture 344 for rotatingly receiving an input shaft 380 (see FIGS. 20-22) that rotates to turn the nut 126 on the free end of the threaded rod 124. The slot 346 that extends around a portion of the forwardly-extending cylindrical rim 348 associated with the top portion 342 facilitates the axial movement of the triangular sub-housing 332 as it moves fore and aft. The intermediate aperture 344 receives the push rod 397 attached to the actuator button 328 to move the triangular sub housing 332. The lower aperture 336 is the same aperture 336 as shown in FIG. 12.

Figure 20:
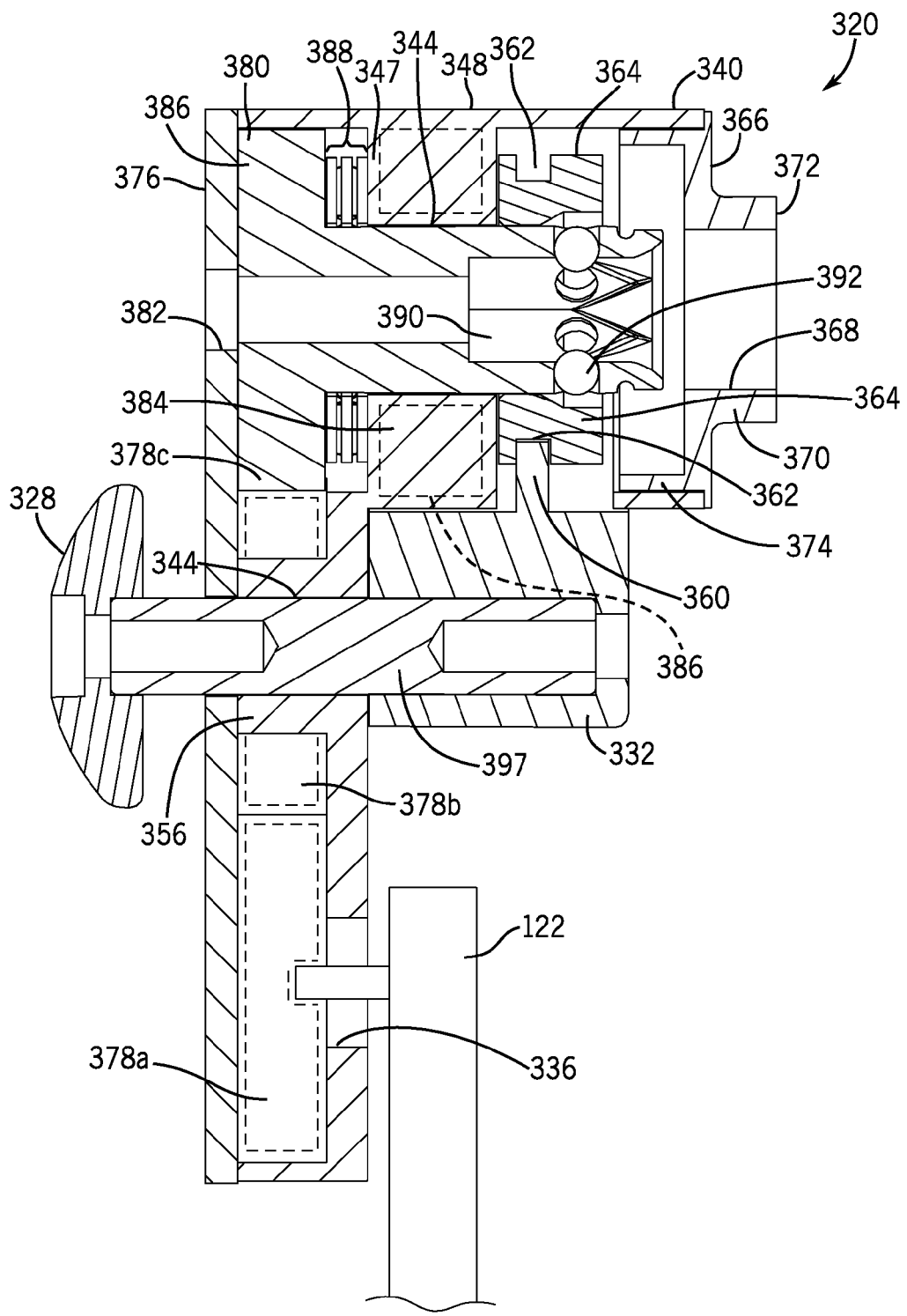
FIG. 20 shows a section view taken along lines 20-20 of FIG. 12.

Referring at least to FIG. 14 and FIG. 20, the top portion 342 of the load cell component 340 includes a central portion or wall 347 and an annular rim 348 extending from the perimeter of the central portion 347. The central portion 347 defines the aperture 344, and the annular rim 348 defines a recess 350 for receiving other components as described below. In this example, the central portion 347 is configured to integrally include an annular load cell 352. In other examples, the central portion 347 may be hollow or otherwise configured to receive a separate load cell component that would fit into a region of the central portion 347.

Figure 16:
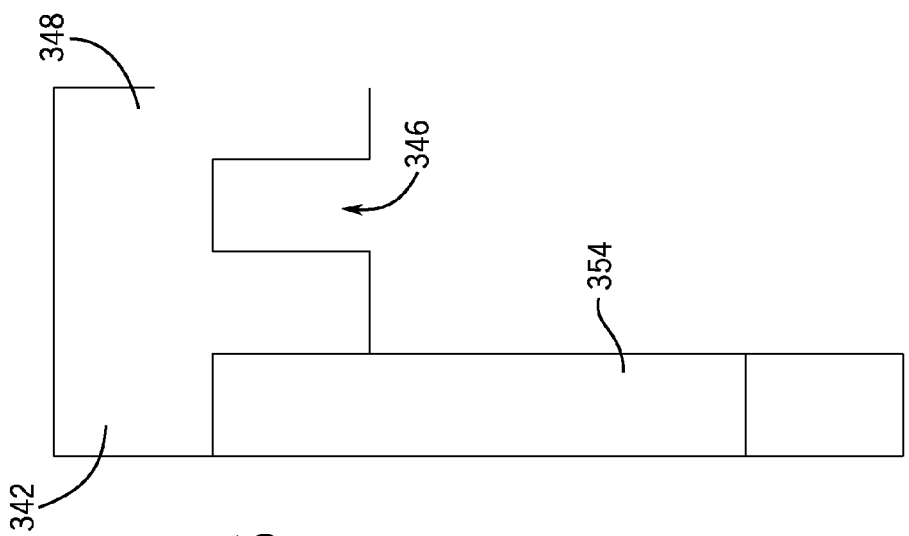
FIG. 16 shows a side elevation view of FIG. 14.
Figure 15:
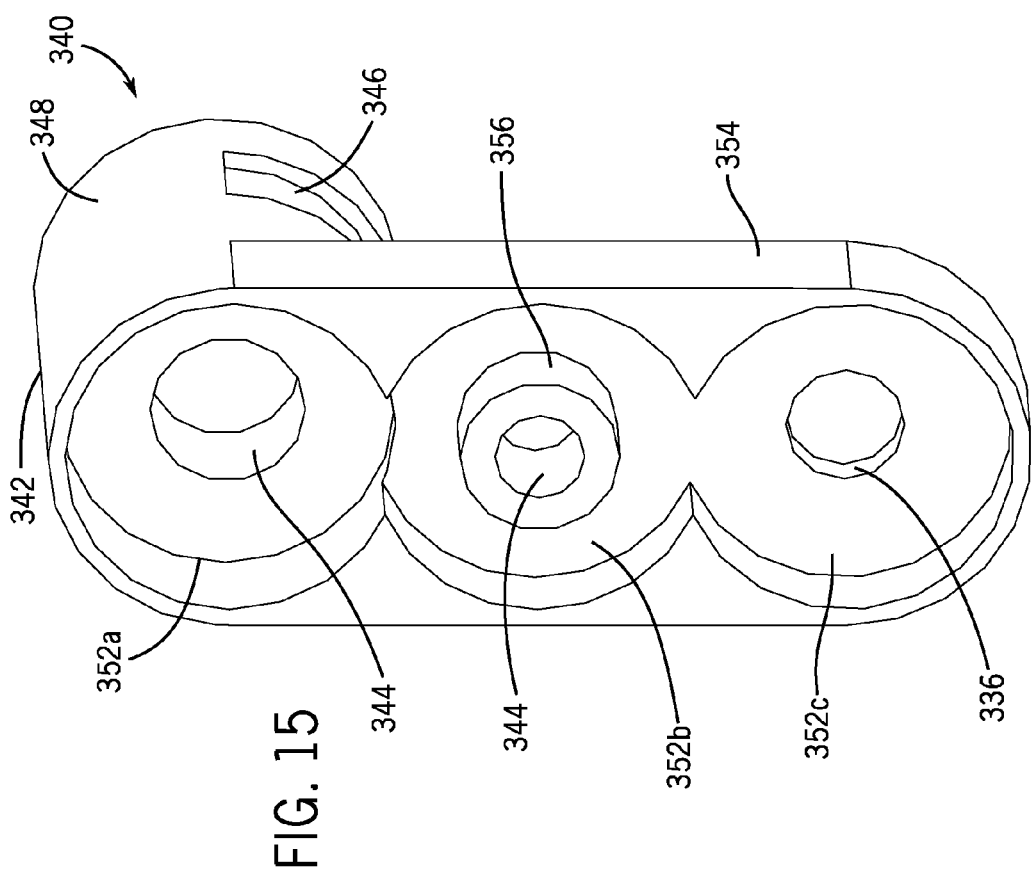
FIG. 15 shows a rear portion of the housing of the tensioning tool of FIG. 12.

FIG. 15 shows a rear view of the load cell component 340. Recesses 352a-352c are formed in a downwardly-extending leg 354 of the load cell component 340 and receive gear assemblies that engage the nut runner tool 122 and drive the rotational motion of the input shaft 380 to tension the cables 106. The recesses 352a-352c are substantially vertically aligned with one another in overlapping relationship so that the recesses 352a-352c are open to one another. In this configuration, when inserted into the recesses 352a-352c, the gear assemblies mesh with one another to transfer rotational torque from the nut runner 122 to the input shaft 380, and ultimately to the nut 126. A boss or sleeve 356 may be positioned centrally around the aperture 344 within the intermediate recess 352b to positively locate a gear assembly within the recess 352b and/or to radially separate the respective gear component from the push rod 397 (see FIGS. 20-22). Although not depicted, a boss or sleeve 356 may be included within the recess 352a. FIG. 16 shows a side view of the load cell component 340 of the tool 320.

Figure 17:
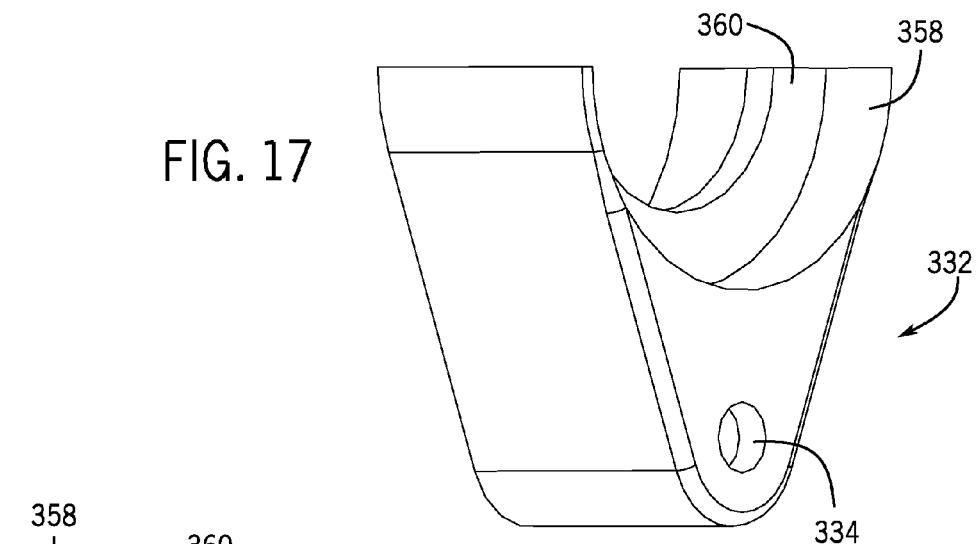
FIG. 17 shows an enlarged front perspective view of the release fork of the tensioning tool of FIG. 12.
Figure 18:
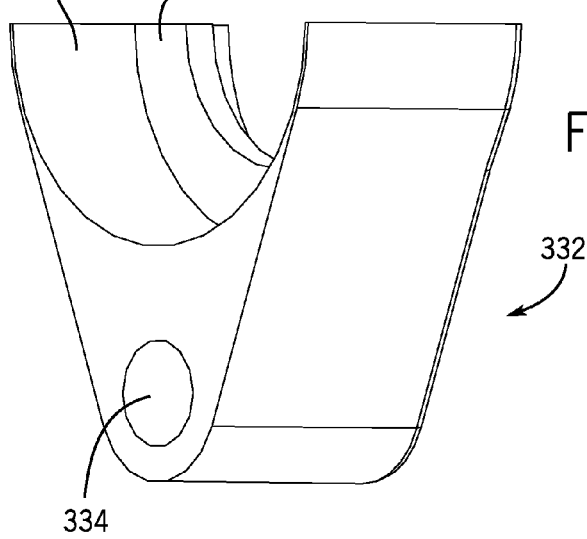
FIG. 18 shows an enlarged rear perspective view of the release fork of FIG. 17.
Figure 19:
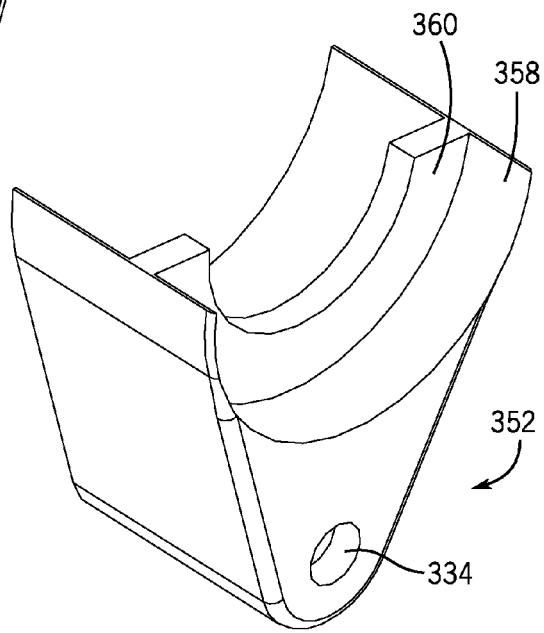
FIG. 19 shows an enlarged high-angle perspective view of the release fork of FIG. 17.

FIG. 17-19 are various views of the triangular sub-component 332 (also referred to as a release fork) of the front portion 324. The triangular sub-component 332 includes a concave outer wall 358 that generally corresponds in shape to the cylindrical rim 348 of the load cell component 340. A flange 360, which may be substantially U-shaped, extends inwardly from the concave wall 358. A described in some detail below, the sub-component 332 (which may be triangular or other suitable shapes) is actuated to move forwardly and rearwardly with the push rod 397. The flange 360 is effectively a key tab, which is received in a slot 362 in a floating sleeve 364 (see below). A key tab is a structure that fits into or with a second structure, and may cause the second structure to move under the influence of the key tab. The floating sleeve 364 is used to engage and disengage the nut 126 mounted on the free end of the threaded rod 124 from the tool 320. The substantially U-shaped flange 360 is positioned forwardly of a vertically-extending mid-line, front to back, of the triangular sub-component 332.

Figure 21:
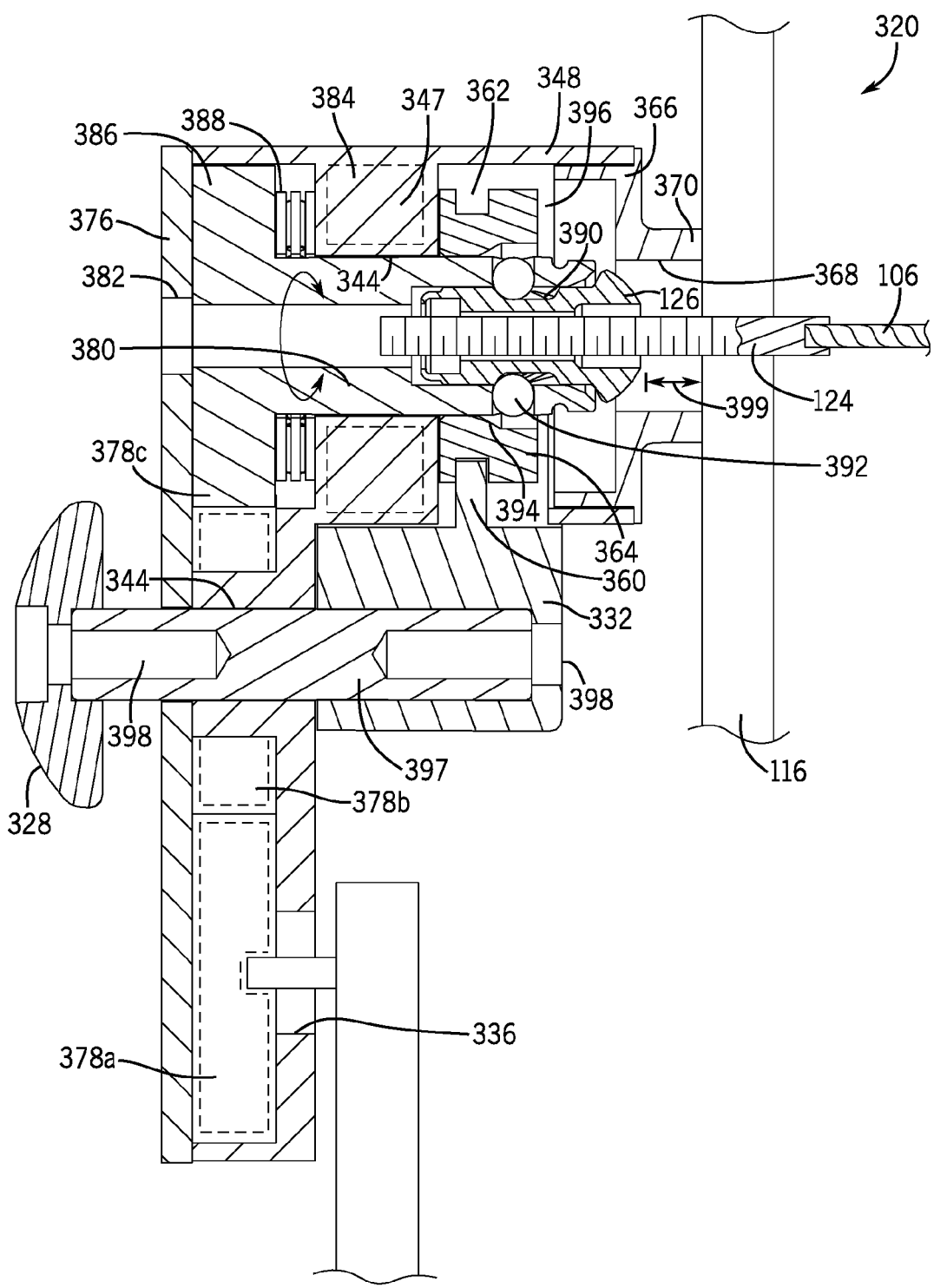
FIG. 21 shows a section similar to FIG. 20, with a nut positioned in the end effector, and the tool engaged with the equalizer.
Figure 22:
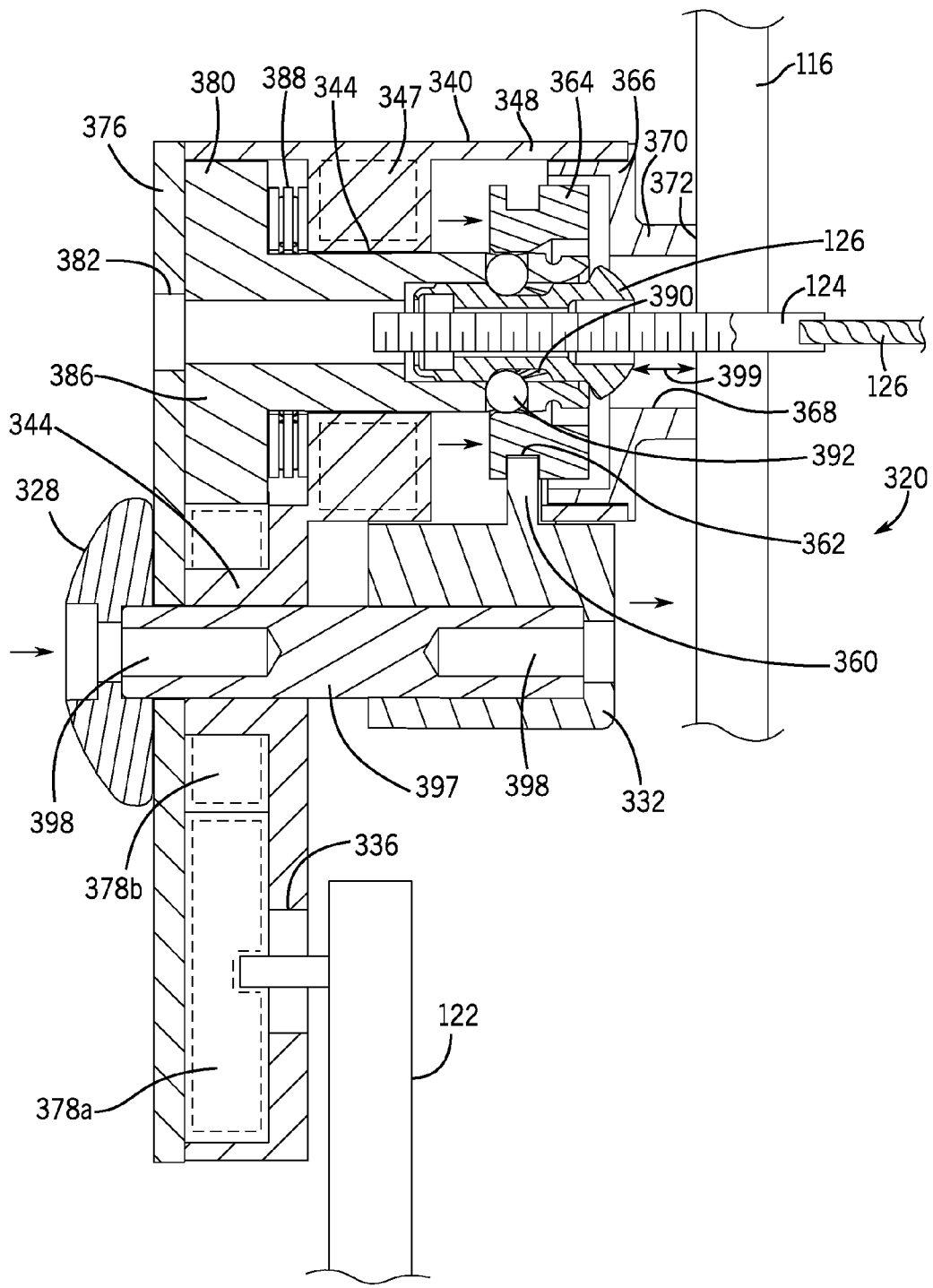
FIG. 22 shows a section similar to FIG. 21, with the nut retracted into the input shaft and being tensioned.

FIGS. 20-22 are cross sectional views of the tool 320 of FIGS. 12 and 13. The front housing 324 includes the top portion 342 of the load cell component 340 and a nose portion 366 having a central aperture 368 that is fitted to the front of the load cell component 340. The nose portion 366 includes a collar 370 extending outwardly and around to define the central aperture 368, and to form an outer rim 372 against which the equalizer 116 is positioned during use. A flange 374 extends inwardly of the nose portion 366 to be received inside the outer rim 348 of the front end of the load cell component 340. The flange 374 and rim 348 are secured together, such as by being press fit, threaded, glued, welded, or otherwise assembled. Such assembly may be in a manner allowing the nose portion 366 to be removed if desired. A back cover 376 is attached to the rear of the front and rear portions to cover the recesses 352a-352c in which the gear mechanisms 378 are positioned to drive the input shaft 380. The back cover 376 includes an aperture 382 aligned with the central aperture 344 of the front portion 342. The back cover 376 may be removable.

Referring still to FIG. 20, the input shaft 380 is rotatably received through the central aperture 344 of the housing for the load cell 384, as well as through the load cell component 340. While the load cell component 340 includes an integrally-formed load cell 384 for sensing the compression caused by tension in the cable 106, as noted above, a separate load cell may be positioned in this central region (shown in dash) and have the same or similar performance. Communication lines 386 (such as wires) extend from the load cell 384 through the slot to the control system 128 for the communication of signals, etc. The input shaft 380 has a radially extending shoulder 386 at or near its rear end. The peripheral edge 378c of the shoulder 386 of the input shaft 380 engages the gear mechanism 378a, 378b driven by the nut runner 122. The nut runner 122 thus actuates the gear mechanism 378, which in turn actuates the input shaft 380 to rotate about its longitudinal axis in the central aperture 344.

A thrust bearing 388 is positioned between the shoulder 386 and the rear surface of the central portion 347 of the load cell component 340, and is loaded against the bearing 388 in a compressive manner when under tension from the cable system during use. The input shaft 380 in this example does not move axially inside the housing 322, and is instead axially secured to not move appreciably during use, as described below.

Still referring to FIG. 20, the forward end of the input shaft 380 defines the nut engagement chamber 390 having the retention ball bearings 392 as described above, and having faceted internal sidewalls to mate with the sidewalls of the nut 126. A generally annular-shaped float sleeve 364 is positioned around the cylindrical outer circumference of the input shaft 380, positioned between a front face of the central portion of the load cell 384 and the rim of the rear flange 374 of the nose member 366. The float sleeve 364 defines a circumferential slot 362 on its outer perimeter. The upwardly-extending, substantially U-shaped flange 360 on the triangular sub-component 332 is received in the slot 362. A front section of the inner diameter of the float sleeve 364 has a larger diameter, and the rear section of the inner diameter of the float sleeve has a smaller diameter, with a sloped cam-face 394 extending between the two diameters. The float sleeve 364 does not rotate with the input shaft 380. The float sleeve 364 may move axially relative to the input shaft 380.

The cam-face 394 on the float sleeve 380 is sloped forwardly and outwardly to act as a ramp. When the float sleeve 364 is moved forwardly in the cavity 396 between the front face of the central portion 347 of the load cell component 340 and the rim of the rear flange 374 of the nose 366, the ramp 394 pushes the ball bearing engagement structures 392 inwardly to fit into the groove on the nut 126 and securely receive the nut 126 in the end of the input shaft 380. This is described below with respect to FIG. 22.

A push rod (release rod) 397 is received in the aperture 344 formed in the downwardly extending rear portion 354 of the tool 320. The push rod 397, at its rear end, is mounted with an actuator button 328 that the user may push or pull. The free end of the push rod 397 is mounted to the triangular sub component 332 by a fastener 398. The push rod 397 has a length that is sufficient to allow the actuator button 328 to be pushed forwardly to the second position (generally in the direction of the front portion of the tool) which in turn pushes the triangular sub component 332 in that direction and for the same distance also. The movement triangular sub component 332 causes the float sleeve 364 to move accordingly (due the key tab 360 engagement in the slot 362 of the float sleeve 364) within the cavity 396 in the front portion of the tool 320. The key tab 360 extends through a slot 346 formed in the housing 322. This, as explained with respect to FIG. 22, locks the nut 126 in the input shaft 380.

When the push rod 397 is positioned in the first position, the actuator button 328 is spaced away from the back cover 376 of the tool 320, and the triangular sub-component 332 is positioned so that the key tab 360 has pulled the float sleeve 364 rearwardly on the input shaft 380 to release the nut 126.

Referring now to FIG. 21, the nut 126 is received in the end of the input shaft 380, and the float sleeve 364 and push rod 397 are in the first position with the nut 126 not secured in the input shaft 380. This represents the first step of the method of tensioning the park brake system utilizing this example of the tool 320. The nut 126, threaded on the end of the threaded rod 124 with the threaded rod 124 positioned through the equalizer 116, is placed into the end of the tool 320 and into the nut-receiving chamber 390 of the input shaft 380. This may be done manually by an operator, or automatically. The rim 372 of the collar 370 on the nose portion 366 is then engaged with the equalizer 116 to bear against the equalizer 116 as the tensioning steps are performed. The distance between the outer end of the nut 126 and the equalizer surface 116 against which the tool 320 rests is the relief distance 399.

FIG. 22 shows another step of the method of using the tool 320 in tightening the cables 106 of the brake system. The actuator button 328 is pushed from the first position to the second position, which moves the triangular sub component 332 forward the same amount, which in turn moves the float sleeve 364 (by way of the key tab 360 engagement within the slot 362 of the float sleeve 364). The float sleeve 364 is moved from a rear position in the cavity 396 to a forward position in the cavity 396, which in turn causes the ramp 394 to engage the ball bearings 392 and push the ball bearings 392 radially inwardly to engage the nut 126. The ball bearings 392 are held in place by the inner radius of the rear portion of the float sleeve 364 while the actuator button 328 is in the second position. The nut 126 is rotationally fixed to the input shaft 380 due to the mating faceted surfaces of the nut receiving chamber 390 engaging the corresponding faceted outer surface of the nut 126.

As explained in more detail above and below, at this point the control system 128 operates the nut runner 122 to perform the tensioning method suitable for appropriately tensioning the brake system cables 106. In this tool 320 example, the load cell 384 is compressed between the shoulder 386 of the input shaft 380 and the rear face of the central portion 357 of the load cell component 340. The load cell component 340 is a portion of the housing 322 of the tool 320, which through the nose member 366, engages the equalizer 116 to anchor the load bearing system to a fixed position against which to measure. This structure is a solid column against which the load cell 384 is compressed, and provides superior stability and repeatability in the measurements of the tensioning load applied to the cables 106 during the tensioning operation. The load cell 384 is not moved axially during this process, for instance to secure the nut 126. Instead just the floating sleeve 364 is moved relative to the housing 322, load cell 384, bearings 392, nose 366, and nut 126 to lock the nut 126 into input shaft 380. No hydraulics or pneumatics are required to actuate the tool 320, simply the manual (or automatic) actuation of the push rod 397 to engage the nut 126, and the control system's 128 actuation of the nut runner 122 to perform the tensioning steps.

Figure 23:
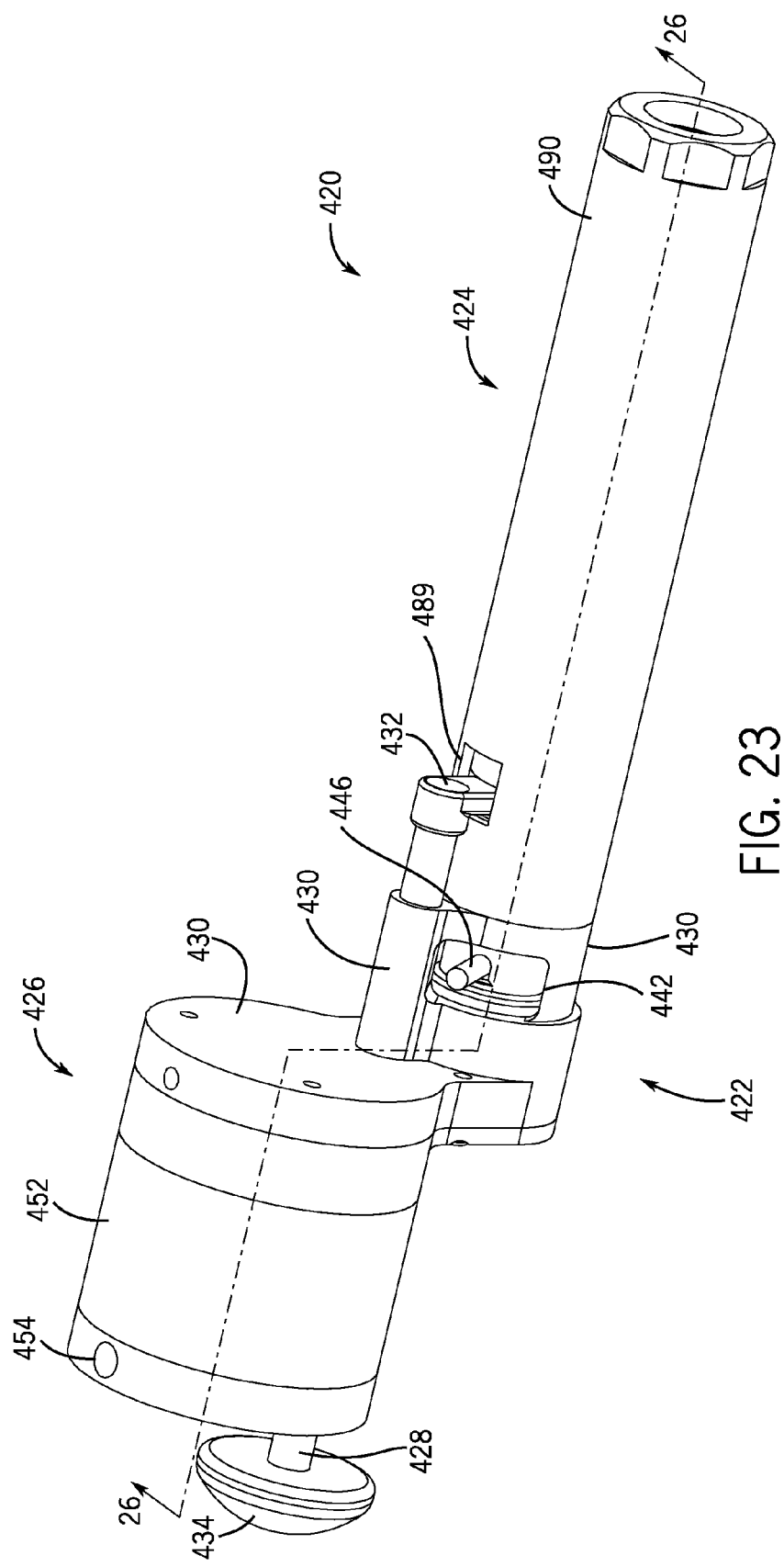
FIG. 23 shows a front perspective view of another example of the brake cable tensioning tool.
Figure 24:
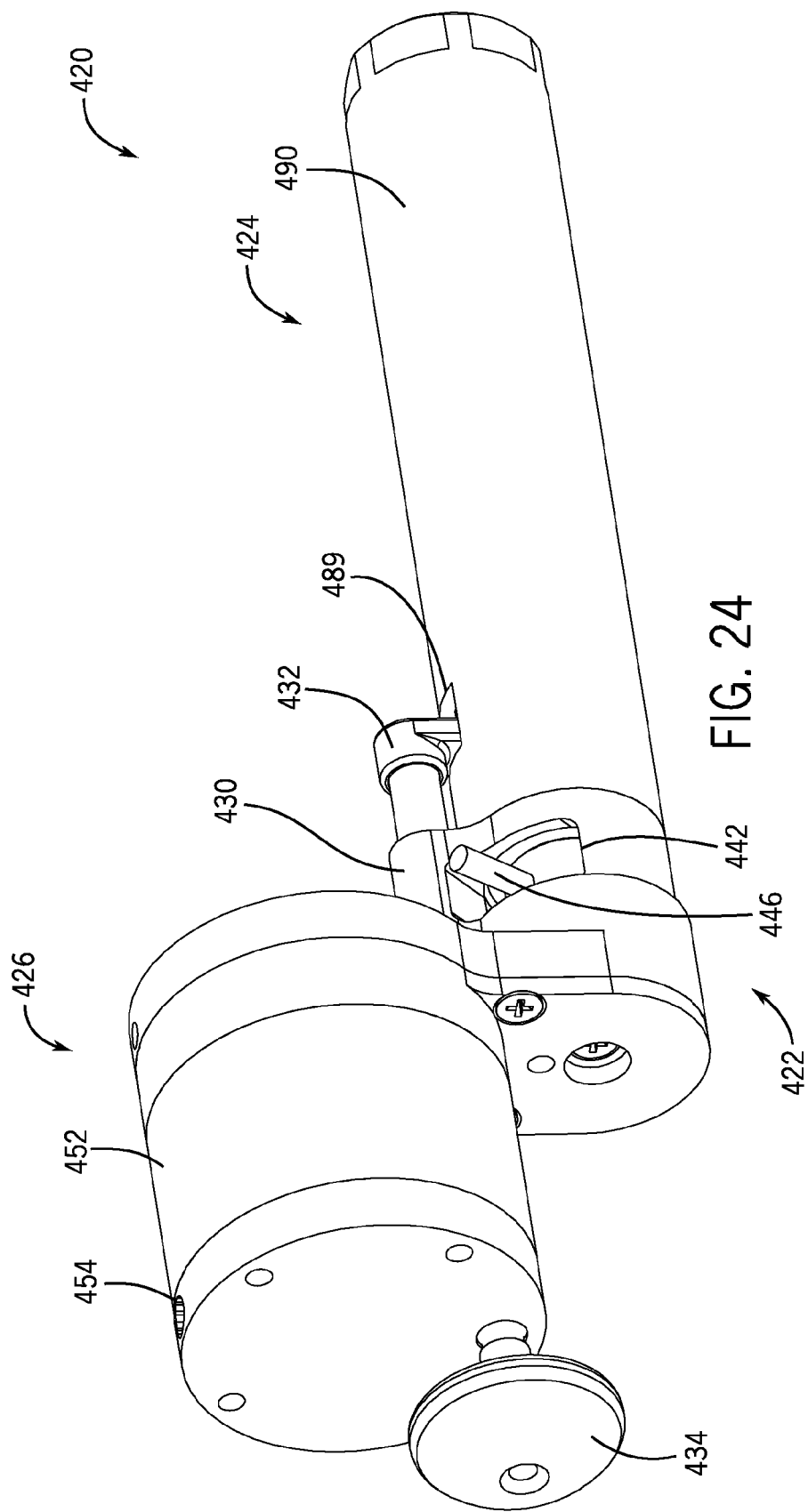
FIG. 24 shows a rear perspective view of the tensioning tool of FIG. 23.
Figure 25:
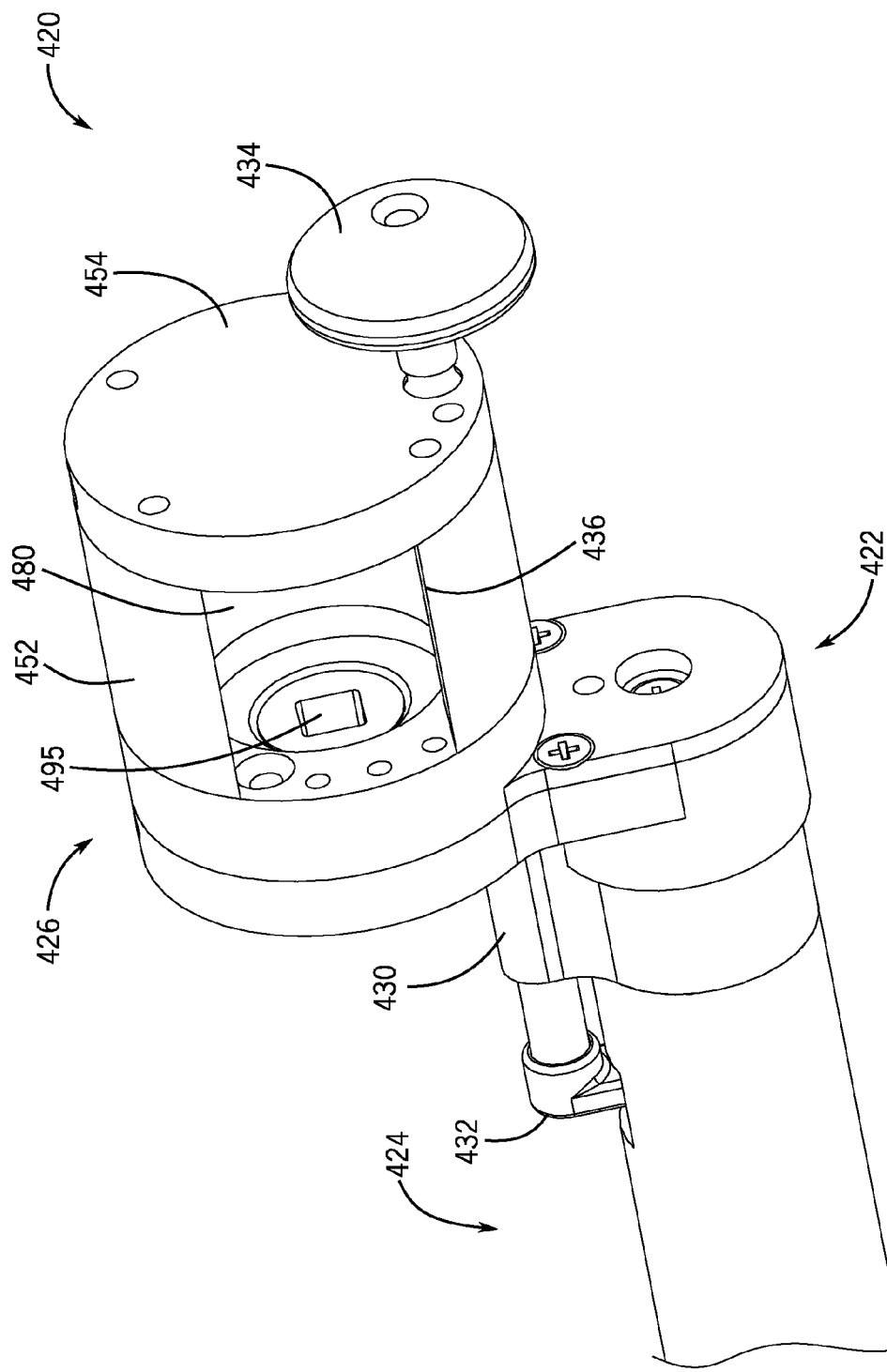
FIG. 25 shows an enlarged rear perspective view of the tensioning tool of FIG. 23.

Another example of a tool 420 is shown in FIGS. 23 through 35. In this different example, the tool 420 has a substantially similar structure to the example shown in FIGS. 12 through 22, and operates in a similar manner. As shown in FIGS. 23, 24 and 25, the tool 420 includes a body or housing 422 having a front housing or portion 424, a rear housing or portion 426, and a sub-housing 430. The housing 422 receives the operating parts necessary, as discussed above regarding the previous example, for engaging the threaded rod 124 and nut 126, actuating an engagement structure, and rotating the nut 126 relative to the rod 124 to tension the cable system to the desired level.

The rear portion 426 and the front portion 424 are generally cylindrical in shape. As shown in FIG. 23-25, the front and rear portions 424, 426 are configured to engage one another adjacent respective ends, and are offset from each other so as to have parallel axes that are spaced apart from one another. The offset of the front portion 424 relative to the rear portion 426 is beneficial in reducing the overall length of the tool 420 (since some parts may be overlapped, such as the gear drive), which enhances maneuverability and the ability to position the tool 420 in a more direct alignment with the axial extension of the cable end during use. The shape of the tool 420 (offset front and rear portions 424, 426) along with the length together are helpful to require less clearance respective of other components during use, and also aids alignment with the cable end.

A release rod 428 extends through the rear portion 426 and through the sub-housing 430 to engage a release tab 432. An actuator button 434 is attached at the opposite end of the release rod 428 relative to the release tab 432 to aid in actuating the release rod 428 and release tab 432. The rear portion 426 receives the nut driver or runner 122 through an opening or recess 436 (best seen in FIG. 25) for actuating the input shaft 438, which is positioned in the front housing 424. The front housing 424 includes an aperture 440 at a distal end for receiving the threaded rod 124 and nut 126 combination as noted above. A slot 442 is formed in the front case or casing 428 adjacent or near the location of the load cell 444 to accommodate a load cell communication line. A collar 446 extends through the slot 442, and receives or guides the communication lines to and from the load cell 444 positioned in the front case 428 as defined below. The slot 442 has larger dimensions, both axially and radially, than the collar 446 to facilitate possible movement of the collar 446 with respect to the front case 448.

Figure 26:
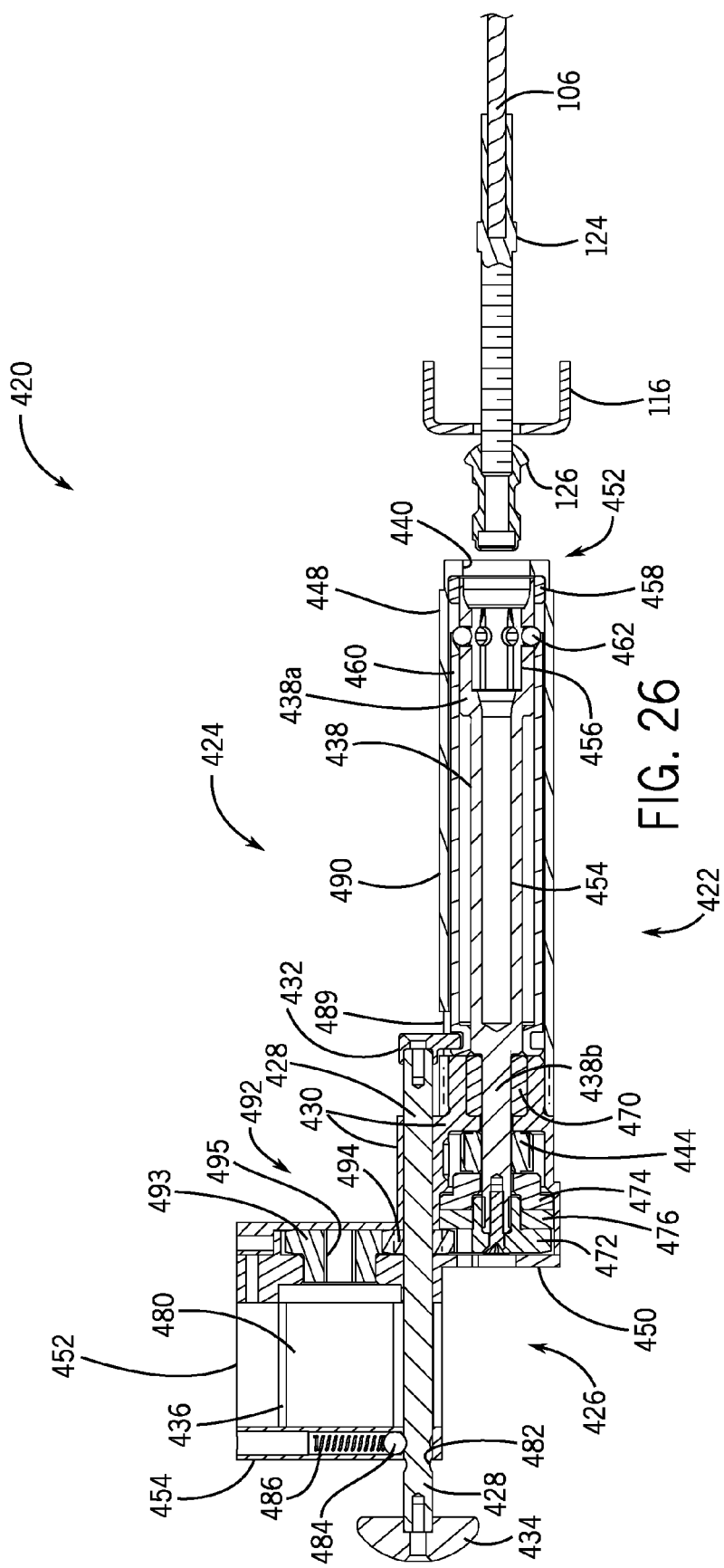
FIG. 26 shows a section view taken along line 26-26 of FIG. 23.

FIG. 26 is a cross section of the tool 420 of this example, showing the tool 420 adjacent a portion of an emergency brake cable system, which includes an equalizer 116 receiving the threaded rod 124 end of a cable 106, and a nut 126 partially threaded onto the end of the rod 124.

Referring still to FIG. 26, the front housing 424 includes a sleeve or nose portion 448 attached at its rear end to the front casing 430, in turn attached to a back cover 450. The rear portion 426 includes a mounting cylinder 452 with a mounting cover 454 positioned at its rear end. The front case 430 extends away from the front housing 424 to encompass the front end of the back portion 426, and the back cover 450 of the front housing 424 extends away from the front housing 424 and generally coextensive with the front case 430 to serve as an internal frame structure of the rear portion 426. For instance, the back cover 450 defines an aperture through which the release rod 428 extends.

Figure 27:
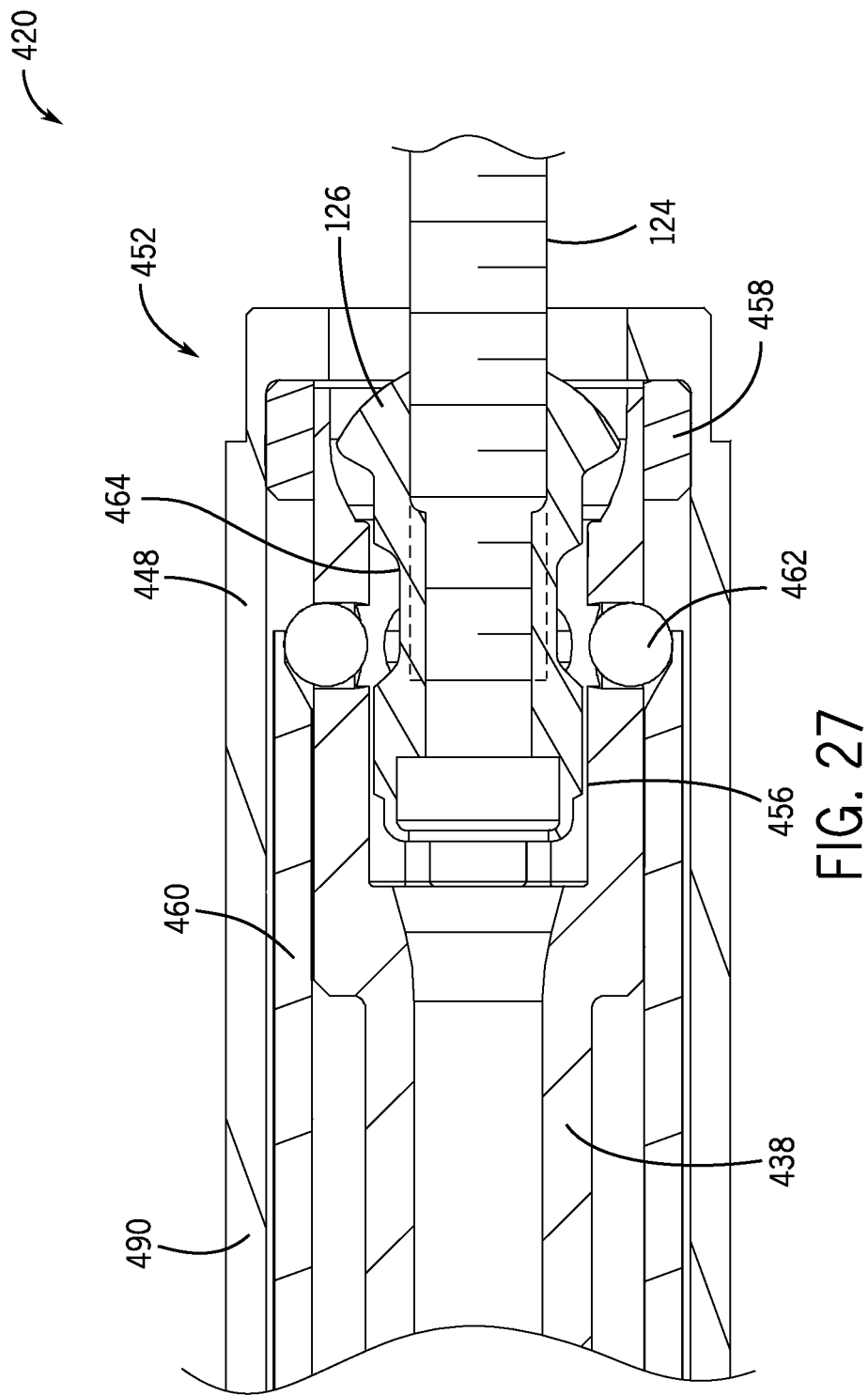
FIG. 27 shows an enlarged section similar to portions of FIG. 26, showing the end effector of the input shaft.

With reference to FIGS. 26 and 27, the nut engagement end 452 of the input shaft 438 is shown and described, and is also referenced herein as the end effector. The input shaft 438 is positioned in the nose portion 448 of the front housing 424, and has a front section 438a having a front end, and a rear section 438b having a rear end. The front section 438a defines a central bore 454 with a nut receiving engagement cavity 456 at its terminal front end. The front section 438a, adjacent the nut engagement cavity 456, is rotatably supported by a bearing 458. The nut engagement cavity 456 is not engaged with the nut 126 in FIG. 26, and in FIG. 27 the nut engagement cavity 456 has received the nut 126, but the nut 126 is not secured within the cavity 456. As shown in FIG. 26, the nose portion 448 includes a float sleeve 460 which moves axially under the control of the release rod 428 and tab 432. The float sleeve 460, when moved axially towards the front end of the input shaft 438 causes ball bearings 462 to move axially inwardly, similar to that described above, to engage the annular groove 464 formed in the nut 126. This locks the nut 126 in the engagement end 452. The nut 126 has facets formed on its outer perimeter for mating engagement in the engagement end 452. Thus, once locked into the engagement end 452, the nut 126 turns with the input shaft 438 to cause the nut 126 to move along the threads of the threaded rod 124. The input shaft 438 may be solid, hollow, or a combination, and the outer surface may take the form of a complete cylinder where it is hollow, or a partial cylinder with a discontinuous outer surface (slots, braids, holes, continuous, spiral strips, etc.).

Figure 28:
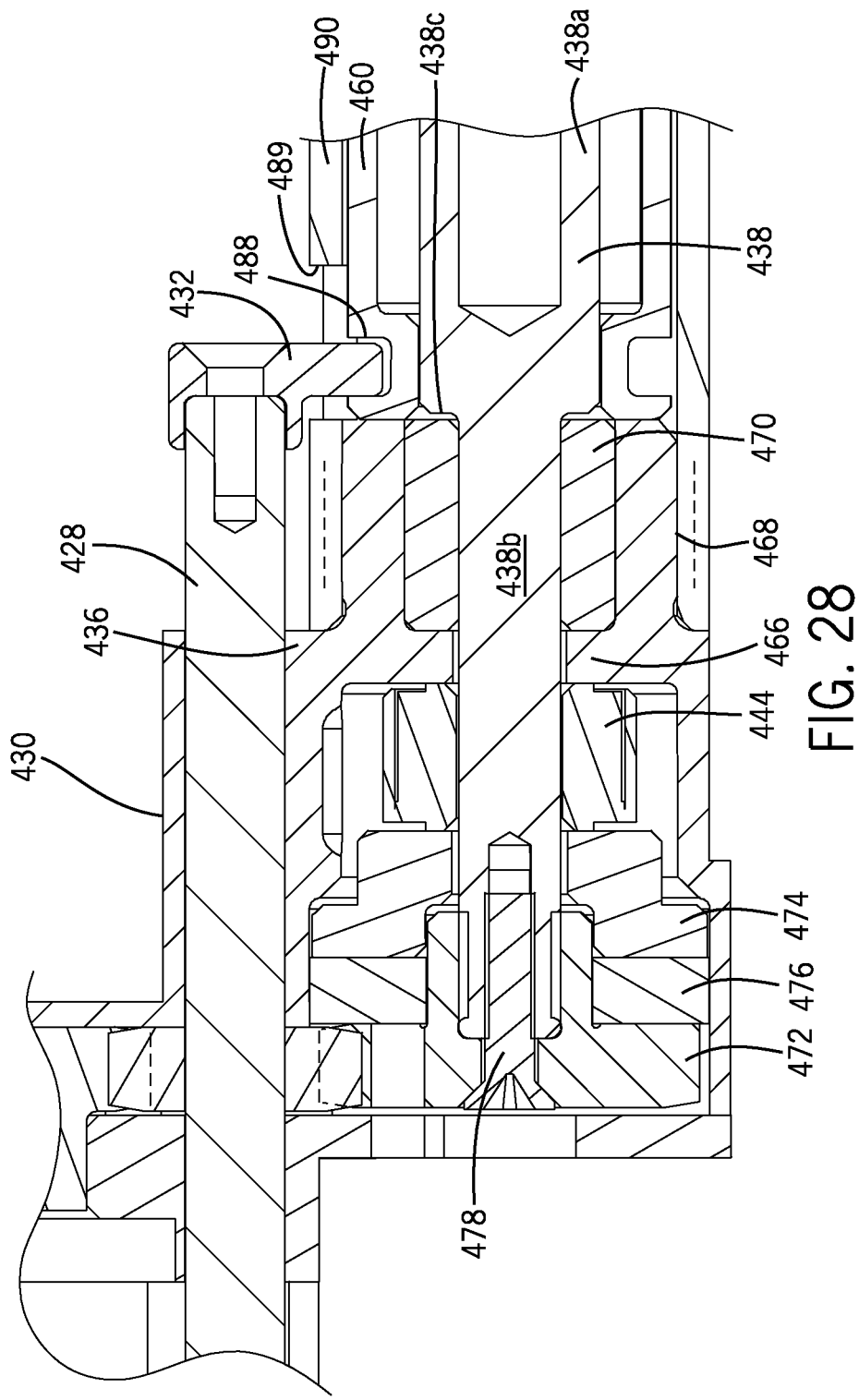
FIG. 28 shows an enlarged section similar to portions of FIG. 26, showing the input shaft, load cell column, and anchor against the housing, and the gear train and release rod.

Referring to FIGS. 26 and 28, the input shaft 438 has a front hollow section 438a and a rear solid section 438b. The rear section 438b forms a solid rod, and has an outer dimension reduced in diameter from the front section 438a. A shoulder 438c is formed where the front section 438a transitions to the rear section 438b and the outer dimension is reduced in size. The input shaft 438 is received in the front nose 448 of the front housing 424, and extends through the front housing 424. The front wall 466 of the front case 430 includes a collar 468 extending axially there from, coaxial with the input shaft 438 rotational axis. The collar 468 forms a cylindrical recess, which receives a rotational bearing 470. The rear section 438b passes through the rotational bearing 470, and an aperture formed in a front wall 466 of the front case 430, at the center of the base wall of the collar 468. The shoulder 438c of the input shaft 438 engages an end of the bearing 470, which in turn engages the base wall of the collar 468 (front face of the front wall 466). This forms a solid structure against which the rear section 438b of the input shaft 438 is loaded, as explained in more detail below.

An output gear 472 is mounted on the rear end of the rear section 438b of the input shaft 438 to engage with the gear drive of the nut runner 122. Positioned on the rear section 438b of the input shaft 438 between the rear face of the front wall 466 and the output gear 472 are: the load cell 444, with a front rim engaging and bearing against the back side of the front wall 466 of the front case 468; a compression washer 474, which bears against the back rim of the load cell 444; a thrust bearing 476 positioned between the washer 474 and the output gear 472. The load cell 444, compression washer 474, thrust bearing 476, and output gear 472 all rotate with the input shaft 438. The mounting of the output gear 472 on the rear end of the rear section 438b of the input shaft 438 may retain the thrust bearing 476, compression washer 474, and load cell 444 on the rear portion 438b of the input shaft 438 between the rear face of the front wall 466 of the front case 468 and the output gear 472. The shoulder 438c on the input shaft 438 butts up against the front rim of the shaft bearing 470, and provides the anchor against which the fastener 478 of the output gear 472 applies a force. As explained in more detail below, when the input shaft 438 is under load from the tensioning process, the output gear 472 axially (along the centerline of the input shaft 438) compresses the thrust bearing 476 against the compression washer 474, which in turn compresses the load cell 444 against the rear face of the front wall 466, which provides the direct measurement of the tension in the cable 106 during the tensioning process. The load may be designed to not be axial and along the centerline, but instead may be axial and parallel to but spaced away from the centerline of the input shaft 438.

As with some of the previous examples, the load cell 444 surrounds the input shaft 438, and in one example is concentric to the input shaft 438. In this way the load cell 444 is concentric to the axis of the tension load caused by the tensioning of the cable system, and the tension load is axially aligned with the centerline of the input shaft 438. As noted elsewhere, the load cell 444 is stationary relative to the external body or housing 422 during the tensioning operation. The load cell 444 may also be axially stationary relative to the input shaft 438, which rotates relative to the load cell 444.

Figure 29:
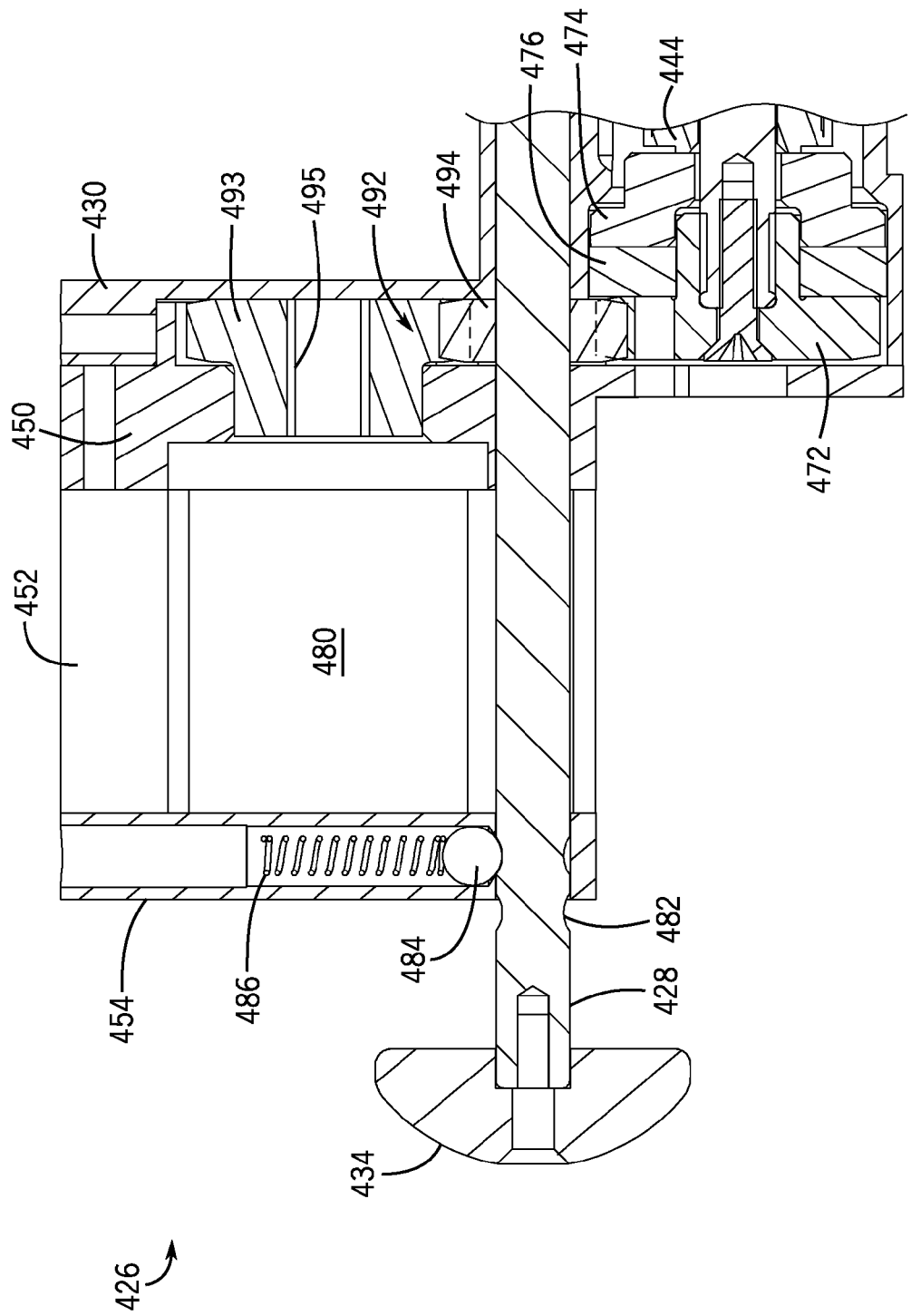
FIG. 29 shows an enlarged section similar to portions of FIG. 26, showing the rear portion including the gear train and release rod.

The rear portion 426 of the tool 420 is shown and described with respect to FIGS. 26 and 29. The rear portion 426 is formed from a portion of the front casing or plate 430 extending above the front portion 424 (in FIG. 26 and FIG. 29), a portion of the back cover 450 also extending upwardly from the front portion 424 and spaced rearwardly from the front casing or plate 430 to form a cavity therebetween, a mounting cylinder 452 extending generally rearwardly from the back cover 450 and defining a second cavity 480 for receiving the nut runner 122, and a mounting cover 454 forming the rear wall of the mounting cylinder 452.

The release rod 428 extends through an aperture formed in said rear portion 426, which aperture extends through said mounting cover 454, back cover 450, and front case 430. The release rod 428 defines a rear end having a button 434 attached thereto, and a front end having a release tab 432 attached thereto and extending generally radially there from. A pair of grooves or indentations 482 is formed adjacent the rear end of the release rod 428 to interact with a spring-loaded ball 484 to form a detent structure for positioning the release rod 428 in a forward (actuated) position or a rearward (un-actuated). Each detent structure acts to movably secure the particular axial position of the release rod 428 in the housing, and indicates that the release rod 428, and thus the release tab 432, is positioned in either the forward position to actuate the engagement end 452 of the input shaft 438, or the rearward position to de-actuate the engagement end 452 of the input shaft 438. When in actuated or forward position, the release tab 432 pushes the floating sleeve 460 towards the nose 448, which in turn pushes the ball bearings 462 radially inwardly to engage the nut 126. When in the rearward, or de-actuated, position, the release tab 432 pulls the float sleeve 460 rearwardly to disengage from the ball bearings 462, and release the nut 126. The detent ball 484 engages the grooves or dents 482 of the release rod 428 under the biasing force of a spring 486 and selectively maintains the release rod 428 in the particular selected position. The release rod 428 may be moved from this position by axially loading the release rod 428 to overcome the spring 486 bias force holding the ball 484 in the dent or groove 482. Other structures are contemplated for releasably securing the release rod 428 in the forward position, or in other positions. The floating sleeve 460 defines an annular groove 488 adjacent its rear end, the annular groove 488 receiving the tip of the release tab 432 (see FIG. 26). The release tab 432, when positioned in the groove 488, thus causes the float sleeve 460 to move, or stay stationary, in conjunction with it. For example, the release tab 432 moves the float sleeve 460 forwardly when the release rod 428 is moved forwardly, and moves the float sleeve 460 rearwardly when the release rod 428 is moved rearwardly. The release tab 432 may be received in a slot 489 formed in the outer housing 490 of the front portion 424. The edges of the slot 489 define the maximum extension and retraction of the release rod 428, with the detents 482 described above positioned accordingly at the limits or elsewhere along the extension distance as desired.

Continuing to refer primarily to FIG. 29, as well as others of FIGS. 26-35, the release rod 428, release tab 432, and float sleeve 460 create a manual actuator for the engagement end 452 of the input shaft 438. The manual actuator moves, such as by a human operator pushing or pulling the button 434, relative to the tool body or housing 422. The manual engagement is effectuated by axial movement of a member (release rod 428) in operable engagement (release tab 432 engaging with the float sleeve 460) with the engagement end 452 of the input shaft 438. The movement of the member 428 relative to the body or housing 422 causes the engagement end 452 to secure the nut 126 for actuation by the input shaft 438. The manual engagement is contemplated to be automatically actuated by a solenoid or other switch controlled by an operator or a logic controller. The actuation of the manual actuator moves the float sleeve 460 to cause retention of the nut 126 in the input shaft 438. During engagement with the nut 126, tensioning of the cable system, and disengagement with the nut 126, the load cell column, as defined above, is not in this example axially moved relative to the body or housing 422, or the input shaft 438, and thus remains substantially stationary. The member 428 allows for external actuation of the input shaft 438 to engage the nut 126, in this example by use of the release rod 428. The release rod 428, engagement tab 432, and float sleeve 460 move collectively relative to the load cell 444. The term "external" as used herein may include by a mechanism not entirely received within the body or housing 422.

This structure provides a sound, well anchored, and simplified load cell-based tensioning and measuring system. The load cell 444 in this and the previous example shown in FIGS. 12-22, is rigidly mounted in a column-like structure, and when under tension load from the cable system, is anchored and compressed against the front case 430 of the body or housing 422, which in turn is abutted against a rigid structure, such as the equalizer 116 or other such item. This provides a solid foundation for the column structure of the load cell 444 to be compressed against to register or directly measure the tension in the cable system along the axial line of extension of the cable 106. The load cell measurement mechanism described herein need not be assembled into nor disassembled from the cable system itself. Instead it is attached to the end of the cable system, which provides ease of access and accurate measurement, along with a minimal time requirement to tension and measure the brake cable system during assembly, repair or maintenance.

In continuing reference to FIGS. 26 and 29, the cavity 480 formed between the back cover 454 and the front case 430 receives the gear train 492. The gear train 492 includes an input gear 493 in rotary engagement with an idler gear 494, which is in rotary engagement with the output gear 472. The output gear 472 is in rotary engagement with the input shaft 438 as described above. The input gear 493 includes a connector structure, such as a receiving aperture 495, to receive a nut runner 122 having a head portion positioned in the second cavity 480 (see FIG. 25). The nut runner 122 is rotated under electric, pneumatic, or hydraulic power to rotate the input gear 493, which in turn actuates idler gear 494, which in turn rotates the output gear 472. The rotation of the output gear 472 causes the input shaft 438 to rotate, which in turn rotates the nut 126 secured in the engagement end 452 of the input shaft 438 to rotate relative to the threaded rod 124 and cable 106. More or fewer gears are contemplated for use in the gear train 492.

The operation of the tool as described above is now described with reference to the structure and function described above, and with respect to the method steps or acts referred to below, and with respect to FIGS. 26 and 30-35.

The pre-install step includes the threaded rod 124 as shown in FIG. 26 extending through the aperture formed in the equalizer 116 and secured with the nut 126. The nut 126 is minimally attached to the threaded rod 124, engaging with optionally only a few threads to hold it in place on the rod 124 before or after the vehicle arrives at the tensioning station.

Figure 30:
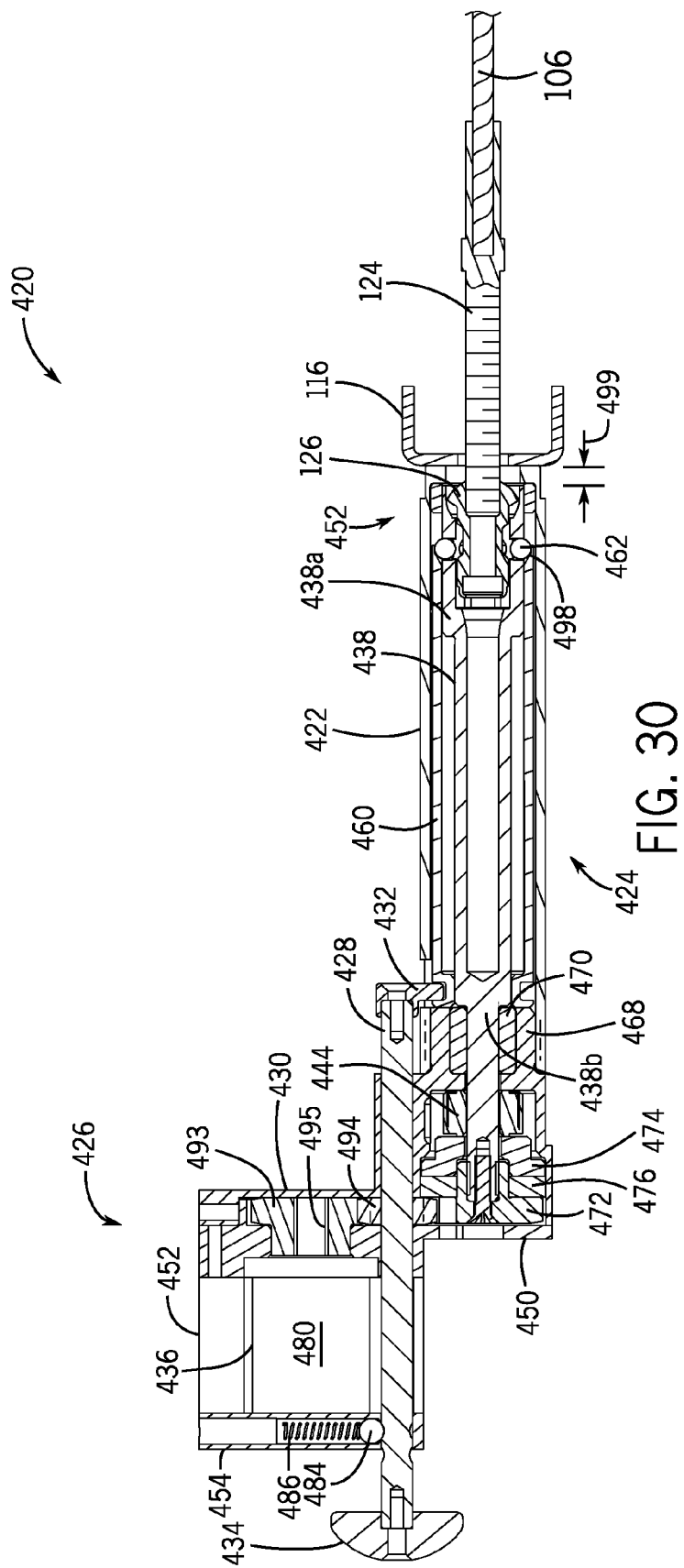
FIG. 30 is a section similar to FIG. 26, showing a nut positioned in the end effector.

As shown in FIG. 30, in a following step, the nut 126 and threaded rod 124 are pushed and/or pulled into the nose 448 of the end effecter 452 of the input shaft 438. This action positions the nut 126 inside the engagement end 452 of the input shaft 438, where the nut 126 is received and oriented in the end effector 452 to be positioned with groove 464 of the nut 126 adjacent to the balls 462 in the end effector 452.

Figure 31:
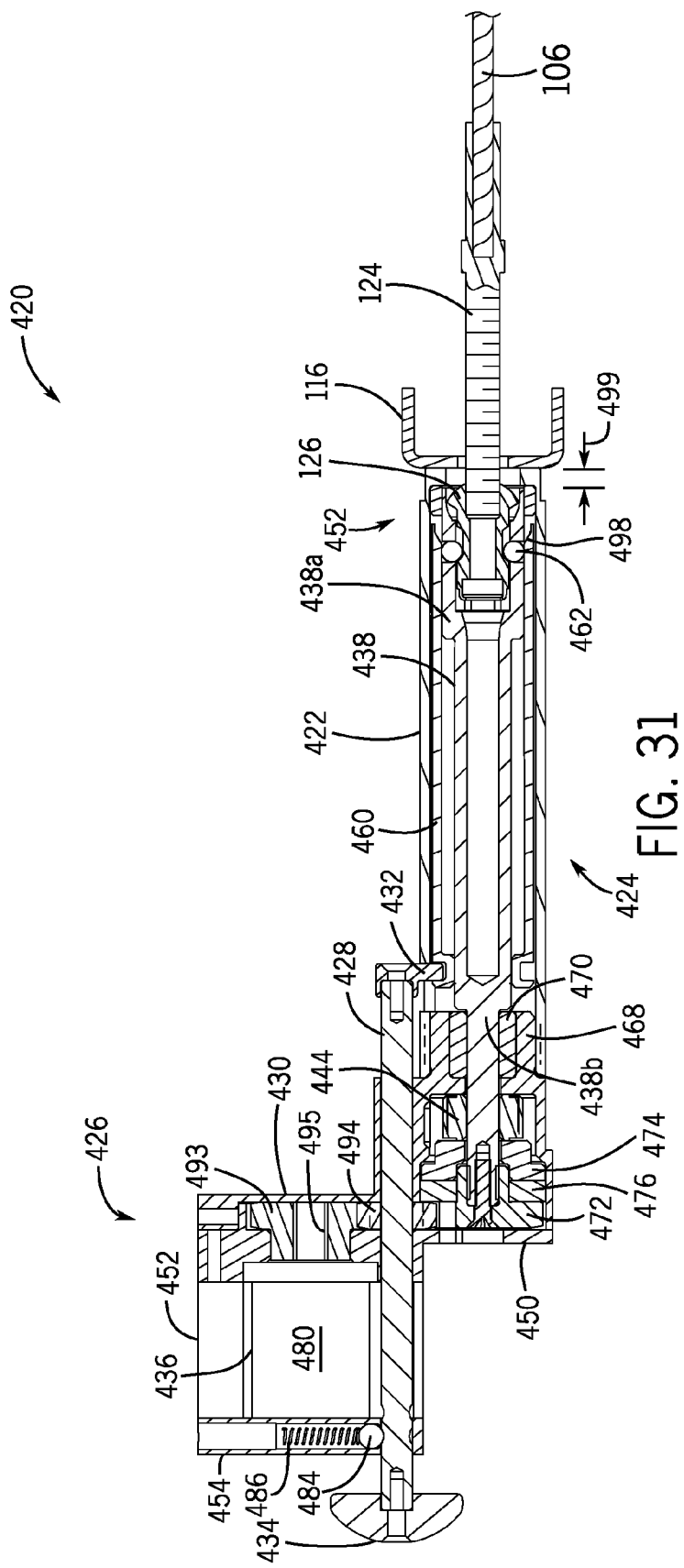
FIG. 31 is a section similar to FIG. 30, showing a nut secured in the end effector by a float sleeve at its forward position.

In a following step, shown in FIG. 31, the operator pushes on the engagement button 434 which moves the release rod 428 and float sleeve 460 forward relative to the tool body or housing 422. The ramp 498 in the forward portion of the float sleeve 460 forces the balls 462 positioned in the engagement end 452 radially inward to be positioned in the groove 464 on the nut 126, which locks the nut 126 in place. The tension in the cable system at this point may be considered a first tension level.

Figure 32:
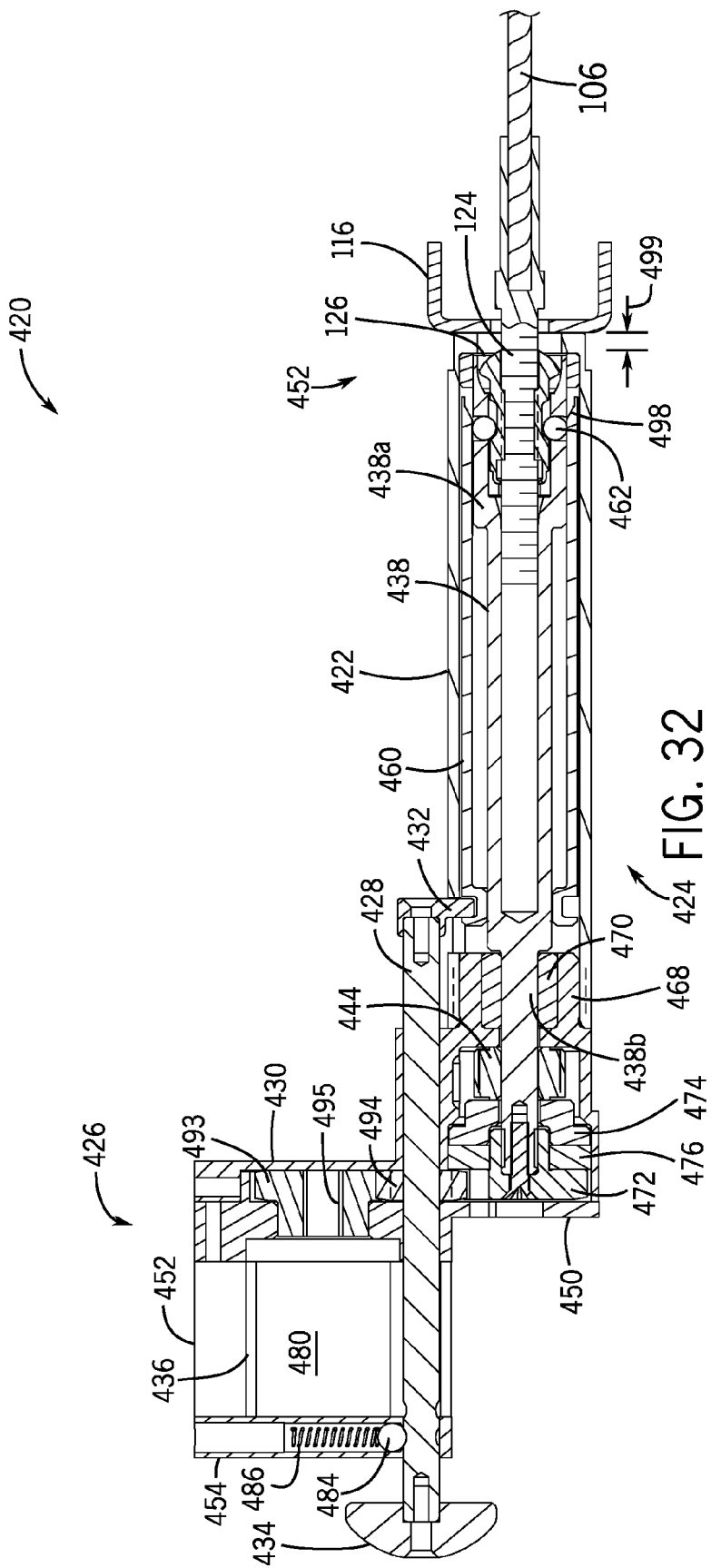
FIG. 32 is a section similar to FIG. 31, showing the nut threaded onto the rod by the rotation of the input shaft, the nut positioned at a location to create a high level of tension.

In a following step, show in FIG. 32, the operator insures that the nut runner 122 is engaged with the tool 420, and that the nose end 448 of the tool 420 is resting against, or close to resting against, and engaging the equalizer 116. Note the relief distance 499 between the end of the nut 126 nearest the equalizer 116 and the equalizer 116. This relief distance 499 is the distance which the nut 126 moves after being disengaged from the tool 420. Moving through the relief distance 499 reduces the tension in the cable system. The relief distance 499 may be defined in a fixed value by the extension of the nose end 448 of the tool 420 past the end of the nut 126. The relief distance 499 may also be adjustably defined, such as by a selectively movable collar threadedly attached to the nose end 448 of the tool 420. Other adjustable attachment structures are contemplated. The relief distance 499 may be in the range of 0.00 inches to approximately 1 inch, and is beneficially approximately 0.25 inches. In the examples shown in FIGS. 12-35, the nut 126 may be moved away from the equalizer 116 without having to transition or move the load cell 444 or the input shaft 438 within the body or housing 422. Only the float sleeve 460 moves, which is intended to simply provide a mechanism to push the ball bearings 462 into the groove 464 of the nut 126, and retain the ball bearings 462 therein until it is desired to release the nut 126 from the end effector 452.

Continuing with FIG. 32, the operator actuates the nut runner drive 122, which through the gear train 492 causes the input shaft 438 to rotate and turn the nut 126. The nut 126 is thereby run up the threaded rod 124 (moved along the threaded rod 124 away from its terminal end) to create tension in the cable system. This tension level is referred to as the first higher tension level. In this step as shown in FIG. 32, the rod 124 is shown in a position to represent the higher tension level, which may be a maximum tension level. The tension in the cable system is measured by the load cell 444 positioned in the tool 420 to effectively react against the input shaft 438 and the fixed body or housing 422. The load cell 444 is in communication with the control system 128, and sends signals indicative of the load under which the load cell 444 is subjected during use. This is the "pre stretch" or higher tension level required to remove voids from the system. Once achieving this level the nut runner 122 may stop, be inactive for a time period allow the system to relax, and then continue to increase or decrease tension slowly until a stable tension is established or no longer drifts below a specified level. This tension level is referred to as a "stable tension" level. In this position, the nut 126 may be turned either way by the input shaft 438 to increase or decrease tension as desired. The nut runner 122 is controlled by a control system 128, such as that shown in FIG. 1 and as described above with reference to FIG. 1, and may include a smart phone, tablet, wired or wireless connection to a server or the internet for control, recording, analysis, or maintenance assessment.

Figure 33:
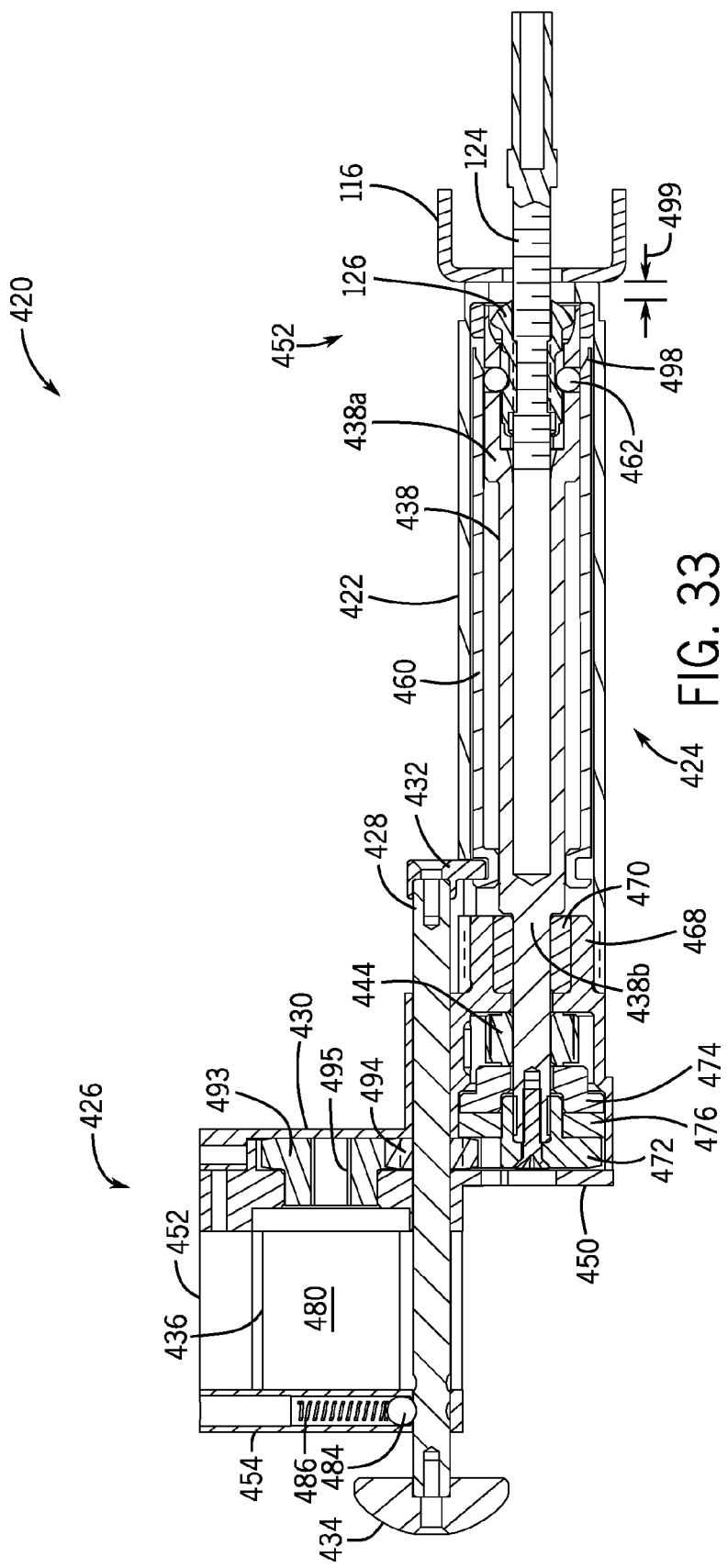
FIG. 33 is a section similar to FIG. 32, showing the nut moved toward the end of the threaded rod to lessen the tension in the cable system.

Referring to FIG. 33, in a following step, before further tensioning or de-tensioning the cable system and releasing and returning the nut 126 to the equalizer 116, it is often necessary to relieve a specified amount of tension so that when the nut 126 is fully released the amount of residual or final tension is higher than a determined limit (which for instance, would leave the brakes engaged). It is therefore often necessary to run the nut 126 in reverse a select number of rotations or angle of rotation to relieve the tension before final release. This may be achieved by slowly running the nut 126 in reverse to a pre-defined tension lower than the maximum pre stretch level. Any number of tensioning and de-tensioning steps may be performed before releasing the nut 126, depending on the desired effect on the cable tensioning system.

Figure 34:
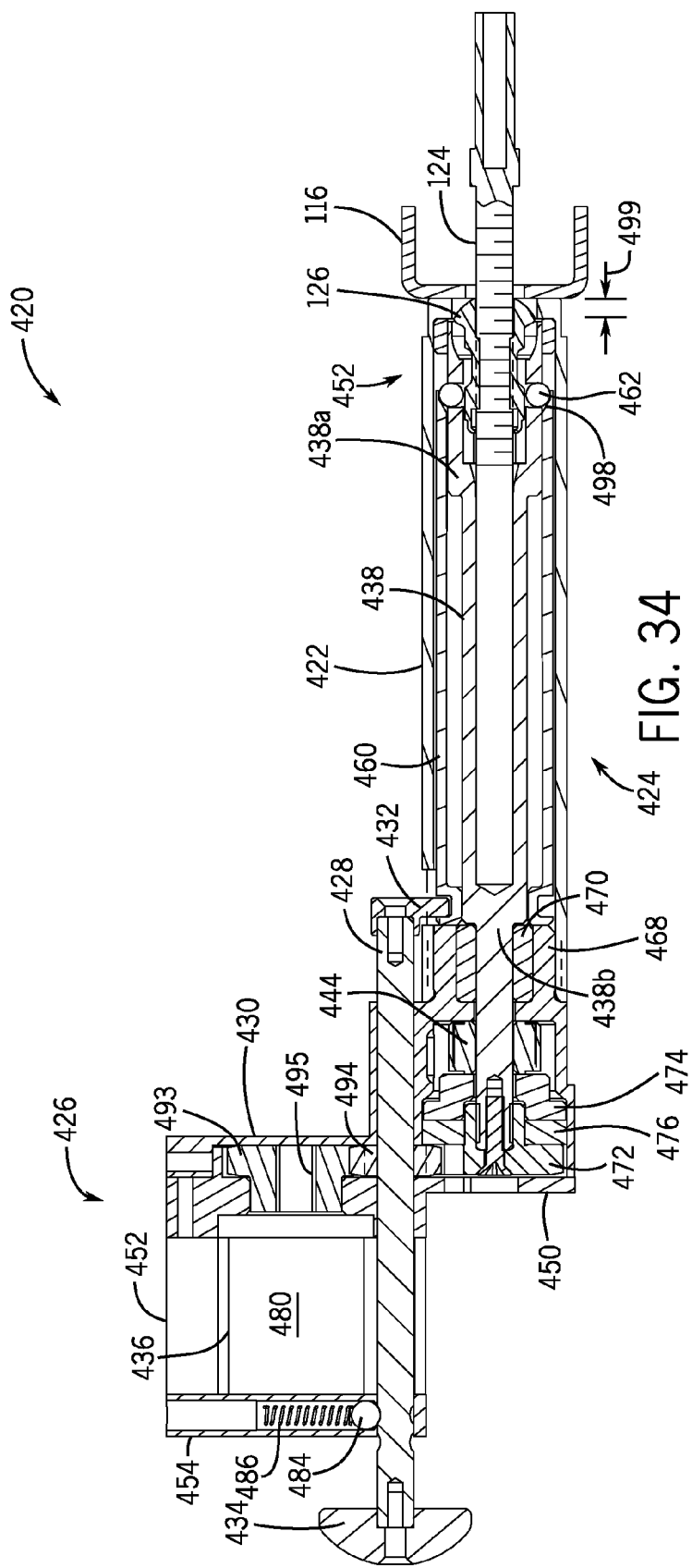
FIG. 34 is a section similar to FIG. 33, showing the nut released from the end effector and engaging the equalizer after being tensioned.

Referring to FIG. 34, in a following step, the operator then moves the engagement button 434 to the disengaged position, causing the release rod 428 to move rearwardly, in turn causing the float sleeve 460 to slide rearwardly and release the balls 462 from the groove 464 of the nut 126. The nut 126 is released the final relief distance 499 to contact, engage, and react directly against the equalizer 116. A desired final tension is achieved at this point.

Figure 35:
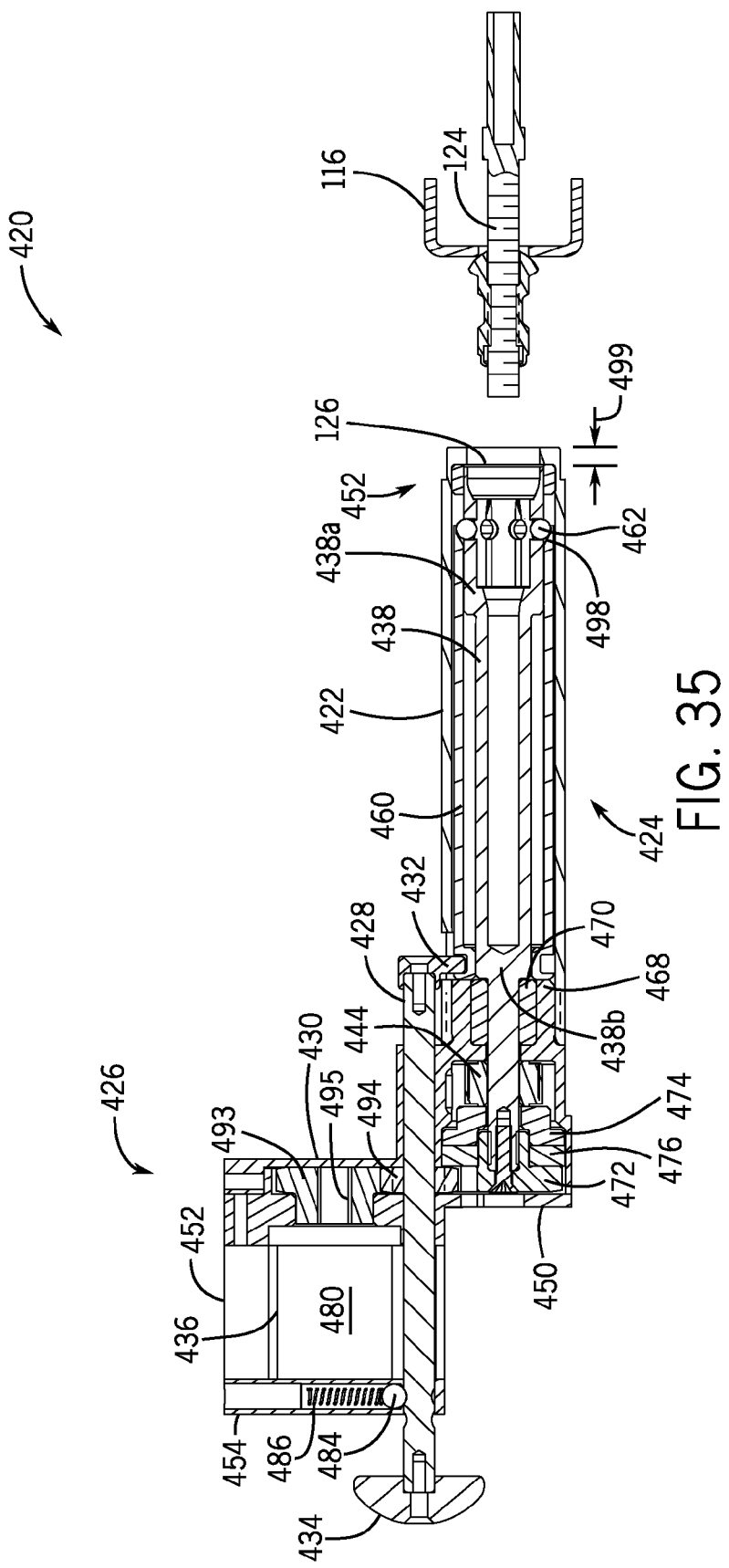
FIG. 35 is a section similar to FIG. 34, showing the nut removed from the end effector.

Referring to FIG. 35, in a following step, the tensioning tool 420 may be removed from the system and prepared for use on the next vehicle.

In a typical automotive parking brake system the brake pedal or hand lever is connected to a cable 106 which passes through an equalizer 116. The equalizer 116 typically divides the tension force so it is evenly distributed between two cables connected to the rear brakes. The cable system typically operates independently of the hydraulic system. The cable 106 is attached to the braking brake mechanism through an actuator lever attached to parking brake mechanism. Typically in a park brake system there is a return spring which keeps the actuator lever in the fully released position when the brake pedal or hand lever is released.

In many processes used to adjust the parking brake in an automobile, one of the desired outcomes is to achieve a consistent rate of resistance experienced by the driver when the driver actuates the pedal or hand lever for any given model of vehicle. It is additionally desirable to ensure that there is just enough residual tension in the cable system to allow the hand lever or pedal to return fully to the un-actuated position when the brake is released. A significant challenge in this endeavor is to achieve this desired consistency at very low tension levels or at the very beginning of the actuation cycle and, conversely, at the end of the release cycle. At this level, tension in the cable system is caused by compression of a return spring reacting against the actuator lever that is attached to the cable and by compression in the cable conduit thereby causing a small amount of desired residual tension in the overall system and allowing the hand lever or pedal to return fully to the initial position when the driver releases the parking brake.

Adjusting the park brake system so that it is capable of consistently achieving high levels of clamping force when fully actuated is typically a primary goal of the adjustment process. To achieve this high level of tension consistently it may be helpful to utilize a process that mostly or fully stretches the cable and compresses the conduit so that voids in the system are mostly or entirely removed over the long term. It is a further desire, however, to ensure that there is a remaining low level of residual cable tension so that the hand lever or brake pedal returns consistently to its initial position when the system is dis-engaged. This is particularly challenging in that each brake has different initial travel losses due to manufacturing tolerances. This variation in travel losses are compounded with variable ratio levers, variation in return springs, conduit compressibility, and other factors which may result in systems that appear to have different characteristic stiffness. The challenge to tensioning a system with significant apparent stiffness variation is knowing how far to release the system from a high tension level that results in the residual tension being sufficient to return the hand lever or brake pedal to the fully released position without over tensioning the system.

The process or method described herein, whether implemented on the structure described herein or other structure for tensioning an emergency brake cable system, describes how to achieve a final or terminal low level residual tension in the system that addresses and overcomes the inconsistencies associated with the variation in apparent system stiffness. This process could occur supplemental to, integral with, or as a second or final stage of an overall adjustment process.

Figure 36:
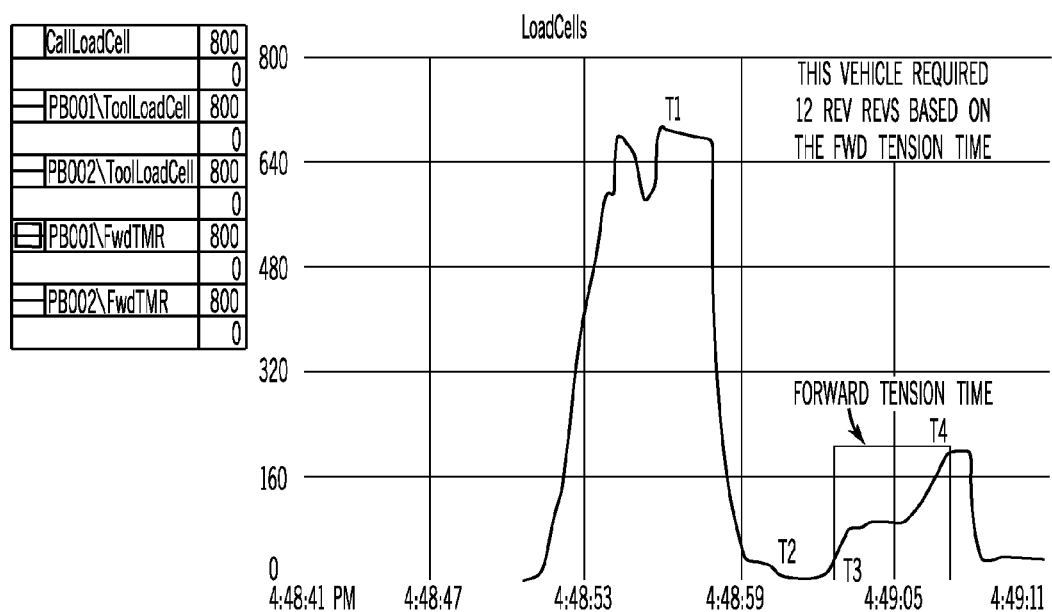
FIGS. 36 and 37 are output graphs that each show an output of a brake cable system during the tensioning steps, and in particular show the forward tension time between tension levels T3 to T4.
Figure 37:
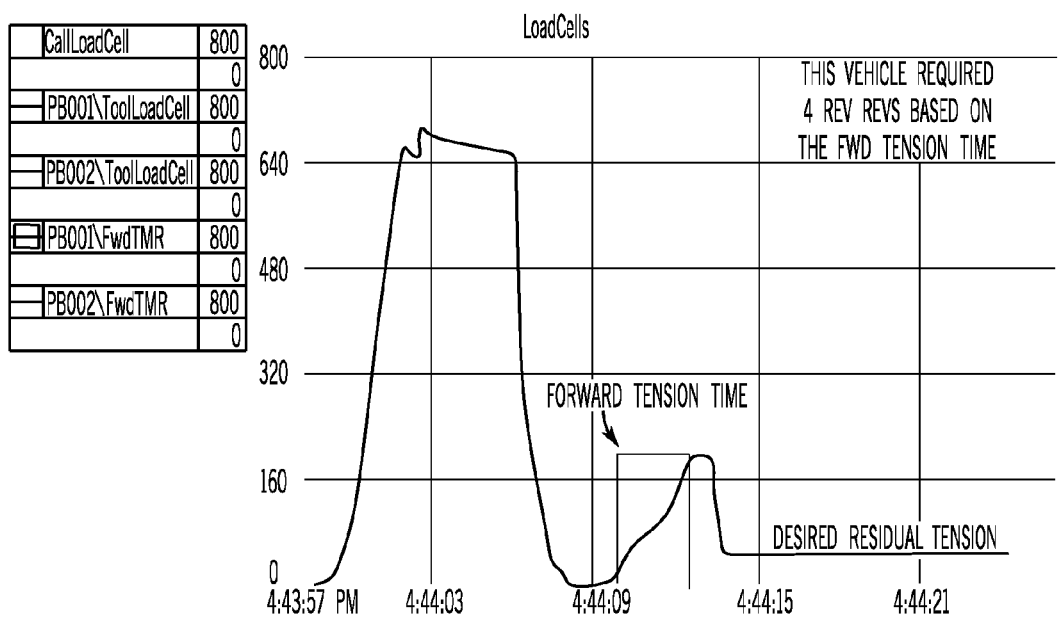

FIGS. 36 and 37 are output graphs that each show tension measurement output of a brake cable system during the tensioning steps, and in particular show the forward tension time between tension levels T3 to T4. The time it took the tool to run-up the nut 126 on the threaded rod 124 in FIG. 36 from tension T3 to tension T4 was approximately 6 seconds (however it could be longer or shorter).

In the final adjustment of the emergency brake system, the nut 126, while held in a position a specified distance (return distance) away from the equalizer 116 and not reacting against the equalizer 116, is slowly run-up the threaded rod 124 to a predetermined target tension level which is consistent with the brake being applied at a low level T4. During this run-up, the distance traveled can be determined based on the rotational speed of the tool used to rotate the nut 126 and the time required to go between a low tension level (T3) and a higher target tension level (T4). Based on the speed of the nut runner 122, the pitch of the thread on the threaded rod 124, and the time interval from tension level T3 to tension level T4, the distance traveled may be determined. The distance traveled from tension level T3 to tension level T4 is used to define the tension/travel relationship. Once the tension/travel relationship is defined for a particular cable system, the desired residual tension may be obtained by translating the nut 126 (with the nut runner 122, for example) toward a free end of the threaded rod 124 as desired. While there is an assumption in this example that the tension/travel relationship is generally linear in the range of the curve being addressed (low tension region), non-linear characteristics of the curve may be determined by taking more data points along the tension curve between T3 and T4, which in turn may be configured into an algorithm used to set the desired residual tension level and to obtain it by reversing the nut 126 on the threaded rod 124.

Additionally or alternately, a servo motor may be used to determine a distance traveled by the nut 126 along the threaded rod 124 by counting the total angle needed to go from tension level T3 to tension level T4. The servo motor may have a sensor monitoring total angle of rotation, and with the pitch information of the threaded rod 124, the distance traveled by the nut 126 along the threaded rod 124 corresponding to the tension in the cable system increasing from tension level T3 to tension level T4 may be determined. With the distance traveled information, the tension/travel curve may be determined, which is used to accurately estimate the distance the nut 126 needs to be reversed along the threaded rod 124 toward a free end of the rod 124 to obtain the desired residual tension level. FIGS. 36 and 37 are output graphs that each show an output of a brake cable system during the tensioning steps, and in particular show the forward tension time between tension levels T3 to T4. The residual tension level may be greater than, less than, or the same as tension level T3. Other types of measurements may be utilized to determine the distance traveled by the nut 126 corresponding to the load cell 444 and thus the cable system tension increasing from tension T3 to tension T4, such as by optical sensors, electric eye monitoring, or resistive techniques.

At these low tension levels, the distance traveled and the tension time will often vary from brake to brake. In determining the distance traveled going between tension T3 and tension T4, the apparent stiffness of the system (which varies due to variations in the return spring, loss travel, variable ratio levers, conduit compressibility, environmental and other factors) is determined. Based on this apparent system stiffness and target force level (T3), the number of reverse revolutions of the nut 126 towards a free end of the threaded rod 124 needed to move the nut 126 along the threaded rod 124 a desired or calculated distance and achieve a desired residual tension in the cable system is determined.

This improved method utilizes a performance path whereby tension and travel are adjusted as a result of real time inputs received during the cable adjustment process and adjusts each cable system according to the apparent stiffness of each cable system. Other methods known in the prior art are prescriptive in that they employ a predefined set of travel and tension targets that are applied to each and every cable system. These predefined targets are typically based upon a statistical analysis to define the characteristics of a typical cable system for a particular vehicle.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the present invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Changes in detail or structure may be made without departing from the spirit of the invention as defined in the appended claims. Accordingly the matter contained in the above description or shown in the accompanying drawings shall be interpreted as illustrative only and not limiting.

What is claimed is:

1. A tensioning tool for use in tensioning an emergency brake cable system for a vehicle, the tool being driven by a rotational driver, and the brake system including a rotatable cable end, the tool comprising:
   a body;
   a first portion rotatably positioned in the body for engaging the cable end, the first portion including a locking mechanism for receiving the cable end, the locking mechanism movable between at least a first locked position and a second unlocked position;
   a second portion movably positioned relative to the body and at least partially external to the body and operably engaging the locking mechanism; wherein upon insertion of a nut into the first portion, movement of the second portion to the second unlocked position secures the nut in the first portion and wherein the first portion is an elongated shaft having a front portion and a rear portion, the front portion of the shaft including the locking mechanism and defining a recess, the rear portion of the shaft extending through a load cell configured to remain substantially stationary relative to the body and operably bear upon a portion of the body when the shaft is engaged with the cable end;
   a gear operably engaged with a source of rotational movement and non-rotatable engaged with the shaft; and
   a thrust bearing operably engaging the gear and the load cell for allowing rotation of the gear while creating a compressive load on the load cell.

2. The tensioning tool of claim 1, wherein the first portion is fixed in axial position relative to the body.

3. The tensioning tool of claim 1, wherein the first portion comprises an input shaft that rotates relative to the body.

4. The tensioning tool of claim 3, wherein the second portion includes:
   A first actuator at least partially movable through the body;
   A second actuator operably engaged with the first actuator, the engagement actuator operable to actuate the locking mechanism between the locked and unlocked position, the engagement actuator movable relative to the input shaft.

5. The tensioning tool of claim 4, wherein the first actuator includes an engagement tab that extends through a slot in the body and engages the second actuator.

6. The tensioning tool of claim 4, wherein the second actuator is a sleeve positioned at least partially interior of the body and at least partially surrounds at least a front portion of the first portion.

7. The tensioning tool of claim 1, wherein the rear portion of the shaft further extends through a bearing that allows rotation of the shaft relative to the body.

8. A method for measuring and determining the apparent stiffness of a park brake cable system and adjusting tensioning force applied to the system based upon such determination in real time, the method comprising:
   operably engaging a tensioning apparatus with a park brake cable of a park brake cable system, the tensioning apparatus including a housing that contains a load cell and attached to a programmable drive, the brake cable system including an equalizer adapted to balance tensions in at least two lengths of cable, wherein a nut is operably associated with a threaded rod, the nut including a surface for operably engaging the equalizer;
   securing the nut within the apparatus;
   positioning the surface of the nut away from the equalizer a specified distance;
   driving the nut with the tensioning apparatus to tension the park brake cable to a first tension level sufficient to remove voids from the cable system;
   measuring the first tension level using the load cell;
   relieving the tension in the park brake cable to a second level approaching zero by driving the tensioning apparatus in reverse;
   tensioning the cable to a third tension level with the tensioning apparatus, the third tension level being higher than the second tension level;
   measuring the third tension level with the load cell;
   tensioning the cable to a fourth tension level with the tensioning apparatus, the fourth tension level being higher than the third tension level;
   measuring the fourth tension level with the load cell;
   based on the speed of rotation of the drive and time elapsed, or using total angle of rotation, determining the actual distance traveled by the nut between the third and fourth tension levels;
   based on the distance traveled, formulating an algorithm that represents the slope of the tension travel relationship or characteristic stiffness of the cable system;
   based on a desired final residual tension in the cable system, determining the number of reverse revolutions of the nut to achieve the desired final residual tension;
   driving the nut in reverse the required number of reverse revolutions with the tensioning apparatus; and
   operably disengaging the tensioning apparatus from the end of the park brake cable, wherein the nut returns to the equalizer and substantially maintains the desired residual tension in the park brake cable system.

* * * * *